(12) United States Patent
Amino et al.

(10) Patent No.: US 11,053,416 B2
(45) Date of Patent: *Jul. 6, 2021

(54) ADHESIVE SHEET, AND ADHESIVE SHEET PRODUCTION METHOD

(71) Applicant: LINTEC CORPORATION, Itabashi-ku (JP)

(72) Inventors: Yumiko Amino, Funabashi (JP); Kazue Uemura, Tsukubamirai (JP); Kiichiro Kato, Saitama (JP)

(73) Assignee: LINTEC CORPORATION, Itabashi-ku (JP)

( * ) Notice: Subject to any disclaimer, the term of this patent is extended or adjusted under 35 U.S.C. 154(b) by 586 days.

This patent is subject to a terminal disclaimer.

(21) Appl. No.: 15/763,357

(22) PCT Filed: Sep. 27, 2016

(86) PCT No.: PCT/JP2016/078538
§ 371 (c)(1),
(2) Date: Mar. 26, 2018

(87) PCT Pub. No.: WO2017/057413
PCT Pub. Date: Apr. 6, 2017

(65) Prior Publication Data
US 2018/0282590 A1 Oct. 4, 2018

(30) Foreign Application Priority Data

Sep. 28, 2015 (JP) .............................. JP2015-190525

(51) Int. Cl.
*C09J 9/00* (2006.01)
*C09J 11/04* (2006.01)
(Continued)

(52) U.S. Cl.
CPC ................. *C09J 9/00* (2013.01); *B32B 27/00* (2013.01); *C09J 5/00* (2013.01); *C09J 7/255* (2018.01);
(Continued)

(58) Field of Classification Search
CPC ... C09J 9/00; C09J 201/00; C09J 7/381; C09J 7/385; C09J 7/255; C09J 7/401;
(Continued)

(56) References Cited

U.S. PATENT DOCUMENTS

| 2010/0196669 A1 | 8/2010 | Hatakenaka |
| 2013/0011670 A1 | 1/2013 | Tsubaki et al. |
| 2017/0210949 A1* | 7/2017 | Kawada ................. C09J 175/04 |

FOREIGN PATENT DOCUMENTS

| CN | 102863922 A | 1/2013 |
| JP | 2001-507732 A | 6/2001 |

(Continued)

OTHER PUBLICATIONS

International Search Report dated Jan. 10, 2017, in PCT/Jp2016/078538 filed Sep. 27, 2016.

*Primary Examiner* — Nancy R Johnson
(74) *Attorney, Agent, or Firm* — Oblon, McClelland, Maier & Neustadt, L.L.P.

(57) ABSTRACT

Provided a pressure sensitive adhesive sheet including a substrate or a release material having thereon a resin layer that contains a resin part (X) containing a carbon atom-containing resin having a carbon atom in a main chain of a constitutional unit as a main component, and a particle part (Y) consisting of fine particles containing silica particles, a surface (α) having pressure sensitive adhesiveness, the surface (α) having a concave portion and a flat face existing thereon, a prescribed section (P1) having existing on the side of the surface (α) a concave portion having a prescribed (Continued)

maximum height difference, and a flat portion corresponding to a cut portion of the flat face existing in a region (P) and being substantially in parallel to a surface of the substrate or the release material in contact with the resin layer, and an absolute value of a ratio of an intensity ratio of a peak intensity derived from silicon atoms and a peak intensity derived from carbon atoms measured by EDX a for a prescribed region (S) that is positioned under one of the concave portion existing on the cross section, and the intensity ratio measured by EDX for a prescribed region (T) that is positioned under one of the flat portion existing on the cross section being 0.2 or less.

24 Claims, 11 Drawing Sheets

(51) Int. Cl.
    | | |
    |---|---|
    | *B32B 27/00* | (2006.01) |
    | *C09J 201/00* | (2006.01) |
    | *C09J 7/38* | (2018.01) |
    | *C09J 7/25* | (2018.01) |
    | *C09J 7/40* | (2018.01) |
    | *C09J 5/00* | (2006.01) |
    | *C08K 3/36* | (2006.01) |

(52) U.S. Cl.
    CPC ............... *C09J 7/381* (2018.01); *C09J 7/385* (2018.01); *C09J 7/401* (2018.01); *C09J 11/04* (2013.01); *C09J 201/00* (2013.01); *C08K 3/36* (2013.01); *C09J 2301/204* (2020.08); *C09J 2301/408* (2020.08); *C09J 2400/10* (2013.01); *C09J 2433/00* (2013.01); *C09J 2467/006* (2013.01); *C09J 2483/005* (2013.01)

(58) Field of Classification Search
    CPC ........ C09J 5/00; C09J 11/04; C09J 2301/204; C09J 2301/408; C09J 2400/10; C09J 2433/00; C09J 2467/006; C09J 2483/005; C09J 2203/31; C09J 7/38; C09J 7/20; C09J 11/06; C09J 2301/312; C09J 2301/16; B32B 27/00; C08K 3/36
    See application file for complete search history.

(56) References Cited

FOREIGN PATENT DOCUMENTS

| | | |
|---|---|---|
| JP | 2005-193484 A | 7/2005 |
| JP | 2006-342285 A | 12/2006 |
| JP | 2015-196805 A | 11/2015 |
| WO | WO 2009/011396 A1 | 1/2009 |
| WO | WO 2015/152352 A1 | 10/2015 |

* cited by examiner (a)

(b)

(a)

(b)

ADHESIVE SHEET, AND ADHESIVE SHEET PRODUCTION METHOD

TECHNICAL FIELD

The present invention relates to a pressure sensitive adhesive sheet and a method for producing a pressure sensitive adhesive sheet.

BACKGROUND ART

A general pressure sensitive adhesive sheet is constituted of a substrate, a pressure sensitive adhesive layer formed on the substrate, and a release material provided on the pressure sensitive adhesive layer depending on necessity, and in use, after removing the release material in the case where the release material is provided, the general pressure sensitive adhesive sheet is attached to an adherend by bringing the pressure sensitive adhesive layer into contact therewith.

A pressure sensitive adhesive sheet having a large attaching area, which may be used for identification or decoration, masking for painting, surface protection of a metal plate or the like, and the like, has a problem that in attaching the sheet to an adherend, air accumulation is liable to occur between the pressure sensitive adhesive layer and the adherend, and the portion with the air accumulation is recognized as "blister", so as to prevent the pressure sensitive adhesive sheet from being attached cleanly to the adherend.

For solving the problem, for example, PTL 1 describes a pressure sensitive adhesive sheet having grooves with a specified shape that are disposed artificially in a prescribed pattern on the surface of the pressure sensitive adhesive layer by making a release material having a fine emboss pattern into contact with the surface of the pressure sensitive adhesive layer.

There is described that, by using the pressure sensitive adhesive sheet, it is possible to escape the "air accumulation" formed on attaching to an adherend, to the exterior through the grooves formed artificially on the surface of the pressure sensitive adhesive layer.

CITATION LIST

Patent Literature

PTL 1: JP 2001-507732 A

SUMMARY OF INVENTION

Technical Problem

However, the pressure sensitive adhesive sheet having a pressure sensitive adhesive layer having grooves with a specified shape disposed in a predetermined pattern, as described in PTL 1, etc., has a problem that when the width of the grooves is small, it is difficult to vent the air, and when the width of the grooves is large, not only the surface of the substrate is dented to deteriorate the appearance, but also the pressure sensitive adhesive strength is lowered.

In the pressure sensitive adhesive sheet, the grooves disposed in a prescribed pattern deteriorate the pressure sensitive adhesive strength locally in the site having the grooves disposed, and in attaching the pressure sensitive adhesive sheet to an adherend, there is a possibility that the sheet is detached therefrom in the foregoing site.

On the other hand, in the case where the pressure sensitive adhesive sheet is attached to an adherend and then peeled again therefrom, there is a possibility of adhesive deposits remaining on the adherend depending on the peeling direction of the pressure sensitive adhesive sheet because the pressure sensitive adhesion characteristics of the pressure sensitive adhesive sheet vary locally. For example, in the case where the pressure sensitive adhesive sheet having the pressure sensitive adhesive layer wherein the grooves of a lattice pattern are disposed is peeled obliquely, there is a possibility of adhesive deposits remaining on the adherend.

Furthermore, in the case where the pressure sensitive adhesive sheet is punched out, there is a concern that the disposition pattern of the grooves overlaps the punching pattern. In this case, the cutting depth may fluctuate to cause a problem that a cut line cannot be suitably formed in the pressure sensitive adhesive sheet.

In general, furthermore, there are cases where for facilitating the peeling of a release material provided on a pressure sensitive adhesive sheet, a step of slitting only the release material to provide a trigger for peeling (i.e., a so-called release liner slitting process) is performed. In the case where the step is performed, in general, the release material is once peeled off from the pressure sensitive adhesive sheet, and after slitting the release material, the release material is again laminated with the pressure sensitive adhesive layer of the pressure sensitive adhesive sheet.

However, in the pressure sensitive adhesive sheet described in PTL 1, on laminating again the release material with the pressure sensitive adhesive layer, due to the use of the embossed liner as the release material, the pressure sensitive adhesive layer is difficult to follow the emboss pattern of the release material, and thus another release material having no emboss pattern is necessarily provided.

Furthermore, for forming a fine structure on the pressure sensitive adhesive layer, PTL 1 employs a method of once forming a pressure sensitive adhesive layer by coating a pressure sensitive adhesive on an embossed liner, and then laminating the pressure sensitive adhesive layer with a substrate (i.e., a so-called transfer coating method). However, when a substrate having a low polarity surface, such as a polyolefin substrate, is used, sufficient adhesion cannot be obtained at the interface between the substrate and the pressure sensitive adhesive layer.

Moreover, a fine emboss pattern is difficult to form on a pressure sensitive adhesive layer with a release material formed of a resin film, as different from a release material formed of paper or the like.

In addition, the pressure sensitive adhesive sheet described in PTL 1 has a problem that due to the poor blister resistance thereof, blister tends to occur in use under a high temperature.

An object of the present invention is to provide a pressure sensitive adhesive sheet that has such excellent air escape property that air accumulation formed on adhering to an adherend can be easily removed, and is good in blister resistance and pressure sensitive adhesion characteristics.

Solution to Problem

The present inventors have found that the problem can be solved by a pressure sensitive adhesive sheet including a resin layer that contains a resin part (X) containing a carbon atom-containing resin having a carbon atom in a main chain of a constitutional unit and a particle part (Y) consisting of fine particles containing silica particles, and has a concave portion and a flat face existing on a surface having pressure sensitive adhesiveness, in which prescribed regions of each of the concave portion and a flat portion having the flat face, or a prescribed region of the concave portion has a ratio of silica particles in a particular range, and thus the present invention has been completed.

Specifically, the present invention provides the following items [1] to [24].

[1] A pressure sensitive adhesive sheet including, on a substrate or a release material, a resin layer that contains a resin part (X) containing a carbon atom-containing resin having a carbon atom in a main chain of a constitutional unit as a main component, and a particle part (Y) consisting of fine particles containing silica particles, at least a surface ($\alpha$) of the resin layer opposite to the side having the substrate or the release material provided having pressure sensitive adhesiveness, wherein a concave portion and a flat face exist on the surface ($\alpha$);

in at least one cross section (P1) of two cross sections of the pressure sensitive adhesive sheet resulting from freely-selecting a region (P) surrounded by a square having an edge length of 5 mm on the surface ($\alpha$) and cutting the region (P) in the thickness direction with a plane surface going through each of two diagonal lines of the square and being perpendicular to the region (P) on the surface ($\alpha$), a concave portion having a maximum height difference of 40% or more of a total thickness of the resin layer, and a flat portion corresponding to a cut portion of the flat face existing in the region (P) and being substantially in parallel to a surface of the substrate or the release material in contact with the resin layer exist on the side of the surface ($\alpha$) of the cross section (P1); and an absolute value of a ratio ($S_{EDX}/T_{EDX}$) of a value ($S_{EDX}$) of an intensity ratio Si/C of a peak intensity (Si) derived from silicon atoms and a peak intensity (C) derived from carbon atoms measured by energy dispersive X-ray analysis for a prescribed region (S) that is positioned under in a thickness direction with respect to one of the concave portion existing on the cross section (P1) and a value ($T_{EDX}$) of the intensity ratio Si/C measured by energy dispersive X-ray analysis for a prescribed region (T) that is positioned under in a thickness direction with respect to one of the flat portion existing on the cross section (P1) and has the same length in a horizontal direction as the region (S) is 0.2 or less.

[2] The pressure sensitive adhesive sheet according to the item [1], wherein the value ($S_{EDX}$) of Si/C in the prescribed region (S) is 0.01 or less.

[3] A pressure sensitive adhesive sheet including, on a substrate or a release material, a resin layer that contains a resin part (X) containing a carbon atom-containing resin having a carbon atom in a main chain of a constitutional unit as a main component, and a particle part (Y) consisting of fine particles containing silica particles, at least a surface ($\alpha$) of the resin layer opposite to the side having the substrate or the release material provided having pressure sensitive adhesiveness, wherein a concave portion and a flat face exist on the surface ($\alpha$);

in at least one cross section (P1) of two cross sections of the pressure sensitive adhesive sheet resulting from freely-selecting a region (P) surrounded by a square having an edge length of 5 mm on the surface ($\alpha$) and cutting the region (P) in the thickness direction with a plane surface going through each of two diagonal lines of the square and being perpendicular to the region (P) on the surface ($\alpha$), a concave portion having a maximum height difference of 40% or more of a total thickness of the resin layer, and a flat portion corresponding to a cut portion of the flat face existing in the region (P) and being substantially in parallel to a surface of the substrate or the release material in contact with the resin layer exist on the side of the surface ($\alpha$) of the cross section (P1); and a value ($S_{EDX}$) of an intensity ratio Si/C of a peak intensity (Si) derived from silicon atoms and a peak intensity (C) derived from carbon atoms measured by energy dispersive X-ray analysis for a prescribed region (S) that is positioned under in a thickness direction with respect to one of the concave portion existing on the cross section (P1) is 0.01 or less.

[4] The pressure sensitive adhesive sheet according to the item [3], wherein an absolute value of a ratio ($S_{EDX}/T_{EDX}$) of the value ($S_{EDX}$) and a value ($T_{EDX}$) of the intensity ratio Si/C measured by energy dispersive X-ray analysis for a prescribed region (T) that is positioned under in a thickness direction with respect to one of the flat portion existing on the cross section (P1) and has the same length in a horizontal direction as the region (S) is 0.2 or less.

[5] The pressure sensitive adhesive sheet according to any one of the items [1] to [4], wherein the value ($T_{EDX}$) of the intensity ratio Si/C of the prescribed region (T) is more than 0.01.

[6] The pressure sensitive adhesive sheet according to any one of the items [1] to [5], wherein plural concave portions each having a maximum height difference of 40% or more of a total thickness of the resin layer and being different in shape from each other exist on the side of the surface ($\alpha$) of the cross section (P1).

[7] The pressure sensitive adhesive sheet according to any one of the items [1] to [6], wherein the flat face has an irregular shape on observation from the side of the surface ($\alpha$).

[8] The pressure sensitive adhesive sheet according to any one of the items [1] to [7], wherein plural flat portions exist on the side of the surface ($\alpha$) of the cross section (P1).

[9] The pressure sensitive adhesive sheet according to the item [8], wherein positions of the plural flat portions existing on the side of the surface ($\alpha$) on the cross section (P1) have no periodicity.

[10] The pressure sensitive adhesive sheet according to the item [8] or [9], wherein distances of each of the plural flat portions existing on the side of the surface ($\alpha$) on the cross section (P1) to the substrate or the release material are substantially the same as each other.

[11] The pressure sensitive adhesive sheet according to any one of the items [1] to [10], wherein the concave portion has a maximum height difference of 0.5 μm or more.

[12] The pressure sensitive adhesive sheet according to any one of the items [1] to [11], wherein one or more flat faces (f1) having such an area that a region surrounded by a circle having a diameter of at least 100 μm is selectable exist on the surface ($\alpha$) of the resin layer.

[13] The pressure sensitive adhesive sheet according to any one of the items [1] to [12], wherein one or more flat faces (f2) having an area of 0.2 mm$^2$ or more exist on the surface ($\alpha$) of the resin layer.

[14] The pressure sensitive adhesive sheet according to any one of the items [1] to [13], wherein the concave portion is not one formed using a release material having an emboss pattern.

[15] The pressure sensitive adhesive sheet according to the item [13] or [14], wherein a mass retention rate after heating the resin layer to 800° C. for 30 minutes of 3 to 90% by mass.

[16] The pressure sensitive adhesive sheet according to any one of the items [13] to [15], wherein the carbon atom-containing resin contained in the resin part (X) contains a pressure sensitive adhesive resin.

[17] The pressure sensitive adhesive sheet according to any one of the items [1] to [16], wherein the resin part (X) further contains at least one selected from a metal chelate crosslinking agent and an epoxy crosslinking agent.

[18] The pressure sensitive adhesive sheet according to any one of the items [1] to [17], wherein the surface (β) of the resin layer on the side on which the substrate or the release material is provided has pressure sensitive adhesiveness.

[19] The pressure sensitive adhesive sheet according to the item [18], wherein the resin layer is provided on the release material.

[20] The pressure sensitive adhesive sheet according to any one of the items [1] to [19], wherein the resin layer is a multilayer structure containing at least a layer (Xβ) mainly containing the resin part (X) containing a carbon atom-containing resin having a carbon atom in a main chain of a constitutional unit as a main component, a layer (Y1) containing 15% by mass or more of the particle part (Y) consisting of fine particles containing silica particles, and a layer (Xα) mainly containing the resin part (X) containing a carbon atom-containing resin having a carbon atom in a main chain of a constitutional unit as a main component, laminated in this order from the side having the substrate or the release material provided.

[21] The pressure sensitive adhesive sheet according to the item [20], wherein the layer (Xβ) is a layer formed by a composition (xβ) containing a carbon atom-containing resin having a carbon atom in a main chain of a constitutional unit and having a content of silica particles of less than 15% by mass, the layer (Y1) is a layer formed by a composition (y) containing silica particles in an amount of 15% by mass or more, and the layer (Xα) is a layer formed by a composition (xα) containing a carbon atom-containing resin having a carbon atom in a main chain of a constitutional unit and having a content of fine particles of less than 15% by mass.

[22] A method for producing the pressure sensitive adhesive sheet according to any one of the items [1] to [19], which includes the following steps (1) and (2):

step (1): a step of forming a coating film (χ') formed by a composition (x) containing a carbon atom-containing resin having a carbon atom in a main chain of a constitutional unit and having a content of silica particles of less than 15% by mass, and a coating film (y') formed by a composition (y) containing silica particles in an amount of 15% by mass or more, and step (2): a step of simultaneously drying the coating film (x') and the coating film (y') formed in the step (1).

[23] A method for producing the pressure sensitive adhesive sheet according to the item [21], which includes the following steps (1A) and (2A):

step (1A): a step of forming, on a substrate or a release material, a coating film (xβ') formed by a composition (xβ) containing a carbon atom-containing resin having a carbon atom in a main chain of a constitutional unit and having a content of fine particles of less than 15% by mass, a coating film (y') formed by a composition (y) containing the silica particles in an amount of 15% by mass or more, and a coating film (xα') formed by a composition (xα) containing a carbon atom-containing resin having a carbon atom in a main chain of a constitutional unit and having a content of silica particles of less than 15% by mass by laminating in this order, and step (2A): a step of simultaneously drying the coating film (xβ'), the coating film (y'), and the coating film (xα') formed in the step (1A).

[24] A method for producing the pressure sensitive adhesive sheet according to the item [21], which includes the following steps (1B) and (2B):

step (1B): a step of forming, on a layer (Xβ) mainly containing a resin part (X) provided on a substrate or a release material, a coating film (y') formed by a composition (y) containing the silica particles in an amount of 15% by mass or more, and a coating film (xα') formed by a composition (xα) containing a carbon atom-containing resin having a carbon atom in a main chain of a constitutional unit and having a content of silica particles of less than 15% by mass by laminating in this order, and step (2B): a step of simultaneously drying the coating film (y') and the coating film (xα') formed in the step (1B).

Advantageous Effects of Invention

The pressure sensitive adhesive sheet of the present invention has such excellent air escape property that air accumulation formed on adhering to an adherend can be easily removed, and is good in pressure sensitive adhesion characteristics.

DESCRIPTION OF EMBODIMENTS

Figure 1:
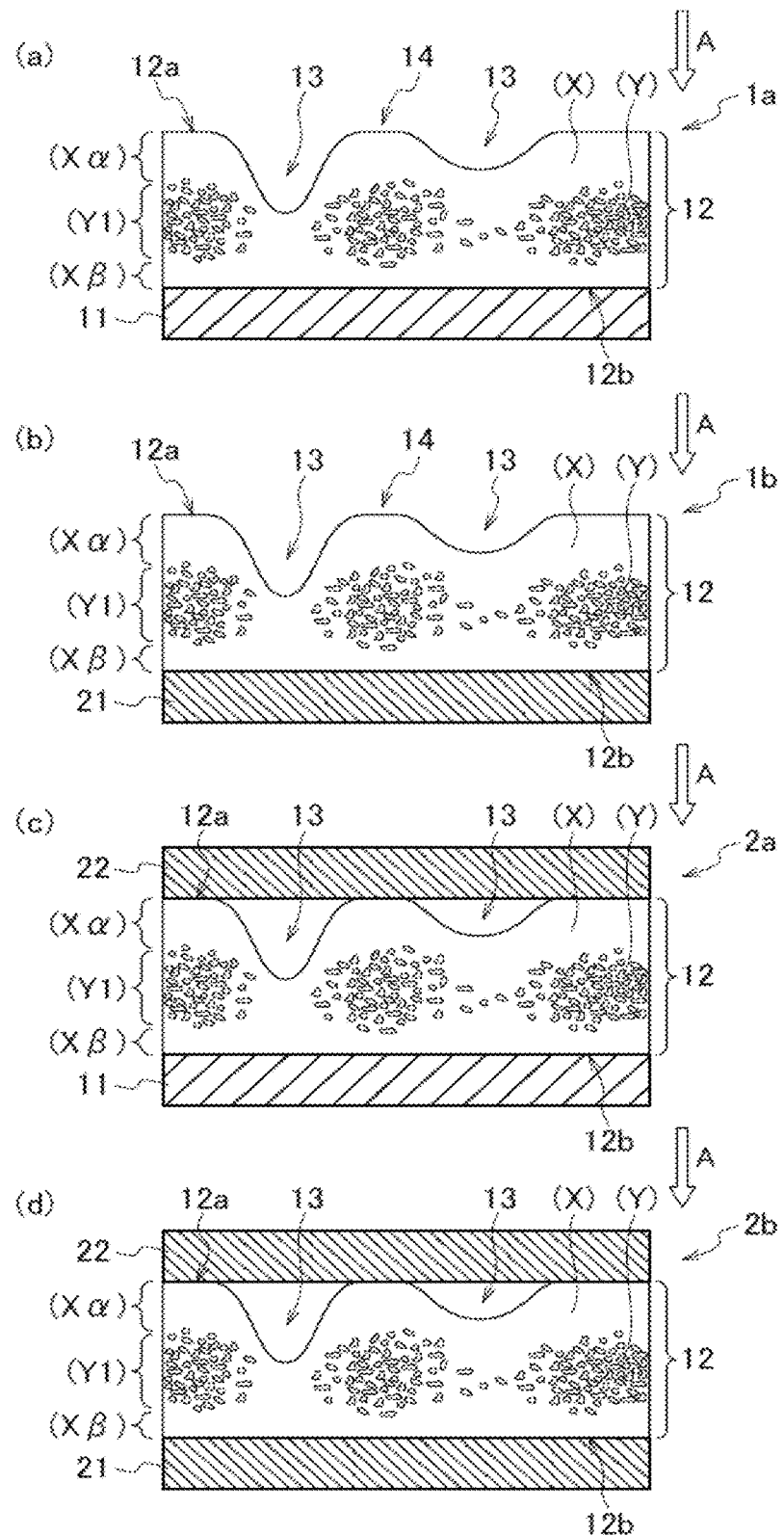
FIG. 1 is a schematic cross sectional view of a pressure sensitive adhesive sheet showing an example of the structure of the pressure sensitive adhesive sheet of the present invention.

In the present invention, for example, an expression "YY containing a component XX as a main component" or an expression "YY mainly containing a component XX" means that "among the components contained in YY, a component having a largest content is the component XX". A specific content of the component XX in this expression is typically 50% by mass or more, and is preferably 65 to 100% by mass, more preferably 75 to 100% by mass, and still more preferably 85 to 100% by mass relative to the total amount (100% by mass) of YY.

In the present invention, for example, "(meth)acrylic acid" indicates both "acrylic acid" and "methacrylic acid", and the same is also applicable to other analogous terms.

Regarding a preferred numerical range (for example, a range of content or the like), a lower limit and an upper limit that are expressed in stages can be combined each independently. For example, from an expression of "preferably 10 to 90, and more preferably 30 to 60", "the preferred lower limit (10)" and "the more preferred upper limit (60)" may be combined to be "10 to 60".

In the present invention, the "carbon atom-containing resin having a carbon atom in a main chain of a constitutional unit (which may be hereinafter referred simply to a "carbon atom-containing resin")" includes a resin having an atom other than a carbon atom in the main chain of the constitutional unit (for example, a urethane resin and the like), but does not include a resin having no carbon atom in the main chain of the constitutional unit (for example, a silicone resin and the like).

[Configuration of Pressure Sensitive Adhesive Sheet of Present Invention]

The pressure sensitive adhesive sheet of the present invention includes a substrate or a release material having thereon a resin layer, at least a surface (α) of the resin layer opposite to the side having the substrate or the release material provided has pressure sensitive adhesiveness, and the surface (α) has a concave portion and a flat face existing thereon.

FIG. 1 is a schematic cross sectional view of a pressure sensitive adhesive sheet showing an example of the structure of the pressure sensitive adhesive sheet of the present invention.

Examples of the pressure sensitive adhesive sheet of one embodiment of the present invention include a pressure sensitive adhesive sheet 1a having a resin layer 12 on a substrate 11 as shown in FIG. 1(a) and a pressure sensitive adhesive sheet 1b having a resin layer 12 on a release material 21 as shown in FIG. 1(b).

In the pressure sensitive adhesive sheet of the present invention, at least a surface (α) 12a of the resin layer 12 opposite to the side having the substrate 11 or the release material 21 provided (which may be hereinafter referred simply to as a "surface (α)") has pressure sensitive adhesiveness, and has a concave portion 13 and a flat face 14 existing thereon.

Accordingly, from the viewpoint of handleability, the pressure sensitive adhesive sheet of another embodiment of the present invention preferably has a configuration of a pressure sensitive adhesive sheet 2a or 2b as shown in FIG. 1(c) or FIG. 1(d), in which a release material 22 is further provided on the surface (α) 12a of the resin layer 12 in the pressure sensitive adhesive sheet 1a or 1b as shown in FIG. 1.

In the pressure sensitive adhesive sheet of one embodiment of the present invention, as shown in FIG. 1, the resin layer 12 preferably contains a resin part (X) containing a carbon atom-containing resin as a main component and a particle part (Y) consisting of fine particles containing silica particles.

When the resin layer 12 contains a particle part (Y), the shape retentivity after adhering can be enhanced, and in the case where the resulting pressure sensitive adhesive sheet is used under a high temperature, the occurrence of blister can be effectively suppressed.

The details of the resin part (X) containing a carbon atom-containing resin as a main component and the particle part (Y) will be described in detail later.

In the pressure sensitive adhesive sheet of one embodiment of the present invention, a surface (β) 12b of the resin layer 12 on the side having the substrate 11 or the release material 21 provided (which may be hereinafter referred simply to as a "surface (β)") may also have pressure sensitive adhesiveness.

When the surface (β) also has pressure sensitive adhesiveness, the adhesiveness between the resin layer 12 and the substrate 11 can be good for the pressure sensitive adhesive sheets 1a and 2a shown in FIGS. 1(a) and 1(c), and a double-sided pressure sensitive adhesive sheet can be provided for the pressure sensitive adhesive sheets 1b and 2b shown in FIGS. 1(b) and 1(d).

[Requirement Relating to Concave Portion and Flat Face Existing on Surface (a)]

In the pressure sensitive adhesive sheet of the present invention, the concave portion 13 and the flat face 14 exist on the surface (α) 12a of the resin layer 12 as shown in FIGS. 1(a) to 1(d).

The concave portion 13 existing on the surface (α) plays a role of air-discharge channels for drawing the "air accumulation" out to be formed in adhering the surface (α) of the resin layer of the pressure sensitive adhesive sheet of the present invention to an adherend.

The flat face 14 existing on the surface (α) of the resin layer is a face coming into direct contact with the adherend and adhering closely thereto in adhering to the adherend, and is a site influencing the pressure sensitive adhesive strength of the pressure sensitive adhesive sheet.

Figure 2:
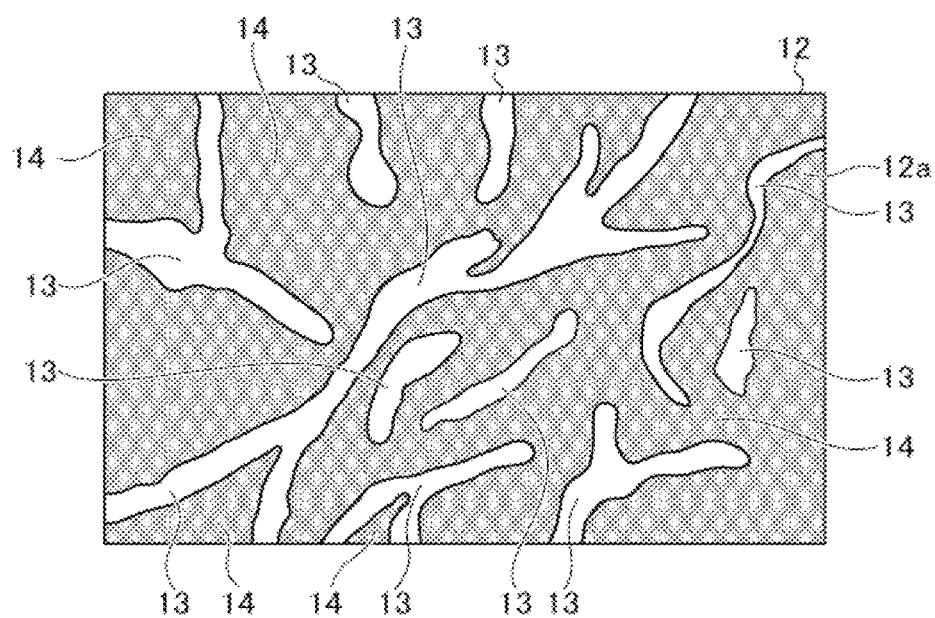
FIG. 2 is a schematic planar view of the surface (α) on observation of the resin layer of the pressure sensitive adhesive sheet of the present invention from the side of the surface (α).

FIG. 2 is a schematic planar view of the surface (α) on observation of the resin layer of the pressure sensitive adhesive sheet of the present invention from the side of the surface (α).

The concave portion existing on the surface (α) of the resin layer is preferably a concave portion 13 having an irregular shape as shown in FIG. 2, and a concave portion having a regular shape may exist.

However, in one embodiment of the present invention, at least one concave portion 13 having an irregular shape preferably exists on the surface (α) 12a of the resin layer 12, and plural concave portions 13 having an irregular shape more preferably exist thereon, as shown in FIG. 2.

When a concave portion having an irregular shape exists on the surface (α) of the resin layer, the pressure sensitive adhesive sheet can have the air escaping property and the pressure sensitive adhesion characteristics that are further enhanced with good balance.

When plural concave portions having an irregular shape exist, even though the shape of a part of the concave portions existing on the surface (α) is collapsed, the concave portion 13 retaining the shape thereof can readily exist on the surface (α), thereby preventing the air-discharge channels from being expunged.

The length of the concave portion 13 existing on the surface (α) in a planar view of the concave portion 13 is not particularly limited. Specifically, the concave portion 13 includes a relatively long groove-like one and a relatively short pit-like one.

In one embodiment of the present invention, the shape of the flat face 14 observed from the side of the surface (α) 12a of the resin layer 12 is preferably an irregular shape as shown in FIG. 2.

The flat face existing on the surface (α) of the resin layer may include a flat face 14 having an irregular shape and a flat shape having a regular shape, and plural irregular flat faces 14 preferably exist.

When a flat face having an irregular shape exists on the surface (α) of the resin layer, as different from a surface of a pressure sensitive adhesive layer formed with an ordinary release sheet having an emboss pattern, the occurrence of a local site having weak pressure sensitive adhesive strength and a local site having deteriorated air escape property can be decreased without limit. As a result, the surface (α) of the resin layer can uniformly exhibit excellent air escape property and excellent pressure sensitive adhesion characteristics.

In the present invention, the term "irregular shape" does not mean a regular shape, such as a figure capable of drawing a center of a circle, an oval, or the like, a polygon, etc., but refers to a shape in which no regularity is present in the form, and no similarity is found in individual shapes. Specifically, the shapes of the concave portions 13 and the flat faces 14 as shown in FIG. 2 are corresponding thereto.

On the other hand, examples of the "regular shape" but not the "irregular shape" include a circle, an oval, a polygon, and the like. In addition, in the present specification, the "polygon" refers to a figure capable of drawing diagonal lines in the inside thereof (without being protruded outside) and being surrounded by straight lines in which the sum of interior angles is 180×n (degrees) (n is a natural number). The polygon also includes one in which an edge part thereof has a round-shaped curvature.

In the present invention, the judgement as to whether or not a concave portion or a flat face having an "irregular shape" exists on the surface (α) of the resin layer is basically performed by observing the shape of the flat face or the concave portion as the observation target from the side of the surface (α) of the resin layer visually or with a digital microscope (magnification: 30 to 100).

Figure 6:
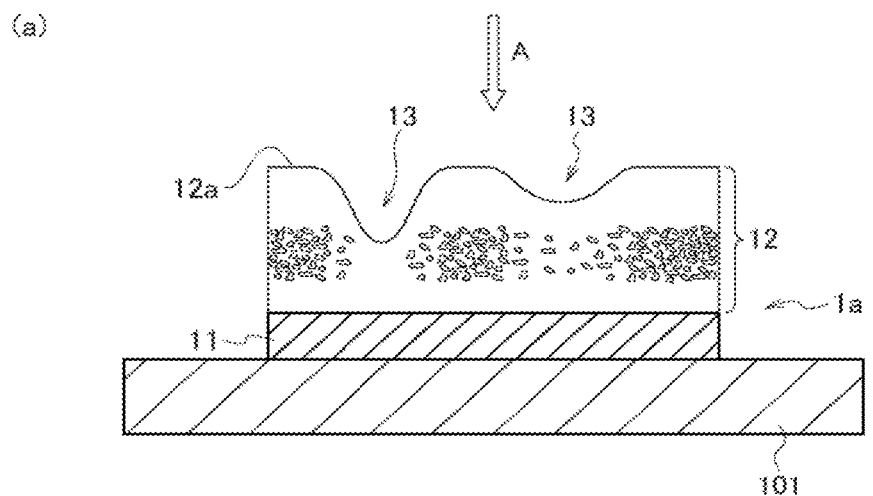
FIG. 6 is a schematic cross sectional view of a measurement sample used for observation of the surface (α) of the resin layer of the pressure sensitive adhesive sheet produced in Examples and Comparative Examples.
Figure 6:
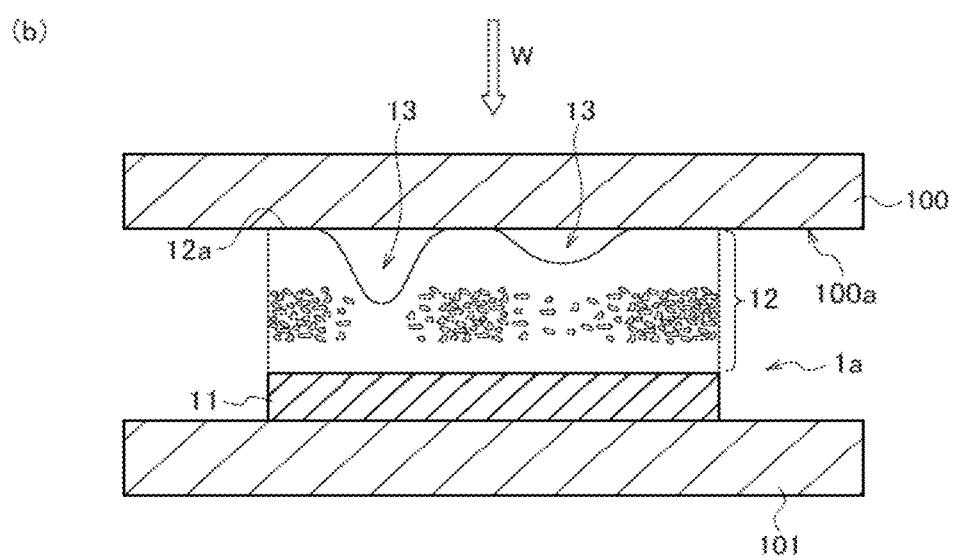

In the case where a digital microscope is used, for example, it is appropriate that as shown in FIG. 6, the focal point is gradually moved in the direction A from above of the site on the surface (α) 12a that is considered to have a flat face visually, and a portion that firstly comes into focus is observed as a flat face.

In the case where no portion that comes into focus is obtained, the judgement as to whether or not a concave portion or a flat face exists can be made by such a method that as shown in FIG. 6(b), a translucent adherend 100 having a smooth surface 100a is adhered to the surface (α) 12a of the resin layer with a squeeze while preventing as much as possible load from being applied thereto, and the surface (α) 12a of the resin layer is observed with a digital microscope from the direction W through the translucent adherend 100. That is, a portion of the surface (α) that is in contact with the smooth surface 100a can be judged as a "flat face", whereas a portion of the surface (α) that is not in contact with the smooth surface 100*a* can be judged as a "concave portion".

However, the judgement may also be performed in such a manner that 1 to 10 regions (D) each surrounded by a rectangle having a size of 8 mm in length×10 mm in width that is freely-selected on the surface (α) are selected, and a shape of a concave portion or a flat face existing in each of the selected regions (D) is observed visually or with a digital microscope (magnification: 30 to 100) from the side of the surface (α). Specifically, when a concave portion or a flat face having an irregular shape exist in all of the selected regions, it may be assumed that "a concave portion or a flat face having an irregular shape exists on the surface (α)". Similarly, when plural concave portions or plural flat faces having an irregular shape exist in all of the selected regions, it may be assumed that "plural concave portions or plural flat faces having an irregular shape exist on the surface (α)".

In the observation of the region (D), the whole area of the selected region (D) may be observed at one time with a digital microscope at a low magnification.

While the selected region (D) may be observed with a digital microscope at a high magnification, there may be a case where the region (D) is larger than the photographable area of the digital microscope. In this case, the aforementioned judgement may be performed in such a manner that by utilizing the image connecting function of the digital microscope, freely-selected adjacent regions are photographed to provide plural images adjacent to each other, the plural images are connected to provide a connected image, and a region surrounded by a rectangle having a size of 8 mm in length×10 mm in width that is freely-selected on the connected image is used as the region (D).

In the description hereinbelow, in the case where a selected region is observed with a digital microscope for the judgement as to whether or not a certain requirement is satisfied, the judgment as to whether or not the requirement is satisfied may be performed with a connected image as similar to the above.

In the description herein, examples of the digital microscope used for observing various shapes include "Digital Microscope VHX-1000" and "Digital Microscope VHX-5000", product names, produced by Keyence Corporation.

The observation of various shapes may be performed by a method of observing the surface (α) directly with a digital microscope at the aforementioned magnification, or may be performed by such a method that an image is acquired with a digital microscope at the aforementioned magnification, and then a shape of a concave portion or a flat portion shown on the image is visually observed.

It is preferred that the shape of the concave portion having an irregular shape existing on the surface (α) can be visually recognized from the side of the surface (α).

Similarly, it is preferred that the shape of the flat face having an irregular shape existing on the surface (α) can be visually recognized from the side of the surface (α).

In the pressure sensitive adhesive sheet 2*a* or 2*b* having the release material 22 laminated on the surface (α) 12*a* of the resin layer 12 as shown in FIG. 1(*c*) or 1(*d*), the exposed surface (α) 12*a* after removing the release material 22 is visually observed.

In one embodiment of the present invention, the surface (α) may have a concave portion having a regular shape existing thereon, in addition to the concave portion 13 having an irregular shape.

However, the area ratio occupied by the concave portion having an irregular shape existing on the surface (α) is preferably 80 to 100%, more preferably 90 to 100%, further preferably 95 to 100%, and still further preferably 100%, with respect to the total area of the concave portion existing on the surface (α) as 100%.

In one embodiment of the present invention, the area ratio occupied by the concave portion having an irregular shape existing on the surface (α) is preferably 10 to 80%, more preferably 20 to 70%, further preferably 30 to 60%, and still further preferably 35 to 55%, with respect to the total area of the surface (α) as 100%.

Similarly, in one embodiment of the present invention, the surface (α) may have a flat face having a regular shape existing thereon, in addition to the flat face 14 having an irregular shape.

However, the area ratio occupied by the flat face having an irregular shape existing on the surface (α) is preferably 80 to 100%, more preferably 90 to 100%, further preferably 95 to 100%, and still further preferably 100%, with respect to the total area of the flat faces existing on the surface (α) as 100%.

In one embodiment of the present invention, the area ratio occupied by the flat face having an irregular shape existing on the surface (α) is preferably 20 to 90%, more preferably 30 to 80%, further preferably 40 to 70%, and still further preferably 45 to 65%, with respect to the total area of the surface (α) as 100%.

The aforementioned "area ratio occupied by the concave portion or the flat face" can be calculated in such a manner that an image of the surface (α) is acquired with a digital microscope (magnification: 30 to 100), and the image is subjected to an image processing (binarization process).

Such a manner may also be used that 1 to 10 regions (D) each surrounded by a rectangle having a size of 8 mm in length×10 mm in width that is freely-selected on the surface (α) are selected, images of the regions are acquired with a digital microscope (magnification: 30 to 100), values of the "area ratio occupied by the concave portion or the flat face" of the regions are calculated from the images, and the average of the values of the selected 1 to 10 regions is assumed to be the "area ratio occupied by the concave portion or the flat face" existing on the surface (α) of the resin layer of the target pressure sensitive adhesive sheet.

In one embodiment of the present invention, from the viewpoint of providing the pressure sensitive adhesive sheet having various characteristics, such as the air escape property and the pressure sensitive adhesion characteristics, that are enhanced in a well balanced manner, it is preferred that the shapes of the concave portion and the flat face existing on the surface (α) of the resin layer each do not have a shape becoming a fixed repeating unit.

In one embodiment of the present invention, from the viewpoint of providing the pressure sensitive adhesive sheet having various characteristics, such as the air escape property and the pressure sensitive adhesion characteristics, that are enhanced in a well balanced manner, it is preferred that plural concave portions exist on the surface (α) of the resin layer, and the positions where the plural concave portions exist have no periodicity. From the similar viewpoint, it is preferred that plural flat faces exist on the surface (α) of the resin layer, and the positions where the plural flat faces exist have no periodicity.

In the present invention, the state that "the positions where the plural concave portions or the plural flat faces exist have no periodicity" means that on the surface (α) of the resin layer, the positions where the plural concave portions or the plural flat faces exist have no fixed repeating pattern but is in a irregular (random) state.

The judgement as to whether or not "the shapes of the concave portion and the flat face each do not have a shape becoming a fixed repeating unit" and the judgement as to whether or not "the positions where the plural concave portions or the plural flat faces exist have no periodicity" can be made in the same manner as in the judgement "as to whether or not a concave portion or a flat face having an irregular shape exists on the surface (α) of the resin layer".

The particular requirement relating to the concave portion and the flat face existing on the surface (α) will be described.

<Particular Requirement Relating to Concave Portion Existing on Surface (α)>

In one embodiment of the present invention, it is preferred that at least one of the aforementioned concave portion exists in a region (Q) surrounded by a square having an edge length of 1 mm that is freely-selected on the surface (α) of the resin layer, and it is more preferred that plural concave portions exist therein.

When at least one of the concave portion exists in the region (Q), such a pressure sensitive adhesive sheet having various characteristics, such as the air escape property and the pressure sensitive adhesion characteristics, that are enhanced in a well balanced manner can be provided.

In one embodiment of the present invention, the concave portion 13 existing on the surface (α) 12a of the resin layer 12 preferably has a maximum height difference of 0.5 μm or more.

The "concave portion" defined herein designates a concave portion having a maximum height difference of 0.5 vim or more, in which it suffices that a position having a maximum height difference of 0.5 μm or more exists at any part of the concave portion, but the concave portion may not necessarily have a maximum height difference of 0.5 μm or more over the entire region thereof.

Figure 3:
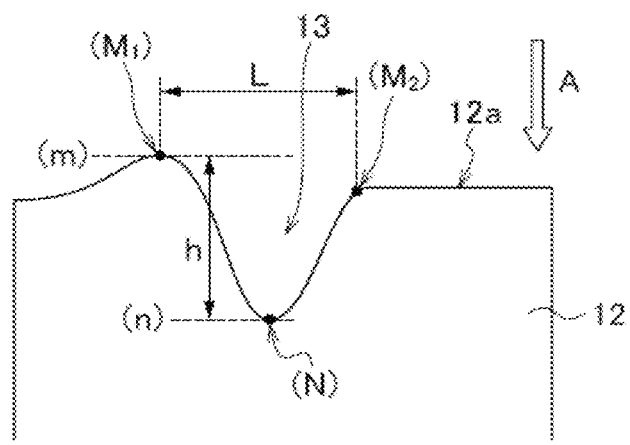
FIG. 3 is a schematic cross sectional view of a resin layer showing an example of the shape of the resin layer of the pressure sensitive adhesive sheet of the present invention on the side of the surface (α).
Figure 3:
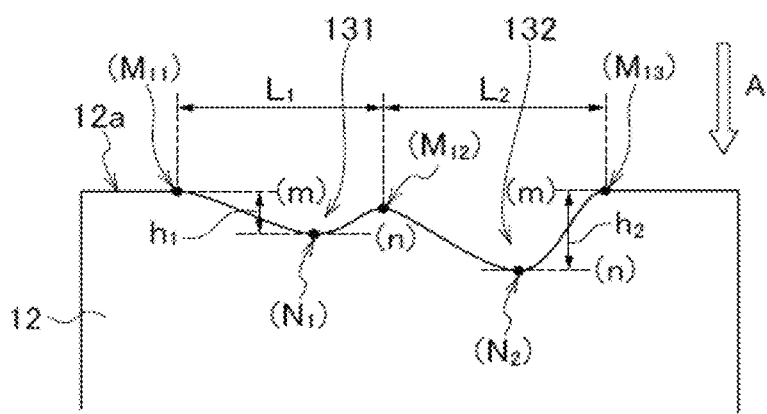

FIG. 3 is a schematic cross sectional view of a resin layer showing an example of the shape of the resin layer of the pressure sensitive adhesive sheet of the present invention on the side of the surface (α).

As shown as the concave portion 13 shown in FIG. 3(a), the concave portion generally has a shape having two mountain parts ($M_1$) and ($M_2$) and a valley part (N). The "maximum height difference" of the concave portion in the present invention means the length of the difference (h) between the highest position (m) of the two mountain parts ($M_1$) and ($M_2$) (in FIG. 3(a), the maximum point of the mountain part ($M_1$)) and the lowest position (n) thereof (in FIG. 3(a), the minimum point of the valley part (N)), in the thickness direction of the resin layer 12.

It is considered that the case shown in FIG. 3(b) has two concave portions including a concave portion 131 having two mountain parts ($M_{11}$) and ($M_{12}$) and a valley part ($N_1$), and a concave portion 132 having two mountain parts ($M_{12}$) and ($M_{13}$) and a valley part ($N_2$). In this case, the length of the difference ($h_1$) between the maximum point of the mountain part ($M_{11}$) and the minimum point of the valley part ($N_1$) indicates the maximum height difference of the concave portion 131, and the length of the difference ($h_2$) between the maximum point of the mountain part ($M_{13}$) and the minimum point of the valley part ($N_2$) indicates the maximum height difference of the concave portion 132.

From the viewpoint of improving the air escape property of the pressure sensitive adhesive sheet, the viewpoint of keeping the appearance of the pressure sensitive adhesive sheet good, and the viewpoint of the shape stability of the pressure sensitive adhesive sheet, the maximum height difference of one concave portion is preferably 1.0 μm or more and the thickness of the resin layer or less, more preferably 3.0 μm or more and the thickness of the resin layer or less, and further preferably 5.0 μm or more and the thickness of the resin layer or less.

From the viewpoint of improving the air escape property of the pressure sensitive adhesive sheet and the viewpoint of improving the pressure sensitive adhesiveness of the pressure sensitive adhesive sheet, the average value of the width of the concave portions is preferably 1 to 500 μm, more preferably 3 to 400 μm, and further preferably 5 to 300 μm.

In the present invention, the width of the concave portion means the distance between the maximum points of the two mountain parts, and in the concave portion 13 shown in FIG. 3(a), the width indicates the distance L between the mountain part ($M_1$) and the mountain part ($M_2$). In the concave portion 131 shown in FIG. 3(b), the width indicates the distance L1 between the mountain part ($M_{11}$) and the mountain part ($M_{12}$), and in the concave portion 132 therein, the width indicates the distance L2 between the mountain part ($M_{13}$) and the mountain part ($M_{12}$).

In the planar view of the pressure sensitive adhesive sheet of the present invention (the sheet viewed from directly above), when the concave portion has a long side and a short side, the short side is designated as the width.

From the viewpoint of improving the air escape property of the pressure sensitive adhesive sheet and the viewpoint of improving the pressure sensitive adhesiveness of the pressure sensitive adhesive sheet, the ratio of the maximum height difference to the average value of the width of one concave portion [(maximum height difference)/(average value of width)] (which is the ratio is "h/L" in the concave portion 13 shown in FIG. 3(a)) is preferably 1/500 to 100/1, more preferably 3/400 to 70/3, and further preferably 1/60 to 10/1.

<Particular Requirement Relating to Flat Face Existing on Surface (a)>

In one embodiment of the present invention, it is preferable that one or more flat faces (f1) having such an area that a region surrounded by a circle having a diameter of at least 100 μm (preferably a diameter of at least 150 μm, and more preferably a diameter of at least 200 μm) is selectable exist on the surface (α) of the resin layer, and it is more preferable that plural flat faces (f1) exist on the surface (α) of the resin layer.

When the flat face (f1) exists on the surface (α), the adhesive portion to an adherend can be sufficiently ensured on the surface (α), and thereby the adhesion to the adherend can be enhanced to provide a pressure sensitive adhesive sheet with a higher pressure sensitive adhesive strength.

In the aforementioned embodiment of the present invention, it is preferred that at least one flat face (f1) exists on a region (D) surrounded by a rectangle having a size of 8 mm in length×10 mm in width that is freely-selected on the surface (α) of the resin layer, and it is more preferred that plural flat faces (f1) exist thereon.

In the aforementioned embodiment of the present invention, it is not necessary that all of the flat faces existing on the surface (α) of the resin layer or in the region (D) correspond to the flat face (f1), and it suffices that the flat faces existing on the surface (α) of the resin layer or in the region (D) contain the flat face (f1).

In one embodiment of the present invention, it is preferable that one or more flat faces (f2) having an area of 0.2 $mm^2$ or more (preferably 0.3 $mm^2$ or more, and more preferably 0.4 $mm^2$ or more) exist on the surface (α) of the resin layer, and it is more preferable that plural flat faces (f2) exist on the surface (α) of the resin layer.

When the flat face (f2) exists on the surface (α), the adhesive portion to an adherend can be sufficiently ensured on the surface (α), and thereby the adhesion to the adherend can be enhanced to provide a pressure sensitive adhesive sheet with a higher pressure sensitive adhesive strength.

In the aforementioned embodiment of the present invention, it is preferred that at least one flat face (f2) exists on a region (D) surrounded by a rectangle having a size of 8 mm in length×10 mm in width that is freely-selected on the surface (α) of the resin layer, and it is more preferred that plural flat faces (f2) exist thereon.

In the aforementioned embodiment of the present invention, it is not necessary that all of the flat faces existing on the surface (α) of the resin layer or in the region (D) correspond to the flat face (f2), and it suffices that the flat faces existing on the surface (α) of the resin layer or in the region (D) contain the flat face (f2).

It is preferred that at least one flat face (f12) that corresponds to both the flat faces (f1) and (f2) exists on the surface (α) of the resin layer or a region (D) surrounded by a rectangle having a size of 8 mm in length×10 mm in width that is freely-selected on the surface (α) of the resin layer, and it is more preferred that plural flat faces (f12) exist thereon.

In the present invention, the judgement as to whether or not the flat faces (f1), (f2), and (f12) exist on the surface (α) or the region (D) may be performed in such a manner that the flat faces existing on the surface (α) of the resin layer or the region (D) of the target pressure sensitive adhesive sheet are observed with a digital microscope (magnification: 30 to 100) to acquire an image, and the judgement as to whether or not a region surrounded by a circle having a diameter of 100 μm is selectable, and the calculation of the area of the flat face can be performed based on the image by using an image processing software.

[Requirement Relating to Cross Section (P1)]

In the pressure sensitive adhesive sheet of the present invention, in at least one cross section (P1) of two cross sections of the pressure sensitive adhesive sheet resulting from freely-selecting a region (P) surrounded by a square having an edge length of 5 mm on the surface (α) and cutting the region (P) in the thickness direction with a plane surface going through each of two diagonal lines of the square and being perpendicular to the region (P) on the surface (α), a concave portion that satisfies the following requirement (I) and a flat portion that satisfies the following requirement (II) exist.

Requirement (I): The cross section (P1) has existing on the side of the surface (α) a concave portion having a maximum height difference of 40% or more of the total thickness of the resin layer.

Requirement (II): The cross section (P1) has existing on the side of the surface (α) a flat portion corresponding to a cut portion of the flat face existing in the region (P) and being substantially in parallel to the surface of the substrate or the release material in contact with the resin layer.

The workflow until the "two cross sections of the pressure sensitive adhesive sheet" are obtained will be described with reference to FIG. 4.

Figure 4:
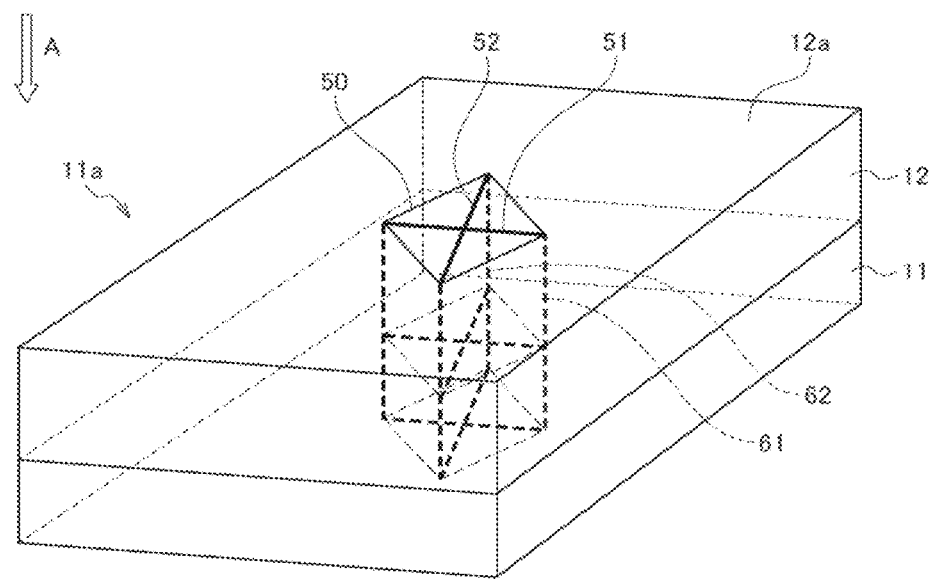
FIG. 4 is an illustration for describing a method for obtaining the "two cross sections of the pressure sensitive adhesive sheet" defined in the present invention, and is a perspective view of the pressure sensitive adhesive sheet of one embodiment of the present invention.

FIG. 4 is an illustration for describing a method for obtaining the "two cross sections of the pressure sensitive adhesive sheet" defined in the present invention, and is a perspective view of the pressure sensitive adhesive sheet of one embodiment of the present invention. FIG. 4 shows, for example, a perspective view of a pressure sensitive adhesive sheet 11a having the same structure as the pressure sensitive adhesive sheet 1a shown in FIG. 1(a), and indication of the concave portion and the flat face existing on the surface (α) 12a of the resin layer 12 is omitted.

Firstly, a region (P) surrounded by a square 50 having an edge length of 5 mm is freely-selected on the surface (α) 12a of the resin layer 12. At this time, for the region (P) to be selected, there is no limitation in the selecting position thereof on the surface (α) 12a, the direction of the square 50 constituting the selected region (P), and the like.

Then, the pressure sensitive adhesive sheet is cut in the thickness direction with planar surfaces that pass through two diagonal lines 51 and 52 of the square 50 constituting the region (P) respectively and are perpendicular to the surface (α) 12a, thereby providing two cross sections 61 and 62, which are considered herein.

Specifically, in the case where the pressure sensitive adhesive sheet is cut in the thickness direction A with the planar surface that passes through the diagonal line 51 and is perpendicular to the surface (α) 12a, the cross section 61 is obtained.

In the case where the pressure sensitive adhesive sheet is cut in the thickness direction A with the planar surface that passes through the diagonal line 52 and is perpendicular to the surface (α) 12a, the cross section 62 is obtained.

In the present invention, for the two cross sections 61 and 62 obtained above, the cross section that has plural concave portions that satisfy the requirement (I) and a flat portion that satisfies the requirement (II) existing thereon is referred to as a "cross section (P1)".

In the present invention, at least one of the cross sections 61 and 62 necessarily corresponds to the cross section (P1) having a concave portion that satisfies the requirement (I) and a flat portion that satisfies the requirement (II) existing thereon.

In one embodiment of the present invention, both the two cross sections 61 and 62 correspond to the cross section (P1).

In the present invention, the judgement as to whether or not the two cross sections 61 and 62 correspond to the cross section (P1) having a concave portion that satisfies the requirement (I) and a flat portion that satisfies the requirement (II) existing thereon and the judgement as to whether or not the two cross sections satisfy the requirements described later for the cross section (P1) may be performed with an image acquired by observing the target cross section with a digital microscope (magnification: 100 to 1,000).

Figure 5:
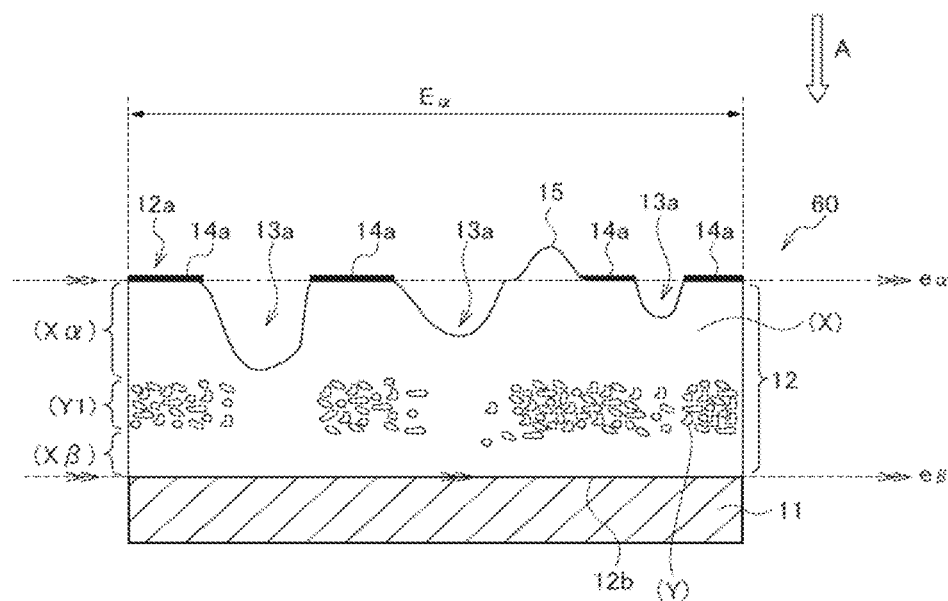
FIG. 5 is an example of a schematic illustration of the cross section (P1) defined in the present invention.

FIG. 5 is an example of a schematic illustration of the cross section (P1) defined in the present invention.

As shown in FIG. 5, on the cross section (P1) 60 obtained in the aforementioned manner, at least a concave portion 13a and a flat portion 14a exist on on the cross section (P1) 60 on the side of the surface (α) 12a.

As shown in FIG. 5, on the cross section (P1) 60 on the side of the surface (α) 12a, a convex portion 15 may exist that protrudes from the flat portion 14a and is not substantially in parallel to the straight line $e_\beta$ passing through the surface of the substrate 11 (or the release material) in contact with the resin layer 12.

On the cross section (P1) 60, according to the requirement (I), a concave portion having a maximum height difference of 40% or more of the total thickness of the resin layer 12 exists on the side of the surface (α) 12a of the cross section.

It is preferred that plural concave portions exist thereon, and it is more preferred that the plural concave portions are different from each other in shape of the cut portion thereof.

The concave portion 13a having a maximum height difference of 40% or more of the total thickness of the resin layer 12 is a portion that plays a role of air-discharge channels, which largely influences the air escape property of the pressure sensitive adhesive sheet.

The plural concave portions 13*a* that are different from each other in shape of the cut portion thereof can prevent such a phenomenon that all the concave portions are similarly deformed to expunge the grooves playing the role of air-discharge channels due to application of a force having a certain directionality to the pressure sensitive adhesive sheet, irrespective of before or after adhering the pressure sensitive adhesive sheet. As a result, a pressure sensitive adhesive sheet that is significantly excellent in air escape property can be provided.

In this viewpoint, in one embodiment of the present invention, the cross section (P1) 60 preferably has a concave portion defined by the requirement (I) having a cut portion having an irregular shape existing on the side of the surface (α) 12*a*, and more preferably plural concave portions each having a cut portion having an irregular shape existing thereon.

The "irregular shape" referred herein has the same meaning as above.

In the present invention, the judgement as to "whether or not having a maximum height difference of 40% or more of the total thickness of the resin layer 12", and the judgements as to "whether or not plural concave portions are different from each other in shape of the cut portion thereof" and "whether or not corresponding to a concave portion having a cut portion having an irregular shape" may be performed with an image acquired by observing the cross section (P1) 60 with a digital microscope or a scanning electron microscope.

For example, in the case where the target two concave portions appearing on the image are different from each other in length of the width thereof and in maximum height difference, the judgement as to "whether or not plural concave portions are different from each other in shape of the cut portion thereof" among the above may be judged that "the two concave portions are different from each other in shape of the cut portion thereof".

On the cross section (P1) 60, the flat portion 14*a* corresponding to a cut portion of the flat face 14 existing in the region (P) as shown in FIG. 2 and being substantially in parallel to the surface of the substrate or the release material in contact with the resin layer 12 exists on the cross section on the side of the surface (α) 12*a* according to the requirement (II).

The flat portion 14*a* corresponds to the cut portion of the flat face 14 existing on the surface (α), and on the cross section (P1) 60, corresponds to the portion substantially in parallel to the surface of the substrate or the release material.

Accordingly, on the cross section (P1) 60 shown in FIG. 5, the straight line $e_\alpha$ passing through the flat portion 14*a* is substantially in parallel to the straight line $e_\beta$ passing through the surface of the substrate 11 in contact with the resin layer 12. Therefore, the flat portion 14*a* is distinguished from the convex portion 15, which is formed to protrude upward with respect to the straight line $e_\alpha$ as shown in FIG. 5.

The term "substantially in parallel" referred in the present invention includes not only the case where the angle forming between the straight line passing through the flat portion 14*a* existing on the cross section (P1) on the side of the surface (α) and the straight line passing through the surface of the substrate or the release material in contact with the resin layer is 0 degree, but also the case where the angle shows a slight inclination that can be assumed to be substantial parallel (for example, the case where the angle is 5 degree or less, and preferably 2 degree or less).

From the viewpoint of providing the pressure sensitive adhesive sheet having air escape property and pressure sensitive adhesion characteristics that are enhanced in a well balanced manner, on the cross section (P1) 60, plural flat portions 14*a* preferably exist on the cross section (P1) 60 on the side of the surface (α) 12*a*, and the positions of the plural flat portions 14*a* existing on the side of the surface (α) 12*a* more preferably have no periodicity.

The state that "the positions of the flat portions have no periodicity" means that the positions where the plural flat portions exist have no fixed repeating pattern but is in an irregular (random) state.

On the cross section (P1) 60, in the case where plural flat portions 14*a* exist on the cross section (P1) 60 on the side of the surface (α) 12*a*, it is preferred that the distances of each of the plural flat portions 14*a* existing on the side of the surface (α) 12*a* to the substrate or the release material are substantially the same as each other.

This means that as shown in FIG. 5, the plural flat portions 14*a* can be connected with one straight line $e_a$, and the straight line $e_\alpha$ and the straight line $e_\beta$ passing through the surface of the substrate in contact with the resin layer or the release material in contact with the resin layer 12 are substantially in parallel to each other.

According to the configuration, the positions of the plural flat portions 14*a* in the thickness direction are substantially the same as each other, and thereby the resin layer can be sufficiently made in contact with an adhesion surface of an adherend, which can contribute to the enhancement of the pressure sensitive adhesion strength.

In the present invention, the state that "the distances of each of the plural flat portions to the substrate or the release material are substantially the same as each other" includes a state that the difference of the two target flat portions in distance to the substrate or the release material is in a range of less than 5% (preferably less than 2%) with respect to the average value of the distances.

In one embodiment of the present invention, from the viewpoint of providing the pressure sensitive adhesive sheet having air escape property and pressure sensitive adhesion characteristics that are enhanced in a well balanced manner, on acquiring plural cross sections (P1), the forming positions and the forming lengths of the flat portions existing on the side of the surface (α) of each of the cross sections (P1) are different from each other between the plural cross sections (P1) thus acquired.

Specifically, this shows that the forming positions and the forming lengths of the flat portions existing on the side of the surface (α) of the cross section (P1) are different from those of the other cross section (P1), and the same cross sections (P1) are not formed.

[Requirements relating to First Pressure Sensitive Adhesive Sheet and Second Pressure Sensitive Adhesive Sheet of Present Invention]

Examples of the pressure sensitive adhesive sheet of the present invention include a first embodiment that satisfies the following requirement (III) (which may be referred to as a "first pressure sensitive adhesive sheet") and a second embodiment that satisfies the following requirement (Iv) (which may be referred to as a "second pressure sensitive adhesive sheet").

In the first pressure sensitive adhesive sheet, the following requirement (IV) is preferably satisfied in addition to the requirement (III). In the second pressure sensitive adhesive sheet, the following requirement (III) is preferably satisfied in addition to the requirement (IV).

Requirement (III): An absolute value of a ratio ($S_{EDX}/T_{EDX}$) of a value ($S_{EDX}$) of an intensity ratio Si/C of a peak intensity (Si) derived from silicon atoms and a peak intensity (C) derived from carbon atoms measured by energy dispersive X-ray analysis (which may be hereinafter referred to as "EDX" in some cases) for a prescribed region (S) that is positioned under in a thickness direction with respect to one of the concave portion existing on the cross section (P1), and a value ($T_{EDX}$) of the intensity ratio Si/C measured by energy dispersive X-ray analysis for a prescribed region (T) that is positioned under in a thickness direction with respect to one of the flat portion existing on the cross section (P1) and has the same length in a horizontal direction as the region (S) is 0.2 or less.

Requirement (IV): The value ($S_{EDX}$) of an intensity ratio Si/C of a peak intensity (Si) derived from silicon atoms and a peak intensity (C) derived from carbon atoms measured by energy dispersive X-ray analysis for a prescribed region (S) that is positioned under in a thickness direction with respect to one of the concave portion existing on the cross section (P1) is 0.01 or less.

The "intensity ratio Si/C ($S_{EDX}$)" and the "intensity ratio Si/C ($T_{EDX}$)" measured by EDX in the requirements (III) and (IV) indirectly show the existence ratio of silica particles constituting the particle part (Y) and the carbon atom-containing resin constituting the resin part (X) in the region (S) or (T).

Specifically, with a larger value of the intensity ratio Si/C, the content ratio of the particle part (Y) consisting of fine particles containing silica particles in the region is larger, and with a smaller value of the intensity ratio Si/C, on the other hand, the content ratio of the particle part (Y) consisting of fine particles containing silica particles in the region is smaller.

In the first and second pressure sensitive adhesive sheets of the present invention, the content ratio of the particle part (Y) consisting of fine particles containing silica particles is extremely small in the prescribed region (S) that is positioned under in the thickness direction with respect to one of the concave portion existing on the surface (α) of the resin layer, and the state is defined by the requirements (III) and (IV).

It is considered that the reason why the content ratio of the particle part (Y) is extremely small in the region (S) is that in the formation process of the concave portion on the surface (α) of the resin layer described later, silica particles distributed in the region (S) that is positioned under in the thickness direction the concave portion flow to the portion having no concave portion formed (i.e., the region under in the thickness direction the flat portion), associated with the progress of the formation of the concave portion.

Accordingly, it can be also said that the requirements (III) and (IV) define that the concave portion existing on the surface (α) of the resin layer is formed through self-formation of the resin layer.

The absolute value of the ratio ($S_{EDX}/T_{EDX}$) defined in the requirement (III) indirectly shows the ratio of the content ratio of the particle part (Y) consisting of fine particles containing silica particles between the region (S) positioned under the concave portion and the region (T) positioned under the flat portion. With a smaller value of the ratio ($S_{EDX}/T_{EDX}$), the amount of the particle part (Y) existing in the region (S) positioned under the concave portion is small, as compared to the particle part (Y) existing in the region (T) positioned under the flat portion.

The reason why an absolute value is used for the ratio ($S_{EDX}/T_{EDX}$) is that there are cases where $S_{EDX}$ and $T_{EDX}$ show negative values when Si is not contained, but this is causes by the measurement errors of the equipment, and the influence of the measurement errors is avoided thereby.

The absolute value of the ratio ($S_{EDX}/T_{EDX}$) defined in the requirement (III) is 0.2 or less, preferably 0.150 or less, more preferably 0.100 or less, and further preferably 0.080 or less, and is preferably 0.001 or more, more preferably 0.002 or more, and further preferably 0.005 or more.

When the ratio ($S_{EDX}/T_{EDX}$) is 0.2 or less, the concave portion formed through self-formation of the resin layer in the region (S) may have a depth that is sufficient for functioning as air-discharge channels, so as to improve the air escape property of the resulting pressure sensitive adhesive sheet. Furthermore, the shape retentivity of the flat portion positioned above the region (T) after adhering can be enhanced since the proportion of the fine particles constituting the particle part (X) existing in the region (T) is large, and the occurrence of blister can be effectively suppressed in the case where the resulting pressure sensitive adhesive sheet is used under a high temperature.

The value ($S_{EDX}$) of the intensity ratio Si/C in the region (S) defined in the requirement (IV) is 0.01 or less, preferably 0.008 or less, more preferably 0.007 or less, and further preferably 0.006 or less, and is preferably −0.01 or more, more preferably 0.000001 or more, further preferably 0.00001 or more, and still further preferably 0.0001 or more.

When the value ($S_{EDX}$) of the intensity ratio Si/C is 0.01 or less, the concave portion formed through self-formation of the resin layer in the region (S) may have a depth that is sufficient for functioning as air-discharge channels, so as to improve the air escape property of the resulting pressure sensitive adhesive sheet.

The value ($T_{EDX}$) of the intensity ratio Si/C in the region (T) is generally larger than 0.01, preferably 0.02 or more, more preferably 0.03 or more, and further preferably 0.04 or more, and is generally 1.00 or less.

<Measurement Method of Region (5), Region (T), and Intensity Ratio Si/C>

The measurement method of EDX will be described with reference to FIG. 7.

Figure 7:
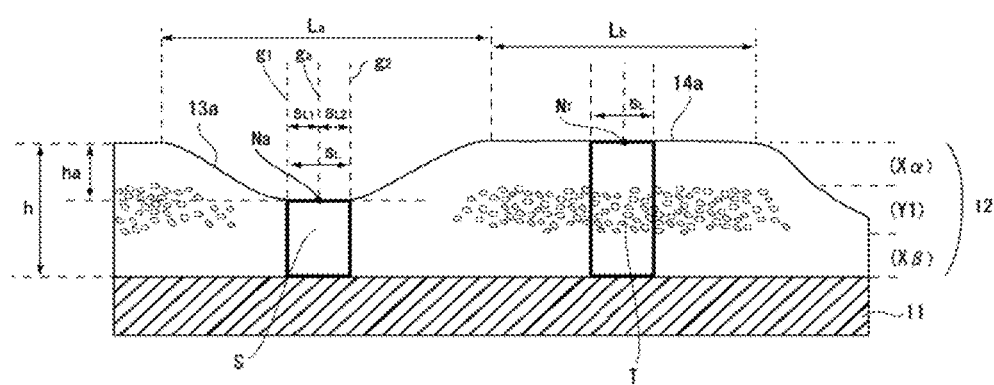
FIG. 7 is an example of a schematic cross sectional view of the pressure sensitive adhesive sheet of one embodiment of the present invention, and is a schematic illustration describing the present state of silica particles in the concave portion and the flat portion.

The "region (S) that is positioned under in the thickness direction with respect to one of the concave portion existing on the cross section (P1)" defined in the requirements (III) and (IV) is, as shown in FIG. 7, a rectangle that passes through the lowest position ($N_a$) of the target concave portion 13a, and has a vertical length (i.e., a length in the vertical direction) of the difference (h−ha) between the total thickness h of the resin layer 12 and the maximum height difference ha of the concave portion 13a and a horizontal length (i.e., a length in the horizontal direction perpendicular to the vertical direction) $S_L$.

In the pressure sensitive adhesive sheet of the present invention, a concave portion having a ratio (ha/h) of the maximum height difference ha and the total thickness h of the resin layer 12 of 0.4 or more exists on the cross section (P1) on the side of the surface (α).

The horizontal length $S_L$ of the rectangle constituting the region (S) corresponds to the distances from the straight line $g_a$ that passes through the point $N_a$ as the lowest position of the target concave portion 13a and extends in the vertical direction to the straight line $g_1$ that is remote therefrom in the horizontal direction perpendicular to the vertical direction leftward by the length $S_{L1}$, which is 10% of the width $L_a$ of the concave portion 13a, and from the straight line $g_a$ to the straight line $g_2$ that is remote therefrom in the horizontal direction perpendicular to the vertical direction rightward by the length $S_{L2}$, which is 10% of the width $L_a$ of the concave portion 13a.

That is, in FIG. 7, the length ST, corresponds to 20% of the width $L_a$ of the concave portion 13a. The rectangle constituting the region (S) is in contact with the concave portion 13a at the point $N_a$.

According to this manner, the region (S) can be determined for one of the concave portion 13a thus selected as the measurement target.

The region (T) selected for calculating the ratio ($S_{EDX}/T_{EDX}$) defined in the requirement (III) may be selected in the following manner.

One of the flat portion existing on the cross section (P1) is freely-selected.

The region (T) is then selected that passes through the point $N_T$ as the middle point of the width $L_b$ of the selected flat portion, is positioned under in the thickness direction the flat portion, and has the same length in the horizontal direction as the region (S).

As shown in FIG. 7, the region (T) has a vertical length (i.e., a length in the vertical direction) that is the distance between the surface (α) and the surface (β) of the resin layer 12 (i.e., the total thickness h of the resin layer 12), and a horizontal length (i.e., a length in the horizontal direction perpendicular to the vertical direction) that is the horizontal length $S_L$ of the region (S) defined by the aforementioned manner for the concave portion 13a as the comparison target.

The region (T) is selected in such a manner that the point $N_T$ is positioned at the middle point of the horizontal edge of the rectangle constituting the region (T).

The values of the intensity ratio Si/C in the region (S) and the region (T) thus selected in these manners can be calculated by performing an EDX measurement for the entire surface of the regions.

Examples of EDX used include "INCA Energy", Type E2H, a product name, produced by Oxford Instruments plc. The specific measurement conditions are preferably determined according to the examples described later.

In one embodiment of the present invention, it is preferred that the concave portion is not one that is formed with a release material having an emboss pattern, from the viewpoint of providing the pressure sensitive adhesive sheet having the plural concave portions defined by the requirement (I) and the flat portion satisfying the requirement (II) existing on the aforementioned cross section, and the aforementioned ratio ($S_{EDX}/T_{EDX}$) and the value ($S_{EDX}$) of Si/C that are controlled to the prescribed values or less.

The "concave portion that is formed with a release material having an emboss pattern" herein includes the following ones and is distinguished from the concave portion according to the aforementioned embodiment.

A concave portion formed through transfer of an emboss pattern in such a manner that a release sheet having an emboss pattern is pressed onto a flat surface of a pressure sensitive adhesive layer formed of a pressure sensitive adhesive composition A concave portion formed in such a manner that by using a release sheet having an emboss pattern formed on a release-treated surface thereof, a pressure sensitive adhesive layer is formed by coating a pressure sensitive adhesive composition on the release-treated surface, and the release sheet is removed to expose the concave portion on the surface of the pressure sensitive adhesive layer These concave portions may cause various the defects enumerated as the problems relating to the pressure sensitive adhesive sheet described in PTL 1.

In one embodiment of the present invention, from the viewpoint of providing the pressure sensitive adhesive sheet having the concave portion and the flat portion that satisfy the aforementioned requirements formed on the surface (α) of the resin sheet, the concave portion is preferably formed through self-formation of the resin layer.

In the present invention, the "self-formation" means a phenomenon of naturally forming a disorganized profile in a process of self-sustaining formation of a resin layer, and more specifically, means a phenomenon of naturally forming a disorganized profile in a process of self-sustaining formation of a resin layer by drying a coating film formed by a composition as a forming material for a resin layer.

The shape of the concave portion formed through self-formation of the resin layer can be controlled to some extent by controlling the drying condition and the kinds and the contents of the components in the composition as the forming material for the resin layer, but as different from grooves formed by transferring an emboss pattern, it can be said that "reproduction of entirely identical shapes is practically impossible". Therefore, the concave portion formed through self-formation of the resin layer can be said to be an irregular shape.

The formation of the concave portion having an irregular shape makes the shape of the flat face irregular.

The process of the formation of the concave portion formed through self-formation of the resin layer can be considered as follows.

In the formation of the coating film formed of the composition as the forming material of the resin layer, a contraction stress occurs inside the coating film in the process of drying the coating film, and cracks are formed in a portion where the binding force of the resin is lowered. It is considered that the concave portion is formed on the surface (α) of the resin layer due to the inflow of the resin that exists around the cracks to the spaces having been temporarily formed by cracking.

It is considered that by forming two layers of coating films that are different in content of the resin and then drying the two layers of coating films simultaneously, a difference in contraction stress occurs inside the coating films on drying, and thus cracks are readily formed in the coating films.

From the viewpoint of facilitating the formation of the concave portion, it is preferred to control the condition appropriately in consideration of the following factors. It is considered that these factors act in a complex manner to facilitate the formation of the concave portions. The suitable embodiments of the factors for facilitating the formation of the concave portion are those described in the corresponding sections described later.

The kind, the constituent monomers, the molecular weight, and the content of the resin contained in the composition as the forming material for the coating film The kind of the crosslinking agent and the kind of the solvent contained in the composition as the forming material for the coating film The viscosity and the solid concentration of the composition as the forming material for the coating film The thickness of the coating film formed (when plural layers are formed, the thicknesses of the coating films)

The drying temperature and the drying time for the coating film formed

In the formation of a pressure sensitive adhesive layer in an ordinary pressure sensitive adhesive sheet, the aforementioned factors are suitably determined for forming a pressure sensitive adhesive layer having a flat surface in many cases.

In the present invention, on the other hand, the factors are determined in such a manner that the concave portion capable of contributing to the enhancement of the air escape property of the pressure sensitive adhesive sheet can be formed, which is entirely different from the design method of the pressure sensitive adhesive layer of the ordinary pressure sensitive adhesive sheet.

It is preferred that the aforementioned factors are appropriately determined in consideration of the flowability of the resin contained in the coating film to be formed, and the like.

For example, in the case where silica particles are contained in the composition, by controlling the viscosity of the coating film formed of a composition containing a large amount of silica particles to a suitable range, the mixing with the other coating film (i.e., the coating film containing a large amount of the resin) can be suitably suppressed while retaining the prescribed flowability of the silica particles in the coating film By controlling in this manner, there is a tendency that cracks are formed in the horizontal direction to facilitate the formation of the concave portion in the coating film containing a large amount of the resin.

As a result, the proportion of the concave portion formed on the surface (α) can be increased, and simultaneously the proportion of the concave portions connecting to each other can also be increased, thereby providing the pressure sensitive adhesive sheet having a further excellent air escape property.

Among the aforementioned factors, the kind, the constitutional monomer, and the molecular weight of the resin, and the content of the resin are preferably controlled appropriately in such a manner that the resin contained in the coating film containing a large amount of the resin has a suitable viscoelasticity.

Specifically, by appropriately increasing the hardness of the coating film (i.e., the hardness determined by such factors as the viscoelasticity of resin, the viscosity of the coating liquid, and the like), the contraction stress of the resin part (X) is increased to facilitate the formation of a concave portion. With a larger hardness of the coating film, the contraction stress becomes larger to facilitate the formation of the concave portion, but when the coating film is too hard, the coating suitability thereof may be deteriorated. Furthermore, when the elasticity of the resin is excessively increased, there is a tendency that the pressure sensitive adhesive strength of the resin layer formed from the coating film is decreased. The viscoelasticity of the resin is preferably controlled appropriately in consideration of these points.

In the case where silica particles are contained in the composition or the coating film, it is considered that by optimizing the dispersion state of the silica particles, the extent of swelling of the thickness of the resin layer due to the silica particles and the self-forming power of the concave portion can be controlled, and as a result, the conditions can be controlled to facilitate the formation of the concave portion on the surface (α).

Furthermore, the aforementioned factors are preferably determined in consideration of the crosslinking rate of the formed coating film (or the composition as the forming material).

Specifically, in the case where the crosslinking rate of the coating film is too large, there is a concern that the coating film is cured before the formation of the concave portion. Furthermore, the size of cracks of the coating film and the size of the concave portion are affected.

The crosslinking rate of the coating film can be controlled by appropriately determining the kind of the crosslinking agent and the kind of the solvent in the composition as the forming material and by appropriately determining the drying time and the drying temperature of the coating film.

In the case where the resin layer is a layer containing the resin part (X) containing the resin and the particle part (Y) consisting of fine particles containing silica particles, the resin layer formed through self-formation tends to have such a distribution of the particle part (Y) that the proportion occupied by the particle part (Y) is smaller in the portion having the concave portion on the surface (α) than the other portions, as shown in FIGS. 1(a) to 1(d), FIG. 5, and FIG. 6.

It is considered that this is because in the process of self-formation of the resin layer, the silica particles existing in the portion where the concave portion is formed migrate in the formation of the concave portion on the surface (α) of the resin layer, and thereby the distribution is provided.

Each configuration of the pressure sensitive adhesive sheet of the present invention is hereunder described.

[Substrate]

The substrate to be used in one embodiment of the present invention is not particularly limited, and examples thereof include a paper substrate, a resin film or sheet, a substrate containing a paper substrate laminated with a resin, and the like, which may be appropriately selected depending upon the purpose of the pressure sensitive adhesive sheet of one embodiment of the present invention.

Examples of paper constituting the paper substrate include thin paper, medium quality paper, wood-free paper, impregnated paper, coated paper, art paper, parchment paper, and glassine paper.

Examples of the resin constituting the resin film or sheet include a polyolefin resin, such as polyethylene and polypropylene; a vinyl resin, such as polyvinyl chloride, polyvinylidene chloride, polyvinyl alcohol, an ethylene-vinyl acetate copolymer, and an ethylene-vinyl alcohol copolymer; a polyester resin, such as polyethylene terephthalate, polybutylene terephthalate, and polyethylene naphthalate; polystyrene; an acrylonitrile-butadiene-styrene copolymer; cellulose triacetate; polycarbonate; a urethane resin, such as polyurethane, acrylic-modified polyurethane; polymethylpentene; polysulfone; polyetheretherketone; polyether sulfone; polyphenylene sulfide; a polyimide resin, such as polyether imide, and polyimide; a polyamide resin; an acrylic resin; a fluorine resin.

Examples of the substrate containing a paper substrate laminated with a resin include laminated paper containing the aforementioned paper substrate laminated with a thermoplastic resin, such as polyethylene.

Among these substrates, a resin film or sheet is preferred, a film or sheet formed of a polyester resin is more preferred, and a film or sheet formed of polyethylene terephthalate (PET) is still more preferred.

In the case where the pressure sensitive adhesive sheet of the present invention is used for an application requiring the heat resistance, a film or sheet constituted of a resin selected from polyethylene naphthalate and a polyimide resin is preferred, and in the case where the pressure sensitive adhesive sheet is used for an application requiring the weather resistance, a film or sheet constituted of a resin selected from polyvinyl chloride, polyvinylidene chloride, an acrylic resin, and a fluorine resin is preferred.

Though the thickness of the substrate may be suitably set according to an application of the pressure sensitive adhesive sheet of the present invention, from the viewpoint of handleability and economy, it is preferably 5 to 1,000 μm, more preferably 10 to 500 μm, still more preferably 12 to 250 μm, and yet still more preferably 15 to 150 μm.

The substrate may further contain various additives, such as an ultraviolet ray absorbent, a light stabilizer, an antioxidant, an antistatic agent, a slipping agent, an antiblocking agent, a colorant From the viewpoint of improving the blister resistance of the resulting pressure sensitive adhesive sheet, the substrate to be used in one embodiment of the present invention is preferably a non-air permeable substrate, and specifically, a substrate having a metal layer on the surface of the aforementioned resin film or sheet is preferred.

Examples of the metal which is contained in the metal layer include a metal having metallic gloss, such as aluminum, tin, chromium and titanium.

Examples of the method of forming the metal layer include a method of vapor-depositing the aforementioned metal by the PVD method, such as vacuum vapor deposition, sputtering, and ion plating; a method of attaching a metal foil formed of the aforementioned metal with an ordinary pressure sensitive adhesive. Among those, a method of vapor-depositing the aforementioned metal by the PVD method is preferred.

Furthermore, in the case where a resin film or sheet is used as the substrate, from the viewpoint of improving the adhesion to the resin layer to be laminated on the resin film or sheet, the surface of the resin film or sheet may be subjected to a surface treatment by an oxidizing method, a roughening method, or the like, or may be subjected to a primer treatment.

Examples of the oxidizing method include a corona discharge treatment, a plasma discharge treatment, a chromic acid treatment (wet process), a hot air treatment, an ozone treatment, and an ultraviolet ray irradiation treatment, and examples of the roughening treatment include a sand blasting treatment, a solvent treatment.

[Release Material]

As the release material to be used in one embodiment of the present invention, a release sheet having both surfaces subjected to a release treatment, and a release sheet having one surface subjected to a release treatment are usable, and examples thereof include a substrate for the release material having coated thereon a release agent.

The release treatment is preferably performed on a flat release material without a relief shape formed thereon (for example, a release material having no emboss pattern formed thereon).

Examples of the substrate for the release material include the paper substrate, the resin film or sheet, and the substrate containing a paper substrate laminated with a resin described above used as the substrate of the pressure sensitive adhesive sheet of one embodiment of the present invention.

Examples of the release agent include a rubber elastomer, such as a silicone resin, an olefin resin, an isoprene resin and a butadiene resin, and a long-chain alkyl resin, an alkyd resin, a fluorine resin.

Though the thickness of the release material is not particularly limited, it is preferably 10 to 200 μm, more preferably 25 to 170 μm, and still more preferably 35 to 80 μm.

[Resin Layer]

As shown in FIG. 1, the resin layer 12 which the pressure sensitive adhesive sheet of the present invention has is preferably one containing the resin part (X) containing a resin and the particle part (Y) consisting of fine particles containing silica particles.

The resin part (X) means a part containing a component other than the silica particles to be contained in the resin layer. Namely, not only the resin but also a component other than the fine particles, such as a tackifier, a crosslinking agent, and an ordinary additive, is included in the "resin part (X)".

Meanwhile, the particle part (Y) means a part consisting of fine particles containing silica particles contained in the resin layer.

When the particle part (Y) is contained in the resin layer, the shape retentive property after being attached can be improved, and in the case of using the resulting pressure sensitive adhesive sheet at a high temperature, generation of blister can be effectively inhibited.

Regarding the configuration of distribution of the resin part (X) and the particle part (Y) in the resin layer 12, the resin parts (X) and the particle parts (Y) may be distributed almost evenly as one configuration, or as a different configuration, a site mainly containing the resin parts (X) and a site mainly containing the particle parts (Y) may be locally divided.

It is preferred that the resin layer which the pressure sensitive adhesive sheet of one embodiment of the present invention has additionally has a void part (Z) in addition to the resin part (X) and the particle part (Y). When the resin layer has the void part (Z), the blister resistance of the pressure sensitive adhesive sheet can be improved.

The void part (Z) includes voids existing between the aforementioned silica particles as well as, when the aforementioned silica particles are secondary particles, voids existing inside the secondary particles.

In the case where the resin layer has a multilayer structure, even though the void part (Z) exists in the process of forming the resin layer or just after formation of the layer, the resin part (X) may flow into the void part (Z), and therefore, the voids may disappear to give a resin layer not having the void part (z).

However, even in the case where the void part (Z) having existed in the resin layer for a period of time has disappeared, in the pressure sensitive adhesive sheet that is one embodiment of the present invention, the concave portion exists on the surface (α) of the resin layer, and therefore, the air escape property is good; and the resin layer has the particle part (Y), and therefore, the blister resistance is excellent, too.

From the viewpoint of improving the air escape property and the blister resistance of the pressure sensitive adhesive sheet, the shear storage elastic modulus at 100° C. of the resin layer which the pressure sensitive adhesive sheet of one embodiment of the present invention has is preferably $9.0 \times 10^3$ Pa or more, more preferably $1.0 \times 10^4$ Pa or more, and still more preferably $2.0 \times 10^4$ Pa or more.

In the present invention, the shear storage elastic modulus at 100° C. of the resin layer means a value measured with a viscoelastometer (for example, an apparatus name: "DYNAMIC ANALYZER RDA II", manufactured by Rheometrics Inc.) at a frequency of 1 Hz.

The total thickness of the resin layer is preferably 1 to 300 μm, more preferably 5 to 150 μm, and still more preferably 10 to 75 μm.

In the pressure sensitive adhesive sheet of the present invention, at least the surface (α) of the resin layer on the side opposite to the side on which at least the substrate or the release material is provided has pressure sensitive adhesiveness, but the surface (β) of the resin layer on the side on which the substrate or the release material is provided may also has pressure sensitive adhesiveness.

The pressure sensitive adhesive strength of the surface (α) of the resin layer of the pressure sensitive adhesive sheet of one embodiment of the present invention is preferably 0.5 N/25 mm or more, more preferably 2.0 N/25 mm or more, still more preferably 3.0 N/25 mm or more, yet still more preferably 4.0 N/25 mm or more, and even yet still more preferably 7.0 N/25 mm or more.

In the case where the surface (β) of the resin layer also has pressure sensitive adhesiveness, the pressure sensitive adhesive strength of the surface (β) preferably belongs to the aforementioned range.

The value of the pressure sensitive adhesive strength of the pressure sensitive adhesive sheet means a value measured by the method described in Examples.

<Multilayer Structure of Resin Layer>

The resin layer may be a multilayer structure configured of two or more layers.

As the resin layer that is such a multilayer structure, there is exemplified a multilayer structure formed by laminating a layer (Xβ) mainly containing the resin part (X), a layer (Y1) containing the particle part (Y) in an amount of 15% by mass or more, and a layer (Xα) mainly containing the resin part (X) in this order from the side on which the substrate or the release material is provided, like in the pressure sensitive adhesive sheet 1a in FIG. 1.

The configuration of the multilayer structure of the resin layer may also be a mixed layer configuration where the boundary between the two layers to be laminated cannot be discerned.

Namely, the configuration of the resin layer 12 which the pressure sensitive adhesive sheet 1a in FIG. 1 has may also be a mixed layer configuration where the boundary between the layer (Xβ) and the layer (Y1), and/or the boundary between the layer (Y1) and the layer (Xα) cannot be discerned.

The configuration of the resin that is the multilayer structure is hereunder described by reference to, as one example, the resin layer 12 configured of three layers of the layer (Xβ), the layer (Y1), and the layer (Xα), which the pressure sensitive adhesive sheet 1a in FIG. 1 has.

The layer (Xβ) and the layer (Xα) are a layer mainly containing the resin part (X) but may also contain a particle part (Y). However, it is preferable that the content of the particle part (Y) in each of the layer (Xβ) and the layer (Xα) is independently less than 15% by mass relative to the total mass (100% by mass) of the layer (Xβ) or the layer (Xα) and is smaller than the content of the resin in the layer (Xβ) or the layer (Xα).

Namely, with respect to the content of the particle part (Y), the layer (Xβ) and the layer (Xα) are distinguished from the layer (Y1).

The layer (Xβ) and the layer (Xα) may have the aforementioned void part (Z), in addition to the resin part (X) and the particle part (Y).

The content of the resin part (X) in each of the layer (Xβ) and the layer (Xα) is independently typically more than 85% by mass, preferably 87 to 100% by mass, more preferably 90 to 100% by mass, still more preferably 95 to 100% by mass, and yet still more preferably 100% by mass relative to the total mass (100% by mass) of the layer (Xβ) or the layer (Xα).

The aforementioned "content of the resin part (X)" means a total content of the components other than the silica particles, such as a resin, a tackifier, a crosslinking agent, and an ordinary additive, constituting the resin part (X) contained in the layer (Xβ) or the layer (Xα).

The content of the silica particles constituting each of the particle part (Y) in the layer (Xβ) and the layer (Xα) is independently less than 15% by mass in general, preferably 0 to 13% by mass, more preferably 0 to 10% by mass, still more preferably 0 to 5% by mass, and yet still more preferably 0% by mass relative to the total mass (100% by mass) of the layer (Xβ) or the layer (Xα).

In the present invention, the "content of the silica particles in each of the layer (Xβ) and the layer (Xα)" may be considered to be the content of the silica particles in the total amount (100% by mass (but excluding a diluent solvent)) of the resin composition that is the forming material for the layer (Xβ) or the layer (Xα).

The content of the resin in the layer (Xα) is typically 30 to 100% by mass, preferably 40 to 100% by mass, more preferably 50 to 100% by mass, and still more preferably 60 to 100% by mass relative to the total amount (100% by mass) of the layer (Xα).

Meanwhile, the content of the resin in the layer (Xβ) is typically 50 to 100% by mass, preferably 65 to 100% by mass, more preferably 75 to 100% by mass, and still more preferably 85 to 100% by mass relative to the total amount (100% by mass) of the layer (Xβ).

In the present invention, the "content of the resin in each of the layer (Xβ) and the layer (Xα)" may be considered to be the content of the resin in the total amount (100% by mass (but excluding a diluent solvent)) of the resin composition that is the forming material for the layer (Xβ) or the layer (Xα).

The layer (Y1) may be a layer formed of the particle part (Y) alone, may also be a layer containing the resin part (X) together with the particle part (Y), and may further be a layer having the void part (Z).

The content of the silica particles constituting the particle part (Y) in the layer (Y1) is typically 15% by mass or more, preferably 20 to 100% by mass, more preferably 25 to 90% by mass, still more preferably 30 to 85% by mass, and yet still more preferably 35 to 80% by mass relative to the total mass (100% by mass) of the layer (Y1).

The content of the resin in the layer (Y1) is typically 0 to 85% by mass, preferably 1 to 80% by mass, more preferably 5 to 75% by mass, still more preferably 10 to 70% by mass, and yet still more preferably 20 to 65% by mass relative to the total mass (100% by mass) of the layer (Y1).

In the present invention, the "content of the silica particles in the layer (Y1)" and the "content of the resin in the layer (Y1)" may be considered to be each the content of the fine particles or the resin in the total amount (100% by mass (but excluding a diluent solvent)) of the composition that is the forming material for the layer (Y1).

In one embodiment of the present invention, the layer (Xα) is preferably a layer formed by a composition (xα) containing a resin and having a content of silica particles of less than 15% by mass.

Similarly, the layer (Xβ) is preferably a layer formed by a composition (xβ) containing a resin and having a content of silica particles of less than 15% by mass.

The aforementioned layer (Y1) is preferably a layer formed by a composition (y) containing 15% by mass or more of silica particles.

Suitable embodiments (containing components, contents, etc.) of the composition (xα), the composition (xβ), acid the composition (y) are those as described later.

<Resin Part (X)>

The resin part (X) constituting the resin layer is a part containing any other component than silica particles contained in the resin layer, and in this point, this is differentiated from the particle part (Y).

The resin part (X) may contain a tackifier, a crosslinking agent, an ordinary additive, and so on together with the resin.

The content of the resin in the resin part (X) is typically 30% by mass or more, preferably 40% by mass or more, more preferably 50% by mass or more, still more preferably 55% by mass or more, yet still more preferably 60% by mass or more, and even yet still more preferably 70% by mass or more, and preferably 100% by mass or less, and more preferably 99.9% by mass or less, relative to the total amount (100% by mass) of the resin part (X).

In the present invention, a value of the content of the resin in the resin composition serving as the forming material for the resin part (X) may be considered to be the aforementioned "content of the resin in the resin part (X)".

The aforementioned resin which is contained in the resin part (X) preferably contains a pressure sensitive adhesive resin from the viewpoint of revealing pressure sensitive adhesiveness on the surface (α) of the resin layer to be formed.

In particular, in the case where the resin layer has a multilayer structure formed by laminating a layer (Xβ), a layer (Y1), and a layer (Xα) in this order from the side on which a substrate or a release material is provided, like in the pressure sensitive adhesive sheet 1a, etc. of FIG. 1(a), from the aforementioned viewpoints, it is preferred that at least the layer (Xα) contains a pressure sensitive adhesive resin. In addition, from the viewpoint of providing a configuration of a double-sided pressure sensitive adhesive sheet and from the viewpoint of improving the adhesion to the substrate, it is preferred that at least the layer (Xα) and the layer (Xβ) contain a pressure sensitive adhesive resin.

Examples of the pressure sensitive adhesive resin include an acrylic resin, a urethane resin, a rubber resin, and a silicone resin.

Among these adhesive resins, an acrylic resin is preferably contained from the viewpoints of making the pressure sensitive adhesion characteristics and the weather resistance good and facilitating the formation of concave portions on the surface (α) of the resin layer.

The content of the acrylic resin is preferably 25 to 100% by mass, more preferably 50 to 100% by mass, still more preferably 70 to 100% by mass, yet still more preferably 80 to 100% by mass, and even yet still more preferably 100% by mass relative to the total amount (100% by mass) of the resin contained in the resin part (X).

From the viewpoint of facilitating the formation of concave portions on the surface (α) of the resin layer, the resin part (X) preferably contains a resin having a functional group and more preferably contains an acrylic resin having a functional group.

In particular, in the case where the resin layer has a multilayer structure formed by laminating a layer (Xβ), a layer (Y1), and a layer (Xα) in this order from the side on which a substrate or a release material is provided, like in the pressure sensitive adhesive sheet 1a, etc. of FIG. 1(a), from the aforementioned viewpoints, it is preferred that at least the layer (Y1) contains a resin having a functional group.

The functional group is a group to be a crosslinking start point with a crosslinking agent, and examples thereof include a hydroxy group, a carboxy group, an epoxy group, an amino group, a cyano group, a keto group, and an alkoxysilyl group, with a carboxy group being preferred.

It is preferred that the resin part (X) further contains a crosslinking agent together with the aforementioned resin having a functional group. In particular, in the case where the resin layer has the aforementioned multilayer structure, it is preferred that at least the layer (Y1) contains a crosslinking agent together with the aforementioned resin having a functional group.

Examples of the crosslinking agent include an isocyanate crosslinking agent, an epoxy crosslinking agent, an aziridine crosslinking agent, and a metal chelate crosslinking agent.

Examples of the isocyanate crosslinking agent include aromatic polyisocyanates, such as tolylene diisocyanate, diphenylmethane diisocyanate, and xylylene diisocyanate; aliphatic polyisocyanates, such as hexamethylene diisocyanate; alicyclic polyisocyanates, such as isophorone diisocyanate and hydrogenated diphenylmethane diisocyanate; biuret forms and isocyanurate forms of these compounds, and adduct forms that are a reaction product with a low-molecular active hydrogen-containing compound (e.g., ethylene glycol, propylene glycol, neopentyl glycol, trimethylolpropane, and castor oil).

Examples of the epoxy crosslinking agent include ethylene glycol glycidyl ether, 1,3-bis(N,N-diglycidylaminomethyl)cyclohexane, N,N,N',N'-tetraglycidyl-m-xylylenediamine, 1,6-hexanediol diglycidyl ether, trimethylolpropane diglycidyl ether, diglycidylaniline, and diglycidylamine.

Examples of the aziridine crosslinking agent include diphenylmethane-4,4'-bis(1-aziridinecarboxamide), trimethylolpropane tri-β-aziridinyl propionate, tetramethylolmethane tri-β-aziridinyl propionate, toluene-2,4-bis(1-aziridinecarboxamide), triethylenemelamine, bisisophthaloyl-1-(2-methylaziridine), and tris-1-(2-methylaziridine)phosphine, trimethylolpropane tri-β-(2-methylaziridine) propionate.

The metal chelate crosslinking agent includes chelate compounds in which the metal atom is aluminum, zirconium, titanium, zinc, iron, tin, or the like. From the viewpoint of facilitating the formation of concave portions on the surface (α) of the resin layer, an aluminum chelate crosslinking agent is preferred.

Examples of the aluminum chelate crosslinking agent include diisopropoxyaluminum monooleyl acetoacetate, monoisopropoxyaluminum bisoleyl acetoacetate, monoisopropoxyaluminum monooleate monoethyl aceto acetate, diisopropoxyaluminum monolauryl acetoacetate, diisopropoxyaluminum monostearyl acetoacetate, and diisopropoxyaluminum monoisostearyl acetoacetate.

These crosslinking agents may be used either alone or in combination of two or more thereof.

Among these, from the viewpoint of facilitating the formation of concave portions on the surface (α) of the resin layer, the resin part (X) preferably contains one or more selected from a metal chelate crosslinking agent and an epoxy crosslinking agent, more preferably contains a metal chelate crosslinking agent, and still more preferably contains an aluminum chelate crosslinking agent.

The content of the crosslinking agent in the resin part (X) is preferably 0.01 to 15 parts by mass, more preferably 0.1 to 10 parts by mass, and still more preferably 0.3 to 7.0 parts by mass relative to 100 parts by mass of the resin having a functional group to be contained in the resin part (X).

As one embodiment of the present invention, from the viewpoint of facilitating the formation of concave portions on the surface (α) of the resin layer, it is preferred that the resin part (X) contains both a metal chelate crosslinking agent and an epoxy crosslinking agent.

In the case where the resin part (X) contains both a metal chelate crosslinking agent and an epoxy crosslinking agent, from the aforementioned viewpoints, the content ratio of the metal chelate crosslinking agent to the epoxy crosslinking agent [(metal chelate crosslinking agent)/(epoxy crosslinking agent)] in the resin part (X) is preferably 10/90 to 99.5/0.5, more preferably 50/50 to 99.0/1.0, still more preferably 65/35 to 98.5/1.5, and yet still more preferably 75/25 to 98.0/2.0 in terms of a mass ratio.

From the viewpoint of more improving the pressure sensitive adhesion characteristics of the surface (α), it is preferred that the resin part (X) further contains a tackifier together with the pressure sensitive adhesive resin. In particular, in the case where the resin layer is the aforementioned multilayer structure, it is preferred that the layer (Xα) contains a pressure sensitive adhesive resin and a tackifier.

The tackifier to be used in the present in n is a component for auxiliarily improving the pressure sensitive adhesive strength of the pressure sensitive adhesive resin, refers to an oligomer whose mass average molecular weight (Mw) is typically less than 10,000, and is differentiated from the aforementioned pressure sensitive adhesive resin.

The mass average molecular weight (Mw) of the tackifier is preferably 400 to 8,000, more preferably 500 to 5,000, and still more preferably 800 to 3,500.

Examples of the tackifier include rosin resins, such as a rosin resin, a rosin ester resin, and a rosin-modified phenol resin; hydrogenated rosin resins obtained by hydrogenating such a rosin resin; terpene resins, such as a terpene resin, an aromatic modified terpene resin, and a terpene phenol resin; hydrogenated terpene resins obtained by hydrogenating such a terpene resin; styrene resins obtained by copolymerizing a styrene monomer, such as α-methylstyrene and β-methylstyrene, and an aliphatic monomer; hydrogenated styrene resins obtained by hydrogenating such a styrene resin; C5 petroleum resins obtained by copolymerizing a C5 fraction, such as pentene, isoprene, piperine and 1,3-pentadiene, and hydrogenated petroleum resins of such a C5 petroleum resin; C9 petroleum resins obtained by copolymerizing a C9 fraction, such as indene, vinyltoluene, as formed by hydrocracking of petroleum naphtha, and hydrogenated petroleum resins of such a C9 petroleum resin.

The tackifier to be used in the present invention may be used either alone or in combination of two or more thereof having a different softening point or structure from each other.

The softening point of the tackifier is preferably 80° C. or higher, more preferably 80 to 180° C., still more preferably 83 to 170° C., and yet still more preferably 85 to 150° C.

In the present invention, the "softening point" of the tackifier means a value measured in conformity with JIS K2531.

In the case of using two or mole plural tackifiers, it is preferred that the weight average of the softening points of those plural tackifiers belongs to the aforementioned range.

In the case where the tackifier is contained in the resin part (X), the content of the tackifier is preferably 1 part by mass or more, more preferably 1 to 200 parts by mass, still more preferably 3 to 150 parts by mass, and yet still more preferably 5 to 90 parts by mass relative to 100 parts by mass of the pressure sensitive adhesive resin which is contained in the resin part (X).

The resin part (X) may contain an ordinary additive other than the aforementioned crosslinking agent and tackifier.

Examples of the ordinary additive include an antioxidant, a softener (plasticizer), a rust inhibitor, a pigment, a dye, a retardant, a reaction accelerator, and a UV absorbent.

These ordinary additives may be each used either alone or in combination of two or more thereof.

In the case where these ordinary additives are contained, the content of each ordinary additive is preferably 0.0001 to 60 parts by mass, and more preferably 0.001 to 50 parts by mass relative to 100 parts by mass of the resin.

The aforementioned resin which is contained in the resin part (X) may be used either alone or in combination of two or more thereof.

The forming material for the resin part (X) of the resin layer which the pressure sensitive adhesive sheet of the present invention has is preferably a pressure sensitive adhesive containing a pressure sensitive adhesive resin having a functional group, more preferably an acrylic pressure sensitive adhesive containing an acrylic resin (A) having a functional group (hereinafter also referred to simply as "acrylic resin (A)"), and still more preferably an acrylic pressure sensitive adhesive containing an acrylic resin (A) having a functional group and a crosslinking agent (B).

The acrylic pressure sensitive adhesive may be any of a solvent type or an emulsion type.

The aforementioned acrylic pressure sensitive adhesive which is suitable as the forming material for the resin part (X) is hereunder described.

Examples of the acrylic resin (A) contained in the acrylic pressure sensitive adhesive include a polymer having a structural unit derived from an alkyl (meth)acrylate having a linear or branched alkyl group, and a polymer having a structural unit derived from a (meth)acrylate having a cyclic structure.

The mass average molecular weight (Mw) of the acrylic resin (A) is preferably 50,000 to 1,500,000, more preferably 150,000 to 1,300,000, still more preferably 250,000 to 1,100,000, and yet still more preferably 350,000 to 900,000.

The acrylic resin (A) preferably contains an acrylic copolymer (A1) having a structural unit (a1) derived from an alkyl (meth)acrylate (a1') having an alkyl group with 1 to 18 carbon atoms (hereinafter also referred to as "monomer (a1')") and a structural unit (a2) derived from a functional group-containing monomer (a2') (hereinafter also referred to as "monomer (a2')"), and more preferably contains an acrylic copolymer (A1).

The content of the acrylic copolymer (A1) is preferably 50 to 100% by mass, more preferably 70 to 100% by mass, still more preferably 80 to 100% by mass, and yet still more preferably 90 to 100% by mass relative to the total amount (100% by mass) of the acrylic resin (A) in the acrylic pressure sensitive adhesive.

The copolymerization morphology of the acrylic copolymer (A1) is not particularly limited, and the copolymer may be any of a block copolymer, a random copolymer, or a graft copolymer.

From the viewpoint of improving the pressure sensitive adhesion characteristics, the carbon number of the alkyl group which the monomer (a1') has is more preferably 4 to 12, still more preferably 4 to 8, and yet still more preferably 4 to 6.

Examples of the monomer (a1') include methyl (meth)acrylate, ethyl (meth)acrylate, propyl (meth)acrylate, butyl (meth)acrylate, 2-ethylhexyl (meth)acrylate, lauryl (meth)acrylate, tridecyl (meth)acrylate, and stearyl (meth)acrylate.

Among these, butyl (meth)acrylate and 2-ethylhexyl (meth)acrylate are preferred, and butyl (meth)acrylate is more preferred.

The content of the structural unit (a1) is preferably 50 to 99.5% by mass, more preferably 60 to 99% by mass, still more preferably 70 to 95% by mass, and yet still more preferably 80 to 93% by mass relative to all the structural units (100% by mass) of the acrylic copolymer (A1).

Examples of the monomer (a2') include a hydroxy group-containing monomer, a carboxy group-containing monomer, an epoxy group-containing monomer, an amino group-containing monomer, a cyano group-containing monomer, a keto group-containing monomer, and an alkoxysilyl group-containing monomer.

Among these, a carboxy group-containing monomer is more preferred.

Examples of the carboxy group-containing monomer include (meth)acrylic acid, maleic acid, and fumaric acid, itaconic acid, with (meth)acrylic acid being preferred.

The content of the structural unit (a2) is preferably 0.5 to 50% by mass, more preferably 1 to 40% by mass, still more preferably 5 to 30% by mass, and yet still more preferably 7 to 20% by mass relative to all the structural units (100% by mass) of the acrylic copolymer (A1).

The acrylic copolymer (A1) may have a structural unit (a3) derived from any other monomer (a3') than the aforementioned monomers (a1') and (a2').

Examples of the other monomer (a3') include (meth) acrylates having a cyclic structure, such as cyclohexyl (meth)acrylate, benzyl (meth)acrylate, isobornyl (meth) acrylate, dicyclopentanyl (meth) acrylate, dicyclopentenyl (meth) acrylate, dicyclopentenyloxyethyl (meth) acrylate, and imido(meth)acrylate; vinyl acetate, acrylonitrile, and styrene.

The content of the structural unit (a3) is preferably 0 to 30% by mass, more preferably 0 to 20% by mass, still more preferably 0 to 10% by mass, and yet still more preferably 0 to 5% by mass relative to all the structural units (100% by mass) of the acrylic copolymer (A1).

The aforementioned monomers (a1') to (a3') may be each used either alone or in combination of two or more thereof.

A method for synthesis of the acrylic copolymer (A1) component is not particularly limited. For example, the copolymer is produced according to a method including dissolving raw material monomers in a solvent and polymerizing them in a mode of solution polymerization in the presence of a polymerization initiator, a chain transfer agent, and the like, or a method of emulsion polymerization in an aqueous system using raw material monomers in the presence of an emulsifier, a polymerization initiator, and a chain transfer agent, a dispersant.

The crosslinking agent (B) to be contained in the aforementioned acrylic pressure sensitive adhesive includes those as described above, but from the viewpoint of bettering the pressure sensitive adhesion characteristics and from the viewpoint of facilitating the formation of concave portions on the surface (α) of the resin layer, one or more selected from a metal chelate crosslinking agent and an epoxy crosslinking agent are preferably contained, a metal chelate crosslinking agent is more preferably contained, and an aluminum chelate crosslinking agent is still more preferably contained.

As one embodiment of the present invention, from the viewpoint of improving the shape retentivity of the plural concave portions existing on the surface (α) of the resin layer, the crosslinking agent (B) preferably contains both a metal chelate crosslinking agent and an epoxy crosslinking agent.

The content of the crosslinking agent (B) is preferably 0.01 to 15 parts by mass, more preferably 0.1 to 10 parts by mass, and still more preferably 0.3 to 7.0 parts by mass relative to 100 parts by mass of the acrylic resin (A) in the aforementioned acrylic pressure sensitive adhesive.

In the case where a metal chelate crosslinking agent and an epoxy crosslinking agents are used in combination, the content ratio of the metal chelate crosslinking agent to the epoxy crosslinking agent [(metal chelate crosslinking agent)/(epoxy crosslinking agent)] is preferably 10/90 to 99.5/0.5, more preferably 50/50 to 99.0/1.0, still more preferably 65/35 to 98.5/1.5, and yet still more preferably 75/25 to 98.0/2.0 in terms of a mass ratio.

The acrylic pressure sensitive adhesive to be used in one embodiment of the present invention may contain any ordinary additive within a range where the effects of the present invention are not impaired. Examples of the ordinary additive include those as described above, and the content of the ordinary additive is also as described above.

From the viewpoint of more improving the pressure sensitive adhesion characteristics of the surface (α), it is preferred that the acrylic pressure sensitive adhesive to be used in one embodiment of the present invention further contains a tackifier. Examples of the tackifier include those as described above, and the content of the tackifier is also as described above.

The acrylic pressure sensitive adhesive to be used in one embodiment of the present invention may contain any other pressure sensitive adhesive resin than the acrylic resin (A) (for example, a urethane resin, a rubber resin, and a silicone resin) within a range where the effects of the present invention are not impaired.

The content of the acrylic resin (A) in the acrylic pressure sensitive adhesive is preferably 50 to 100% by mass, more preferably 70 to 100% by mass, still more preferably 80 to 100% by mass, and yet still more preferably 100% by mass relative to the total amount (100% by mass) of the pressure sensitive adhesive resin contained in the acrylic pressure sensitive adhesive.

<Particle Part (Y)>

The resin layer which the pressure sensitive adhesive sheet of one embodiment of the present invention has contains a particle part (Y) consisting of fine particles containing silica particles.

From the viewpoint of improving the air escape property and the blister resistance of the pressure sensitive adhesive sheet and from the viewpoint of facilitating the formation of concave portions and flat faces on the surface (α) of the resin layer, the average particle diameter of the silica particles is preferably 0.01 to 100 μm, more preferably 0.05 to 25 μm, and still more preferably 0.1 to 10 μm.

The silica particles to be used in one embodiment of the present invention may be any one of dry type silica and wet type silica.

The silica particles to be used in one embodiment of the present invention may also be an organic modified silica having been surface-modified with an organic compound having a reactive functional group or the like, an inorganic modified silica having been surface-treated with an inorganic compound, such as sodium aluminate, sodium hydroxide; an organic/inorganic modified silica having been surface-treated with any of these organic compounds and inorganic compounds, or an organic/inorganic modified silica having been surface-treated with an organic/inorganic hybrid material of a silane coupling agent; and the like.

These silica particles may be in the form of a mixture of two or more thereof.

The mass concentration of silica in the silica particles is preferably 70 to 100% by mass, more preferably 85 to 100% by mass, and still more preferably 90 to 100% by mass relative to the total amount (100% by mass) of the silica particles.

From the viewpoint of improving the air escape property and the blister resistance of the pressure sensitive adhesive sheet and from the viewpoint of facilitating the formation of concave portions and flat faces on the surface (α) of the resin layer, the volume average secondary particle diameter of the silica particles to be used in one embodiment of the present invention is preferably 0.5 to 10 μm, more preferably 1 to 8 μm, and still more preferably 1.5 to 5 μm.

In the present invention, the value of the volume average secondary particle diameter of the silica particles is a value determined through measurement of particle size distribution according to a Coulter counter method using Multisizer III or the like.

Examples of the fine particles other than the silica particles include inorganic particles, such as metal oxide particles, barium sulfate, calcium carbonate, magnesium carbonate, glass beads, and smectite, and organic particles, such as acrylic beads, and one or more selected from metal oxide particles and smectite are preferred.

Examples of the metal oxide particles include particles made of a metal oxide selected from titanium oxide, alumina, boehmite, chromium oxide, nickel oxide, copper oxide, titanium oxide, zirconium oxide, indium oxide, zinc oxide, and composite oxides thereof, and also include sol particles composed of those metal oxides.

Examples of the smectite include montmorillonite, beidellite, hectorite, saponite, stevensite, nontronite, and sauconite.

The content ratio of the silica particles in the fine particles is preferably 60 to 100% by mass, more preferably 70 to 100% by mass, further preferably 80 to 100% by mass, still further preferably 90 to 100% by mass, and still more further preferably 100%, based on the total amount (100% by mass) of the fine particles constituting the particle part (Y).

The mass retention rate after heating the resin layer of the pressure sensitive adhesive sheet of one embodiment of the present invention at 800° C. for 30 minutes is preferably 3 to 90% by mass, more preferably 5 to 80% by mass, further preferably 7 to 70% by mass, and still further preferably 9 to 60% by mass.

The mass retention rate can be assumed to be the content (% by mass) of the silica particles contained in the resin layer.

When the mass retention rate is 3% by mass or more, the pressure sensitive adhesive sheet can be excellent in air escape property and blister resistance. Furthermore, the concave portion can be readily formed on the surface (α) of the resin layer in the production of the pressure sensitive adhesive sheet of the present invention.

When the mass retention rate is 90% by mass or less, the resin layer has a high film strength, and the pressure sensitive adhesive sheet excellent in water resistance and chemical resistance can be readily formed. Furthermore, the flat face can be readily formed on the surface (α) of the resin layer in the production of the pressure sensitive adhesive sheet of the present invention.

[Method for Producing Pressure Sensitive Adhesive Sheet]

The method for producing a pressure sensitive adhesive sheet of the present invention will be described.

The method for producing a pressure sensitive adhesive sheet of the present invention is not particularly limited, and from the viewpoint of the productivity and also from the viewpoint of facilitating the formation of the concave portion and the flat face on the surface (α) of the resin layer, a production method including at least the following steps (1) and (2) is preferred.

Step (1): A step of forming a coating film (x') formed by a composition (x) containing a resin and having a content of silica particles of less than 15% by mass, and a coating film (y') formed by a composition (y) containing silica particles in an amount of 15% by mass or more.

Step (2): A step of drying the coating film (x') and the coating film (y') formed in the step (1), simultaneously.

<Step (1)>

The step (1) is a step of forming a coating film (x') formed by a composition (x) containing the resin and having a content of the silica particles of less than 15% by mass, and a coating film (y') formed by a composition (y) having the silica particles in an amount of 15% by mass or more.

The composition (x) is a forming material for the resin part (X), and it preferably contains a crosslinking agent together with the aforementioned resin and may further contain a tackifier as well as the aforementioned ordinary additive.

The composition (y) is a forming material for the particle part (Y), and may further contain a resin, a crosslinking agent, and a tackifier as well as the aforementioned ordinary additive. The composition (y) containing those components other than the silica particles, such as a resin, serves not only as the forming material for the particle part (Y) but also as the forming material for the resin part (X).

(Composition (x))

Examples of the resin contained in the composition (x) include a resin constituting the aforementioned resin part (X), and the resin is preferably a pressure sensitive adhesive resin having a functional group, more preferably the aforementioned acrylic resin (A) having a functional group, and still more preferably the aforementioned acrylic copolymer (A1).

The content of the resin in the composition (x) is typically 30% by mass or more, preferably 40% by mass or more, more preferably 50% by mass or more, still more preferably 55% by mass or more, yet still more preferably 60% by mass or more, and even yet still more preferably 70% by mass or more, and preferably 100% by mass or less, more preferably 99.9% by mass or less, and still more preferably 95% by mass or less, relative to the total amount (100% by mass (but excluding diluent solvent)) of the composition (x).

Examples of the crosslinking agent to be contained in the composition (x) include the crosslinking agent to be contained in the aforementioned resin part (X). One or more selected from a metal chelate crosslinking agent and an epoxy crosslinking agent are preferably contained, and a metal chelate crosslinking agent is more preferably contained.

Furthermore, from the viewpoint of improving the shape retentivity of the plural concave portions existing on the surface (α) of the resin layer, it is preferred that the composition (x) contains both a metal chelate crosslinking agent and an epoxy crosslinking agent.

In the case where the composition (x) contains both a metal chelate crosslinking agent and an epoxy crosslinking agent, the content ratio of the metal chelate crosslinking agent to the epoxy crosslinking agent in the composition (x) [(metal chelate crosslinking agent)/(epoxy crosslinking agent)] is preferably 10/90 to 99.5/0.5, more preferably 50/50 to 99.0/1.0, still more preferably 65/35 to 98.5/1.5, and yet still more preferably 75/25 to 98.0/2.0 in terms of a mass ratio.

The content of the crosslinking agent is preferably 0.01 to 15 parts by mass, more preferably 0.1 to 10 parts by mass, and still more preferably 0.3 to 7.0 parts by mass relative to 100 parts by mass of the resin contained in the composition (x).

The composition (x) is preferably an acrylic pressure sensitive adhesive containing the aforementioned acrylic resin (A) having a functional group and crosslinking agent (B), more preferably an acrylic pressure sensitive adhesive containing the aforementioned acrylic copolymer (A1) and crosslinking agent (B). In addition, the acrylic pressure sensitive adhesive may further contain a tackifier or an ordinary additive.

The details of the aforementioned acrylic pressure sensitive adhesive are as described above.

The composition (x) may contain the aforementioned silica particles.

However, the content of the silica particles in the composition (x) is less than 15% by mass and is smaller than the content of the resin contained in the composition (x).

Specifically, the content of the silica particles in the composition (x) is less than 15% by mass, preferably 0 to 13% by mass, more preferably 0 to 10% by mass, still more preferably 0 to 5% by mass, and yet still more preferably 0% by mass relative to the total amount (100% by mass (but excluding diluent solvent)) of the composition (x).

(Composition (y))

The composition (y) is a forming material for the particle part (Y) and contains at least the aforementioned silica particles in an amount of 15% by mass or more. From the viewpoint of dispersibility of the silica particles, the composition (y) preferably contains a resin together with the silica particles, and more preferably further contains a crosslinking agent together with the resin. In addition, the composition (y) may further contain a tackifier or an ordinary additive.

The components other than the silica particles to be contained in the composition (y) (a resin, a crosslinking agent, a tackifier, and an ordinary additive) serve as the forming material for the resin part (X).

The composition (y) may contain fine particles other than the silica particles.

From the viewpoint of facilitating the formation of the concave portions and the flat faces having irregular shapes formed through self-formation of the resin layer on the surface (α) of the resin layer, the content of the silica particles in the composition (y) is 15% by mass or more, preferably 20 to 100% by mass, more preferably 25 to 90% by mass, further preferably 30 to 85% by mass, and still further preferably 35 to 80% by mass, based on the total amount (100% by mass (except for a diluent solvent)) of the composition (y).

Examples of the resin to be contained in the composition (y) include the same resins as those of the resin to be contained in the aforementioned composition (x), and it is preferred that the same resin as in the composition (x) is contained. These resins may be used either alone or in combination of two or more thereof.

More specifically, the resin to be contained in the composition (y) is preferably a resin having a functional group, more preferably the aforementioned acrylic resin (A) having a functional group, and still more preferably the aforementioned acrylic copolymer (A1).

The content of the resin in the composition (y) is typically 0 to 85% by mass, preferably 1 to 80% by mass, more preferably 5 to 75% by mass, still more preferably 10 to 70% by mass, and yet still more preferably 20 to 65% by mass relative to the total amount (100% by mass (but excluding diluent solvent)) of the composition (y).

Examples of the crosslinking agent to be contained in the composition (y) include the same materials as those in the crosslinking agent to be contained in the aforementioned resin part (X). Among these, it is preferred that the composition (y) contains one or more selected from a metal chelate crosslinking agent and an epoxy crosslinking agent, and it is more preferred that the composition (y) contains a metal chelate crosslinking agent. Furthermore, as one embodiment of the present invention, it is preferred that the composition (y) contains both a metal chelate crosslinking agent and an epoxy crosslinking agent.

In the case where the composition (y) contains both a metal chelate crosslinking agent and an epoxy crosslinking agent, a suitable range of the content ratio (mass ratio) of the metal chelate crosslinking agent to the epoxy crosslinking agent in the composition (y) is the same as in the aforementioned composition (x).

The content of the crosslinking agent in the composition (y) is preferably 0.01 to 15 parts by mass, more preferably 0.1 to 10 parts by mass, and still more preferably 0.3 to 7.0 parts by mass relative to 100 parts by mass of the resin to be contained in the composition (y).

(Formation Method of Coating Films (x') and (y'))

For facilitating the formation of a coating film, it is preferred that a solvent is blended in the composition (x) or (y) to give a solution of the composition.

Examples of the solvent include water and organic solvents.

Examples of the organic solvent include toluene, ethyl acetate, butyl acetate, methyl ethyl ketone, methyl isobutyl ketone, methanol, ethanol, isopropyl alcohol, t-butanol, sec-butanol, acetylacetone, cyclohexanone, and n-hexane, cyclohexane. These solvents may be used either alone or in combination of two or more thereof.

Though the order of laminating the coating films (x') and (y') to be formed in this step is not particularly limited, it is preferred that the coating film (x') is laminated on the coating film (y').

Regarding the formation method of the coating films (x') and (y'), there may be employed a successive formation method of forming a coating film (y') and then forming a coating film (x') on the coating film (y'), or from the viewpoint of productivity, there may also be employed a simultaneous coating method of coating with both the coating film (y') and the coating film (x') using a multilayer coater.

Examples of the coater for use in successive formation include a spin coater, a spray coater, a bar coater, a knife coater, a roll coater, a knife roll coater, a blade coater, a gravure coater, a curtain coater, and a die coater.

Examples of the coater for use in simultaneous coating with a multilayer coater include a curtain coater and a die coater, and among these, a die coater is preferred from the viewpoint of operability.

In this step (1), after the formation of at least one of the coating film (x') and the coating film (y') and prior to the step (2), a pre-drying treatment may be carried out in such a degree that the curing reaction of the coating film does not proceed.

Though the drying temperature in the pre-drying treatment in this step (1) is generally set within a temperature range in which the formed coating film is not cured, it is preferably lower than the drying temperature in the step (2). A specific drying temperature as prescribed in terms of the "lower than the drying temperature in the step (2)" is preferably 10 to 45° C., more preferably 10 to 34° C., and still more preferably 15 to 30° C.

<Step (2)>

The step (2) is a step of drying the coating film (x') and the coating film (y') formed in the step (1), simultaneously.

In this step, the coating film (x') and the coating film (y') formed are dried simultaneously, whereby a resin layer containing the resin part (X) and the particle part (Y) is formed, and in addition, plural concave portions and flat faces are formed on the surface (α) of the resin layer.

From the viewpoint of facilitating the formation of concave portions and flat faces on the surface (α) of the resin layer, the drying temperature in this step is preferably 35 to 200° C., more preferably 60 to 180° C., still more preferably 70 to 160° C., and yet still more preferably 80 to 140° C.

When the drying temperature is 35° C. or higher, a pressure sensitive adhesive sheet having good air escape property can be obtained. On the other hand, when the drying temperature is 200° C. or lower, the substrate and the release material which the pressure sensitive adhesive sheet has can be made free from trouble of shrinkage thereof.

When the drying temperature is lower, the height difference of the concave portions to be formed becomes large, but the number of concave portions to be formed tends to decrease.

In the surroundings of the particle part (Y) of the resin layer to be formed in this step, a void part (Z) is readily formed.

The void part (Z) can be readily formed by the silica particles contained in the aforementioned composition (y).

In the case where a pressure sensitive adhesive sheet having a resin layer having a multilayer structure is produced such that the multilayer structure is formed by laminating a layer (Xβ) mainly containing the resin part (X), a layer (Y1) containing the particle part (Y) in an amount of 15% by mass or more, and a layer (Xα) mainly containing the resin part (X) in this order, like the pressure sensitive adhesive sheet 1a of FIG. 1(a), etc. a production method of the following first and second embodiments is preferred.

In the description of the production method of the following first and second embodiments, the "composition (xβ)" and the "composition (xα)" are the same as the aforementioned composition (x), unless specifically indicated, and the details of the respective components to be contained in the composition (xβ) or (xα) (e.g., the resin, the crosslinking agent, the tackifier, the ordinary additive, the diluent solvent) (specific exemplification of each component, suitable components, content of component, solid concentration, etc.) are also the same as in the aforementioned composition (x). In addition, the "composition (y)" is also the same as described above.

[Production Method of First Embodiment]

The production method of the first embodiment includes at least the following steps (1A) and (2A).

Step (1A): A step of forming, on a substrate or a release material, a coating film (xβ') formed by a composition (xβ) containing a resin and having the content of silica particles in an amount of less than 15% by mass, the coating film (y') formed by the component (y) containing the aforementioned silica particles in an amount of 15% by mass or more, and a coating film (xα') formed by a composition (xα) containing a resin and having the content of silica particles in an amount of less than 15% by mass, by laminating in this order.

Step (2A): A step of drying the coating film (xβ'), the coating film (y'), and the coating film (xα') formed in the step (1A), simultaneously.

In the step (1A), it is also preferred that the aforementioned solvent is blended in the composition (xβ), the composition (y), and the composition (xα) to form solutions of the respective compositions, and the resultant solutions are used for coating.

Regarding the formation method of the coating film (xβ'), the coating film (y'), and the coating film (xα'), there may be employed a successive formation method of forming a coating film (xβ9 on a substrate or a release material, then forming a coating film (y') on the coating film (xβ'), and further forming a coating film (xα') on the coating film (y'), by using the aforementioned coater, or a simultaneous coating method of forming a coating film (xβ9, a coating film (y'), and a coating film (xα') by using the aforementioned multilayer coater.

In the step (1A), after formation of one or more coating films of the coating film (xβ'), the coating film (y'), and the coating film (xα') and prior to the step (2A), a pre-drying treatment may be carried out in such a degree that the curing reaction of the coating films does not proceed.

For example, after formation of the coating film (xβ'), the coating film (y'), and the coating film (xα'), such a pre-drying treatment may be carried out every time after the formation, or after the formation of the coating film (xβ') and the coating film (y'), the two may be subjected to the aforementioned pre-drying treatment all together, and then the coating film (xα) may be formed thereon.

In this step (1A), though the drying temperature for the pre-drying treatment is generally so set as to fall within a temperature range in such a degree that curing of the formed coating film does not proceed, it is preferably lower than the drying temperature in the step (2A). A specific drying temperature as prescribed in terms of the "lower than the drying temperature in the step (2A)" is preferably 10 to 45° C., more preferably 10 to 34° C., and still more preferably 15 to 30° C.

The step (2A) is a step of drying the coating film (xβ'), the coating film (y'), and the coating film (xα') formed in the step (1A), simultaneously. The preferred range of the drying temperature in this step is the same as that in the aforementioned step (2). In this step, a resin layer containing the resin part (X) and the particle part (Y) is formed.

Production Method of Second Embodiment

The production method of the second embodiment includes at least the following steps (1B) and (2B).

Step (1B): A step of forming, on a layer (Xβ) mainly containing a resin part (X) that is provided on a substrate or a release material, a coating film (y') formed by a composition (y) containing the aforementioned silica panicles in an amount of 15% by mass or more and a coating film (xα') formed by a composition (xα) containing a carbon atom-containing resin having a carbon atom in a main chain of a constitutional unit and having a content of silica particles of less than 15% by mass, by laminating in this order Step (2B): A step of drying the coating film (y') and the coating film (xα') formed in the step (1B) simultaneously.

In the step (1B), the "layer (Xβ) mainly containing a resin part (X)" can be formed by drying the aforementioned coating film (xβ') formed by a composition (xβ) containing a resin as a main component.

The layer (Xβ) is formed of the composition (xβ), and therefore, the layer (Xβ) may contain a crosslinking agent, an ordinary additive, and others in addition to the resin. The content of the resin part (X) in the layer (Xβ) is as described above.

Regarding the formation method of the layer (Xβ), it is possible to form the layer (Xβ) in a manner that a coating film (xβ') formed by a composition (xβ) containing a resin as a main component is formed on a substrate or a release material, and the coating film (xβ') is then dried.

The drying temperature at this time is not particularly limited, and it is preferably 35 to 200° C., more preferably 60 to 180° C., still more preferably 70 to 160° C., and yet still more preferably 80 to 140° C.

This embodiment differs from the aforementioned first embodiment in that the coating film (y') and the coating film (xα') are formed in this order on the layer (Xβ) formed by drying, but not on the coating film (xβ').

In the step (1B), it is also preferred that the aforementioned solvent is blended in the composition (y) and the composition (xα) to form solutions of the respective compositions, and thereafter, the solutions are used for coating.

Regarding the formation method of the coating film (y') and the coating film (xα'), there may be employed a successive formation method of forming a coating film (y') on the layer (Xβ) and then forming a coating film (xα') on the coating film (y'), by using the aforementioned coater, or a simultaneous coating method of coating with both the coating film (y') and the coating film (xα') by using the aforementioned multilayer coater.

In this step (1B), after formation of the coating film (y') or after formation of the coating film (y') and the coating film (xα') and prior to the step (2B), a pre-drying treatment may be carried out in such a degree that the curing reaction of the coating films does not proceed.

In this step (1B), though the drying temperature for the pre-drying treatment is generally so set as to fall within a temperature range in such a degree that curing of the formed coating film does not proceed, it is preferably lower than the drying temperature in the step (2B). A specific drying temperature as prescribed in terms of the "lower than the drying temperature in the step (2B)" is preferably 10 to 45° C., more preferably 10 to 34° C., and still more preferably 15 to 30° C.

The step (2B) is a step of drying the coating film (y') and the coating film (xα') formed in the step (1B), simultaneously, and the preferred range of the drying temperature in this step is the same as in the aforementioned step (2). In this step, a resin layer containing the resin part (X) and the particle part (Y) is formed.

EXAMPLES

The present invention is described more specifically with reference to the following Examples, but it should be construed that the present invention is not limited to the following Examples. The physical property values in the following Production Examples and Examples are values measured by the following methods.
<Mass Average Molecular Weight (Mw)>

The measurement was performed by using a gel permeation chromatography instrument (manufactured by Tosoh Corporation, a product name: "HLC-8020) under the following conditions, and a value measured as the standard polystyrene conversion was used.
(Measurement Condition)

Column: "TSK guard column HXL-L", "TSK gel G2500HXL", "TSK gel G2000HXL", and "TSK gel G1000HXL" (all manufactured by Tosoh Corporation), connected in series Column temperature: 40° C.
Developing solvent: tetrahydrofuran
Flow rate: 1.0 mL/min
<Measurement of Volume Average Secondary Particle Diameter of Silica Particles>

The volume average secondary particle diameter of the silica particles was determined by measuring the particle size distribution with Multisizer III (manufactured by Beckman Coulter Inc.) by the Coulter Counter method.
<Measurement of Thickness of Resin Layer>

The thickness of the resin layer was measured by using a constant pressured thickness measuring instrument, manufactured by TECLOCK Corporation (model number: "PG-02J", standard specification: in conformity with JIS K6783, Z1702, and Z1709)

Specifically, a value obtained by measuring the total thickness of the pressure sensitive adhesive sheet as the measuring object, from which was then subtracted the previously measured thickness of the substrate or release sheet, was defined as the "thickness of resin layer".

Production Examples x-1 to x-4

(Preparation of Solutions (xβ-1) to (xβ-2) and (xα-1) to (xα-2) of Resin Composition)

To the solution of an acrylic resin that is a pressure sensitive adhesive resin, having the kind and the solid content shown in Table 1, a crosslinking agent and a tackifier, each having with the kind and the blending amount shown in Table 1, were added and then diluted with a diluent solvent shown in Table 1, thereby preparing solutions (xβ-1) to (xβ-2) and (xα-1) to (xα-2) of a resin composition each having the solid content shown in Table 1.

The details of the respective components shown in Table 1 used for the preparation of the solutions (xβ-1) to (xβ-2) and (xα-1) to (xα-2) of a resin composition are as follows.
<Solution of Acrylic Resin>

Solution (i): A mixed solution of toluene and ethyl acetate containing an acrylic resin (x-i) (an acrylic copolymer having structural units derived from raw material monomers, BA/AA=90/10 (% by mass), Mw: 630,000) having a solid concentration of 34.0% by mass.

Solution (ii): A mixed solution of toluene and ethyl acetate containing an acrylic resin (x-ii) (an acrylic copolymer having structural units derived from raw material monomers, BA/AA=90/10 (% by mass), Mw: 470,000) having a solid concentration of 37.0% by mass.

Solution (iii): A mixed solution of toluene and isopropyl alcohol (IPA) containing an acrylic resin (x-iii) (an acrylic copolymer having structural units derived from raw material monomers, 2EHA/VAc/AA=75/23/2 (% by mass), Mw: 660,000) having a solid concentration of 37.0% by mass.

Solution (iv): A solution of ethyl acetate containing an acrylic resin (x-iv) (an acrylic copolymer having structural units derived from raw material monomers, BA/AA/HEA=94/3/3 (% by mass), Mw: 1,000,000) having a solid concentration of 37.0% by mass.

The abbreviations of the raw material monomers constituting the aforementioned acrylic copolymers are as follows.
BA: n-Butyl acrylate
2EHA: 2-Ethylhexyl acrylate
AA: Acrylic acid
VAc: Vinyl acetate
HEA: 2-Hydroxyethyl acrylate
<Crosslinking Agent>

AI crosslinking agent: Product name "M-5A", manufactured by Soken Chemical & Engineering Co., Ltd., aluminum chelate crosslinking agent, solid concentration: 4.95% by mass Epoxy crosslinking agent: A solution of an epoxy crosslinking agent obtained by diluting "TETRAD-C" (a product name, manufactured by Mitsubishi Gas Chemical Co., Inc.) with toluene to make a solid concentration of 5% by mass <Tackifier>

Rosin ester TF: A rosin ester tackifier, Mw: less than 10,000, softening point: 85° C.

Styrene TF: A copolymer of a styrene monomer and an aliphatic monomer, Mw: less than 10,000, softening point: 95° C.

<Diluent Solvent>

Mixed solvent (1): A mixed solvent composed of a mixture of toluene/isopropyl alcohol (IPA)=65/35 (mass ratio)

Mixed solvent (2): A mixed solvent composed of a mixture of ethyl acetate/IPA=86/14 (mass ratio)

TABLE 1

| | Solution of resin composition | Solution of acrylic resin | | | | Crosslinking agent | | Blending amount of solid relative to 100 parts by mass of resin (parts by mass) |
|---|---|---|---|---|---|---|---|---|
| | | Kind | Kind of resin | Blending amount (parts by mass) | Blending amount of solid (parts by mass) | Kind | Blending amount (parts by mass) | Blending amount of solid (parts by mass) |
| Production Example x-1 | (xβ-1) | Solution (i) | Acrylic resin (x-i) [BA/AA = 90/10 (wt %), Mw = 630,000] | 100.0 | 34.0 | Al crosslinking agent | 2.53 | 0.13 | 0.37 |
| | | | | | | Epoxy crosslinking agent | 0.38 | 0.02 | 0.06 |
| Production Example x-2 | (xβ-2) | Solution (ii) | Acrylic resin (x-ii), [BA/AA = 90/10 (wt %), Mw = 470,000] | 50.0 | 18.5 | Al crosslinking agent | 9.00 | 0.45 | 1.20 |
| | | Solution (iii) | Acrylic resin (x-iii) [2EHA/VAc/AA = 75/23/2 (wt %), Mw = 660,000] | 50.0 | 18.5 | | | | |
| Production Example x-3 | (xα-1) | Solution (iv) | Acrylic resin (x-iv), [BA/AA/HEA = 94/3/3 (wt %), Mw = 1,000,000] | 100.0 | 37.0 | Al crosslinking agent | 1.00 | 0.05 | 0.13 |
| | | | | | | Epoxy crosslinking agent | 0.10 | 0.01 | 0.01 |
| Production Example x-4 | (xα-2) | Solution (iv) | Acrylic resin (x-iv), [BA/AA/HEA = 94/3/3 (wt %), Mw = 1,000,000] | 100.0 | 37.0 | Al crosslinking agent | 1.00 | 0.05 | 0.13 |
| | | | | | | Epoxy crosslinking agent | 0.10 | 0.01 | 0.01 |

| | Tackifier | | | Total blending amount of solid relative to 100 parts by mass of resin (parts by mass) | Diluent solvent Kind | Solid concentration of solution of resin composition (mass %) |
|---|---|---|---|---|---|---|
| | Kind | Blending amount of solid (parts by mass) | Total blending amount of solid (parts by mass) | | | |
| Production Example x-1 | — | — | — | — | Mixed solvent (1) | 24 |
| Production Example x-2 | — | — | — | — | Mixed solvent (2) | 30 |
| Production Example x-3 | Rosin ester TF | 10.0 | 10.0 | 27.0 | Mixed solvent (2) | 30 |
| Production Example x-4 | Rosin ester TF | 10.0 | 20.0 | 54.1 | Mixed solvent (2) | 30 |
| | Styrene TF | 10.0 | | | | |

Production Example f-1

(Preparation of Fine Particle Dispersion Liquid (f-1))

To 100 parts by mass (solid content: 34.0 parts by mass) of a mixed solution of toluene and ethyl acetate containing a solution (i) of an acrylic resin containing the aforementioned acrylic resin (x-i) (an acrylic copolymer having structural units derived from butyl acrylate (BA) and acrylic acid (AA), BA/AA=90/10 (% by mass), Mw: 630,000) and having a solid concentration of 34.0% by mass, 51.0 parts by mass (solid content: 51.0 parts by mass) of silica particles (a product name: "Nipsil E-200A", manufactured by Tosoh Silica Corporation, volume average secondary particle diameter: 3 μm) as fine particles and toluene were added, and the fine particles were dispersed, thereby preparing a fine particle dispersion liquid (f-1) having a solid concentration of 27% by mass containing the acrylic resin and the silica particles.

Production Example f-2

(Preparation of Fine Particle Dispersion Liquid (f-2))

In place of the solution (i), to 100 parts by mass (solid content: 37.0 parts by mass) of a mixed solution of toluene and ethyl acetate containing a solution (ii) of an acrylic resin containing the aforementioned acrylic resin (x-ii) (an acrylic copolymer having structural units derived from butyl acrylate (BA) and acrylic acid (AA), BA/AA=90/10 (% by mass), Mw: 470,000) and having a solid concentration of 37.0% by mass, 55.5 parts by mass (solid content: 55.5 parts by mass) of silica particles (a product name: "Nipsil E-200A", manufactured by Tosoh Silica Corporation, volume average secondary particle diameter: 3 μm) as fine particles and toluene were added, and the fine particles were dispersed, thereby preparing a fine particle dispersion liquid (f-2) having a solid concentration of 30% by mass containing the acrylic resin and the silica particles.

Production Examples y-1 to y-2

(Preparation of Coating Liquids (y-1) to (y-2) for Forming Coating Film (y'))

A fine particle dispersion liquid, a solution of an acrylic resin, a crosslinking agent, and a diluent solvent, each having the kind and blending amount shown in Table 2, were added, thereby preparing each of coating liquids (y-1) to (y-2) for forming a coating film (y') having a solid concentration shown in Table 2.

The details of the respective components shown in Table 2 used for the preparation of the coating liquids (y-1) to (y-2) for forming a coating film (y') are as follows.

<Fine Particle Dispersion Liquid>

Dispersion liquid (f-1): A fine particle dispersion liquid (f-1) containing the acrylic resin (x-i) and the silica particles and having a solid concentration of 27% by mass, as prepared in Production Example f-1.

Dispersion liquid (f-2): A fine particle dispersion liquid (f-2) containing the acrylic resin (x-ii) and the silica particles and having a solid concentration of 30% by mass, as prepared in Production Example f-2.

<Solution of Acrylic Resin>

Solution (i): A mixed solution of toluene and ethyl acetate containing an acrylic resin (x-i) (an acrylic copolymer having structural units derived from raw material monomers, BA/AA=90/10 (% by mass), Mw: 630,000) having a solid concentration of 34.0% by mass.

Solution (ii): A mixed solution of toluene and ethyl acetate containing an acrylic resin (x-ii) (an acrylic copolymer having structural units derived from raw material monomers, BA/AA=90/10 (% by mass), Mw: 470,000) having a solid concentration of 37.0% by mass.

<Crosslinking Agent>

Al crosslinking agent: Product name "M-5A", manufactured by Soken Chemical & Engineering Co., Ltd., aluminum chelate crosslinking agent, solid concentration: 4.95% by mass Epoxy crosslinking agent: A solution of an epoxy crosslinking agent obtained by diluting "TETRAD-C" (a product name, manufactured by Mitsubishi Gas Chemical Co., Inc.) with toluene to make a solid concentration of 5% by mass <Diluent Solvent>

IPA/CHN: A mixed solvent of isopropyl alcohol (IPA) and cyclohexanone (CHN) (IPA/CHN=95/5 (mass ratio))

TABLE 2

| | | Fine particle dispersion liquid | | | Solution of acrylic resin | | | |
|---|---|---|---|---|---|---|---|---|
| Coating liquid for forming coating film (y') | Kind | Blending amount (parts by mass) | Blending amount of solid (parts by mass) | Content (*) of fine particles (parts by mass) | Kind | Kind of resin | Blending amount (parts by mass) | Blending amount of solid (parts by mass) |
| Production Example y-1 | Dispersion liquid (f-1) | 73.1 | 19.7 | 11.8 | Solution (i) | Acrylic resin (x-i) [BA/AA = 90/10 (wt %), Mw = 630,000] | 26.9 | 9.1 |
| Production Example y-2 | Dispersion liquid (f-2) | 69.7 | 20.9 | 12.5 | Solution (ii) | Acrylic resin (x-ii) [BA/AA = 90/10 (wt %), Mw = 470,000] | 18.5 | 6.8 |

TABLE 2-continued

|  |  | Crosslinking agent | | | | | |
|---|---|---|---|---|---|---|---|
|  | Kind | Blending amount (parts by mass) | Blending amount of solid (parts by mass) | Blending amount of solid relative to 100 parts by mass of resin (parts by mass) | Diluent solvent Kind | Solid concentration of coating liquid (mass %) | Concentration (**) of fine particles in solid of coating solution (mass %) |
| Production Example y-1 | Al crosslinking agent | 2.67 | 0.13 | 0.78 | IPA/ CHN | 24 | 41 |
|  | Epoxy crosslinking agent | 0.40 | 0.02 | 0.12 |  |  |  |
| Production Example y-2 | Al crosslinking agent | 5.25 | 0.26 | 1.71 | IPA/ CHN | 24 | 45 |

(*) Content of fine particles in fine particle dispersion liquid: (y-1) is concerned with a value calculated from {[blending amount of solid] × 51.0/(34 + 51.0)}; and (y-2) is concerned with a value calculated from {[blending amount of solid] × 55.5/(37 + 55.5)}.
(**) Concentration of fine particles in solid of coating solution: A value calculated from {[content of fine particles]/([blending amount of solid in fine particle dispersion liquid] + [blending amount of solid of acrylic resin] + [blending amount of solid of crosslinking agent]) × 100}.

Examples 1 to 2

(1) Formation of Coating Film

On a release agent layer of a release film (manufactured by Lintec Corporation, a product name: "SP-PET381031", thickness: 38 μm, a PET film having a silicone release agent layer provided on one surface thereof) that is a first release material, the solution (xβ-1) of the resin composition prepared in Production Example x-1, the coating liquid (y-1) for forming the coating film (y') prepared in Production Example y-1, and the solution (xβ-1) of the resin composition for forming the coating film (xα') prepared in Production Example x-1 were simultaneously coated in this order from the upper portion of the release agent layer with a multilayer the coater (width: 250 mm), thereby simultaneously forming a coating film (xβ'), a coating film (y'), and a coating film (xα') in this order.

The coating speed of each of the solutions (coating liquids) for forming the coating film (xβ'), the coating film (y'), and the coating film (xα') and the coating amount of each of the coating films are shown in Table 3.

(2) Drying Treatment

The three layers of the coating film (xβ'), the coating film (y'), and the coating film (xα') were simultaneously dried at a drying temperature of 100° C. for 2 minutes, thereby forming a resin layer containing a resin part (X) and a particle part (Y) having the thickness shown in Table 3.

In all of Examples 1 to 2, plural concave portions and flat faces were also confirmed on the surface (α) of the formed resin layer through visual inspection.

(3) Production of Pressure Sensitive Adhesive Sheet without Substrate and Pressure Sensitive Adhesive Sheet with Substrate Lamination was performed in such a manner that the surface (α) of the formed resin layer was attached to a surface of a release agent layer of a release film (manufactured by Lintec Corporation, a product name: "SP-PET386040") that is a second release material, thereby producing a pressure sensitive adhesive sheet without a substrate.

After allowing the aforementioned pressure sensitive adhesive sheet without a substrate as similarly produced to stand under an environment at 23° C. for one week, the first release material was removed, and lamination was performed in such a manner that the exposed surface (β) of the resin layer was attached to a polyethylene terephthalate (PET) film (manufactured by Toray Industries, Inc., a product name: "Lumirror T60 #50", thickness: 50 μm) that is a substrate, thereby producing a pressure sensitive adhesive sheet with a substrate.

Examples 3 to 4

(1) Formation of Coating Film

On a surface of a polyethylene terephthalate (PET) film having an aluminum vapor deposition layer on one surface thereof (manufactured by Lintec Corporation, a product name: "FNS MAT N50", thickness: 50 μm), the solution (xβ-2) of the resin composition prepared in Production Example x-2, the coating liquid (y-2) for forming the coating film (y') prepared in Production Example y-2, and the solution (xα-1) or (xα-2) of the resin composition prepared in Production Example x-3 or x-4 were simultaneously coated in this order from the upper portion of the aluminum vapor deposition layer with a multilayer die coater (width: 250 mm), thereby simultaneously forming a coating film (xβ'), a coating film (y'), and a coating film (xα') in this order.

The coating speed of each of the solutions (coating liquids) for forming the coating film (xβ'), the coating film (y'), and the coating film (xα') and the coating amount of each of the coating films are shown in Table 3.

(2) Drying Treatment

The three layers of the coating film (xβ'), the coating film (y'), and the coating film (xα') were simultaneously dried at a drying temperature of 100° C. for 2 minutes, thereby forming a resin layer containing a resin part (X) and a particle part (Y) having the thickness shown in Table 3.

In all of Examples 3 to 4, plural concave portions and flat faces were also confirmed on the surface (α) of the formed resin layer through visual inspection.

(3) Production of Pressure Sensitive Adhesive Sheet with Substrate

Lamination was performed in such a manner that the surface (α) of the formed resin layer was attached to a surface of a release agent layer of a release film (manufactured by Lintec Corporation, a product name: "SP-PET381031"), thereby producing a pressure sensitive adhesive sheet with a substrate.

TABLE 3

| | Coating speed (m/min) | Coating amount of coating film (g/m²) | | | Coating film (xβ') Kind of solution | Kind of coating liquid | Coating film (y') | | Coating film (xα') Kind of solution | Thickness of resin layer (μm) |
|---|---|---|---|---|---|---|---|---|---|---|
| | | Coating film (xβ') | Coating film (y') | Coating film (xα') | | | Concentration of fine particles in coating film (y') (mass %) | | | |
| Example 1 | 5.0 | 43.7 | 35.0 | 55.0 | (xβ-1) | (y-1) | 41 | | (xβ-1) | 32 |
| Example 2 | 5.0 | 54.2 | 50.0 | 55.0 | (xβ-1) | (y-1) | 41 | | (xβ-1) | 38 |
| Example 3 | 5.0 | 26.7 | 50.0 | 52.0 | (xβ-2) | (y-2) | 45 | | (xα-1) | 34 |
| Example 4 | 5.0 | 27.0 | 48.2 | 56.2 | (xβ-2) | (y-2) | 45 | | (xα-2) | 35 |

Comparative Examples 1 to 4

(1) Production of Embossed Release Paper

On one surface of a wood-free paper, a 25 μm-thick resin film made of a low-density polyethylene resin (manufactured by Sumitomo Chemical Co., Ltd., a product name: "SUMIKATHENE (L705)", melting point: 106° C.) was formed. A relief formed face of a metal engraved plate was brought into intimate contact with the surface of the resin film and inserted in that state between two rotating silicon rubber rollers heated at 115° C., thereby subjecting the surface of the resin layer to emboss processing.

On the surface of the resin layer after the emboss processing, a silicone release agent (manufactured by Lintec Corporation, the same release agent as a product name: "SP-PET1031") and then dried at 100° C. for 1 minute, thereby producing a 110 μm-thick embossed release paper.

As the relief formed face of the metal engraved plate, those processed such that respective concave portions and flat faces were formed on the surface (α) of the resin layer of the pressure sensitive adhesive sheet produced in each of Comparative Examples 1 to 4 were used.

(2) Production of Pressure Sensitive Adhesive Sheet with Substrate

On the release agent layer of the embossed release paper produced in the above (I), the solution (xβ-1) of the resin composition prepared in Production Example x-1 as shown in Table 1 was coated with an applicator and then dried at 100° C. for 1 minute, thereby forming a resin layer so as to have the coating speed and the coating amount of each coating film as described in Example in Table 3.

Then, lamination was performed in such a manner that surface (α) of the resin layer was attached to a PET film (manufactured by Toray Industries, Inc., a product name: "Lumirror T60 #50", thickness: 50 μm), thereby producing a pressure sensitive adhesive sheet with a substrate.

Using the pressure sensitive adhesive sheet without a substrate or the pressure sensitive adhesive sheet with a substrate produced in each of the Examples and Comparative Examples, characteristics of the resin layer which the pressure sensitive adhesive sheet had and the pressure sensitive adhesive sheet were measured or observed by the following methods. The results are shown in Table 4.

(1) Production of Measurement Sample

As shown in FIG. 6(a), in order to exclude any influence, such as undulations of the pressure sensitive adhesive sheet, a no-alkali glass (a product name: "EAGLE XG", manufactured by Corning Incorporated) that is an adherend 101 having a smooth face and the substrate of the pressure sensitive adhesive sheet produced in each of the Examples and Comparative Examples were attached to each other via a double-sided pressure sensitive adhesive tape.

Then, the release material laminated on the surface (α) of the resin layer of the pressure sensitive adhesive sheet was removed, and the resultant in which the surface (α) of the resin layer was exposed was used as the measurement sample.

<Whether or not Concave Portion and Flat Face can be Visually Confirmed>

Evaluation item (a): The exposed surface (α) of the resin layer of the measurement sample was visually observed, and whether or not the concave portion and the flat face existing on the surface (α) were visually confirmed was evaluated by the following standard.

A: The concave portion and the flat face existing on the surface (α) were visually confirmed.

F: The concave portion and the flat face existing on the surface (α) were not visually confirmed.

(2) Acquirement of Images of Region (D) and Region (Q) on Surface (a)

On the exposed surface (α) of the resin layer of the measurement sample, regions adjacent to each other freely-selected on the surface (α) were photographed from the direction A shown in FIG. 6(a) with a digital microscope (magnification: 50), and the adjacent plural images were connected by the image connecting function of the digital microscope, so as to acquire a connected image.

In the photographing, more specifically, the focal point was gradually moved in the direction A shown in FIG. 6(a) from above of the site that was judged to be the flat face, and a portion that firstly came into focus was photographed as the flat face.

On the connected image thus acquired, one region (D) surrounded by a rectangle having a size of 8 mm in length× 10 mm in width was freely-selected, and was designated as the "image of the region (D)".

On the connected image thus acquired, one region (Q) surrounded by a square having an edge length of 1 mm was freely-selected, and was designated as the "image of the region (Q)".

The photographing conditions with the digital microscope in the aforementioned item (2) were as follows.

(Measurement Equipment)

"Digital Microscope VHX-5000", a product name, with High Resolution Zoom Lens VHX-ZST (magnification: 100), produced by Keyence Corporation.

(Measurement Conditions)

Epi-illumination: ON

Stage transmitted illumination: OFF

Illumination switch: coaxial epi-illumination

Edge enhancement: OFF

<Evaluation Relating to Shape, Etc. of Concave Portion and Flat Face>

The observation relating to the following evaluation items (b1) to (b4) and (c1) to (c4) for the "image of the region (D)" and the "image of the region (Q)" acquired in the item (2) was performed and evaluated by the respective standards. The results of the evaluation are shown in Table 4.

(Evaluation Items relating to Shape and Position of Flat Face existing in Region (D))

Evaluation item (b1): Whether or not a flat face having an irregular shape existed in the region (D) was evaluated from the acquired "image of the region (D)" by the following standard.

A: Plural flat faces having an irregular shape existed.
B: Only one flat face having an irregular shape existed.
C: No flat face having an irregular shape existed.

Evaluation item (b2): Whether or not a flat face having an area, in which a region surrounded by a circle having a diameter of at least 100 µm is selected, existed in the region (D) was evaluated from the acquired "image of the region (D)" by the following standard.

A+: A flat face having an area, in which a region surrounded by a circle having a diameter of 200 µm was selectable, existed in the region (D).
A: A flat face having an area, in which a region surrounded by a circle having a diameter of 150 µm was selectable, existed in the region (D).
B: A flat face having an area, in which a region surrounded by a circle having a diameter of 100 µm was selectable, existed in the region (D).
C: A flat face having an area, in which a region surrounded by a circle having a diameter of 100 µm was selectable, did not exist in the region (D).

Evaluation item (b3): Whether or not the positions of the plural flat faces existing in the region (D) had no periodicity was evaluated from the acquired "image of the region (D)" by the following standard.

A: The positions of the plural flat faces existing had no periodicity.
F: The positions of the plural flat faces existing had periodicity, or plural flat faces did not exist in the region (D).

Evaluation item (b4): Whether or not the shapes of the flat faces existing in the region (D) each had a shape becoming a fixed repeating unit was evaluated from the acquired "image of the region (D)" by the following standard.

A: The shapes of the flat faces each did not have a shape becoming a fixed repeating unit.
F: The shapes of the flat faces each had a shape becoming a fixed repeating unit.

(Evaluation Items Relating to Shape and Position of Concave Portion Existing in Region (D))

Evaluation item (c1): Whether or not a concave portion having an irregular shape existed in the region (D) was evaluated from the acquired "image of the region (D)" by the following standard.

A: Plural concave portions having an irregular shape existed.
B: Only one concave portion having an irregular shape existed.
C: No concave portion having an irregular shape existed.

Evaluation item (c2): Whether or not the positions of the plural concave portions existing in the region (D) had no periodicity was evaluated from the acquired "image of the region (D)" by the following standard.

A: The positions of the plural concave portions existing had no periodicity.
F: The positions of the plural concave portions existing had periodicity, or plural concave portions did not exist in the region (D).

Evaluation item (c3): Whether or not the shapes of the concave portions existing in the region (D) each had a shape becoming a fixed repeating unit was evaluated from the acquired "image of the region (D)" by the following standard.

A: The shapes of the concave portions each did not have a shape becoming a fixed repeating unit.
F: The shapes of the concave portions each had a shape becoming a fixed repeating unit.

(Evaluation Item Relating to Whether or not Concave Portion Having Irregular Shape Exists in Region (Q))

Evaluation item (c4): Whether or not a concave portion having an irregular shape existed in the region (Q) was evaluated from the acquired "image of the region (Q)" by the following standard.

A: Plural concave portions having an irregular shape existed in the region (Q).
B: Only one concave portion having an irregular shape existed in the region (Q).
C: No concave portion having an irregular shape existed in the region (Q).

(3) Measurement of Areas of Concave Portion and Flat Face Existing in Region (D)

Based on the "image of the region (D)" acquired in the item (2), the areas of the concave portion and the flat face existing in the region (D) were measured by automatic area measurement with the same digital microscope as above.

In the automatic area measurement, the concave portion and the flat face existing in the region (D) were binarized with the digital microscope or depending on necessity by visual image processing, and the resulting binarized image was measured for numerical value (area), so as to measure the areas of the concave portion and the flat face. In the case where plural concave portions or plural flat faces existed, the areas of the respective concave portions or the respective flat faces were measured.

The conditions for the automatic area measurement were as follows.

(Automatic Area Measurement Conditions)

Extraction mode: Illuminance (noise removal: weak)
Extraction region: Extracting a rectangle having a size of 8 mm in length×10 mm in width
Shaping of extraction region: Particle removal (an area of 100 µm$^2$ or less was removed)

In the case where whether or not the flat face existed was not able to judge through visual observation of the image, a translucent adherend having a smooth surface was adhered to the surface (α) of the resin layer with a squeezee while preventing as much as possible load from being applied thereto, an interface between the smooth surface 100a of the translucent adherend 100 and the surface (α) 12a of the resin layer 12 was photographed from the W direction in FIG. 6(b), and in the surface (α) 12a, a portion that was adhered to the smooth surface 100a was judged as the flat face.

Similar to the "adherend having a smooth surface", a no-alkali glass ("EAGLE XG", a product name, produced by Corning Inc.) was used for the translucent adherend 100 having the smooth surface 100a.

The various measured values (e.g., the average value, the standard deviation, the maximum value, and the minimum value) were calculated from data of the areas of each of the concave portions and the area of each of the flat faces by using a spreadsheet software "Microsoft Excel" (produced by Microsoft Corporation).

<Area Ratio Occupied by Flat Face or Concave Portion>

The "area ratio (%) occupied by the concave portion" and "area ratio (%) occupied by the flat face" with respect to the total area of the region (D) were calculated. The results of the evaluation are shown in Table 4.

The calculation of property values and the evaluation relating to the following evaluation items (d1), (d2), (e1), and (e2) were also performed. The results of the evaluation are shown in Table 4.

<Evaluation Relating to Areas of Flat Face and Concave Portion Existing in Region (D)>

Evaluation item (d1): Whether or not a flat face having an area of 0.2 mm² or more existed in the region (D) was evaluated by the following standard.

A+: Plural flat faces having an area of 0.4 mm² or more existed.

A: One flat face having an area of 0.4 mm² or more existed, in addition, plural flat faces having an area of 0.2 mm² or more and less than 0.4 mm² existed.

B+: Plural flat faces having an area of 0.2 mm² or more and less than 0.4 mm² existed.

B: One flat face having an area of 0.2 mm² or more and less than 0.4 mm² existed.

C: The maximum value of the areas of the flat faces existing in the region (D) was less than 0.2 mm².

Evaluation item (d2): The area ratio occupied by the flat face having an irregular shape existing in the region (D) with respect to the total area of the flat faces existing in the region (D) was calculated and evaluated by the following standard.

A+: The area ratio occupied by the flat face having an irregular shape was 100%.

A: The area ratio occupied by the flat face having an irregular shape was 90% or more and less than 100%.

B: The area ratio occupied by the flat face having an irregular shape was 80% or more and less than 90%.

C: The area ratio occupied by the flat face having an irregular shape was less than 80%.

Evaluation item (e1): The area ratio occupied by the concave portion having the maximum area in the region (D) with respect to the total area of the concave portions existing in the region (D) was calculated by the following expression.

(Area ratio occupied by concave portion having maximum area(%))=((area of concave portion having maximum area)/(total area of concave portions))×100

Evaluation item (e2): The area ratio occupied by the concave portion having an irregular shape existing in the region (D) with respect to the total area of the concave portions existing in the region (D) was calculated and evaluated by the following standard.

A+: The area ratio occupied by the concave portion having an irregular shape was 100%.

A: The area ratio occupied by the concave portion having an irregular shape was 90% or more and less than 100%.

B: The area ratio occupied by the concave portion having an irregular shape was 80% or more and less than 90%.

C: The area ratio occupied by the concave portion having an irregular shape was less than 80%.

<Evaluation Relating to Cross Section of Region (P)>

As shown in FIG. 4, a region (P) surrounded by a square 50 having an edge length of 5 mm was freely-selected on the surface ($\alpha$) 12a of the resin layer 12 of the pressure sensitive adhesive sheet with a substrate produced in Examples and Comparative Examples, from which the release material had been removed.

As shown in FIG. 4, the pressure sensitive adhesive sheet was cut in the thickness direction with planar surfaces that passed through two diagonal lines 51 and 52 of the square 50 of the region (P) respectively and were perpendicular to the region (P) the surface ($\alpha$) 12a, thereby providing two cross sections 61 and 62, which were observed with a scanning electron microscope ("S-4700", a product name, produced by Hitachi, Ltd.) under conditions of an acceleration voltage of 5 kV and a magnification of 500, so as to provide two cross sectional images.

The following evaluation items (f), (g1), (g2), and (h1) to (h3) were performed by using the two cross sectional images. The results of the evaluation are shown in Table 4.

Evaluation item (f): Whether or not plural concave portions defined by the following requirement (I) and a flat portion defined in the following requirement (II) existed on the two cross sectional images acquired in the aforementioned item (4) on the side of the surface ($\alpha$) was evaluated by the following standard.

Requirement (I): The acquired cross sectional image had existing on the side of the surface ($\alpha$) 12a plural concave portions having a maximum height difference of 40% or more of the total thickness of the resin layer 12 and being different from each other in shape of the cut portion.

Requirement (II): The acquired cross sectional image had existing on the side of the surface ($\alpha$) 12a a flat portion corresponding to a cut portion of the flat face existing in the region (P) and being substantially in parallel to the surface of the substrate 11 in contact with the resin layer 12.

(Evaluation Standard)

A: Both the two acquired cross sectional images satisfied both the requirements (I) and (II).

B: Only one of the two acquired cross sectional images satisfied both the requirements (I) and (II).

C: No cross sectional image that satisfied both the requirements (I) and (II) was confirmed in the two acquired images.

For the pressure sensitive adhesive sheet that was evaluated as "A" or "C" in the aforementioned evaluation item (f), one cross sectional image was selected from the two cross sectional images, and the evaluation of the following evaluation items (g) and (h1) to (h3) was performed therefor. For the pressure sensitive adhesive sheet that was evaluated as "B" in the evaluation item (f), the evaluation was performed for the cross sectional image that satisfied both the requirements (I) and (II).

(Requirement Relating to Concave Portion Existing on Cross Section on Side of Surface ($\alpha$))

Evaluation item (g1): As shown in FIG. 5, on the acquired cross sectional image, the ratio (%) occupied by the total of the widths of the concave portions 13a existing on the surface ($\alpha$) 12a with respect to the width ($E_\alpha$) in the horizontal direction of the resin layer 12 on the side of the surface ($\alpha$) 12a as 100 was calculated.

Evaluation item (g2): On the acquired cross sectional image, whether or not a concave portion having a maximum height difference of 0.5 μm or more existed on the side of the surface ($\alpha$) 12a was evaluated by the following standard.

A: A concave portion having a maximum height difference of 0.5 μm or more existed.

F: A concave portion having a maximum height difference of 0.5 μm or more did not exist.

(Requirement Relating to Flat Portion Existing on Cross Section on Side of Surface ($\alpha$))

Evaluation item (h1): As shown in FIG. 5, on the acquired cross sectional image, the ratio (%) occupied by the total of the widths of the flat portions 14a existing on the surface ($\alpha$) 12a with respect to the width ($E_\alpha$) in the horizontal direction of the resin layer 12 on the side of the surface ($\alpha$) 12a as 100 was calculated.

Evaluation item (h2): On the acquired cross sectional image, whether or not plural flat portions 14a existed on the side of the surface (α) 12a, and whether or not the positions of the plural flat portions 14a had periodicity were evaluated by the following standard.

A: Plural flat portions existed, and the positions of the plural flat portions had no periodicity.

B: Plural flat portions existed, but the positions of the plural flat portions had periodicity.

C: Plural flat faces did not exist.

Evaluation item (h3): On the acquired cross sectional image, whether or not plural flat portions 14a existed on the side of the surface (α) 12a, and whether or not the distances of each of the plural flat portions 14a to the substrate 11 were substantially the same as each other were evaluated by the following standard.

A: Plural flat portions existed, and the distances of each of the plural flat portions to the substrate were substantially the same as each other.

B: Plural flat portions existed, but the distances of each of the plural flat portions to the substrate were different from each other.

C: Plural flat faces did not exist.

<Measurement of Intensity Ratio (Si/C) in Resin Layer>

(1) Measurement Sample

The pressure sensitive adhesive sheet with a substrate produced in Examples and Comparative Examples, from which the release material on the surface (α) had been removed, was used as a measurement sample.

(2) Measurement Equipment and Measurement Conditions of $S_{EDX}$ and $T_{EDX}$, and Ratio Thereof ($S_{EDX}/T_{EDX}$) of Resin Layer The cross section in the thickness direction of the measurement sample was observed with a scanning electron microscope ("S-4700", a product name, produced by Hitachi, Ltd.), and for the region (S) and the region (T) of the measurement sample, the peak intensities of the atoms were detected by area analysis with an energy dispersive X-ray analyzer ("INCA Energy", Type E2H, a product name, produced by Oxford Instruments plc), so as to calculate the prescribed intensity ratio (Si/C).

The procedures therefor are shown below.

(i) Determination of Region (S)

As shown in FIG. 7, a concave portion 13a having a ratio (ha/h) of the maximum height difference ha and the total thickness h of the resin layer 12 of 0.4 or more was selected, and a rectangle that passed through the lowest position ($N_a$), and had a vertical length (i.e., a length in the vertical direction) of the difference (h–ha) between the total thickness h of the resin layer 12 and the maximum height difference ha of the concave portion 13a and a horizontal length (i.e., a length in the horizontal direction perpendicular to the vertical direction) $S_L$ was designated as the region (S).

The horizontal length $S_L$ of the rectangle constituting the region (S) corresponded to the distances from the straight line $g_a$ that passed through the point $N_a$ as the lowest position of the target concave portion 13a and extended in the vertical direction to the straight line $g_1$ that was remote therefrom in the horizontal direction perpendicular to the vertical direction leftward by the length $S_{L1}$, which was 10% of the width $L_a$ of the concave portion 13a, and from the straight line $g_a$ to the straight line $g_2$ that was remote therefrom in the horizontal direction perpendicular to the vertical direction rightward by the length $S_{L2}$, which was 10% of the width $L_a$ of the concave portion 13a.

(ii) Determination of Region (T)

As shown in FIG. 7, the region (T) was selected that was adjacent to the concave portion 13a corresponding to the region (S), passed through the point $N_T$ as the middle point of the width $L_b$ of the selected flat portion, was positioned under in the thickness direction the flat portion, and had the same length in the horizontal direction as the region (S). As shown in FIG. 7, the region (T) had a vertical length (i.e., a length in the vertical direction) that was the distance between the surface (α) and the surface (β) of the resin layer 12 (i.e., the total thickness h of the resin layer 12), and a horizontal length (i.e., a length in the horizontal direction perpendicular to the vertical direction) that was the horizontal length $S_L$ of the region (S) defined by the aforementioned manner for the concave portion 13a as the comparison target.

The region (T) was selected in such a manner that the point $N_T$ was positioned at the middle point of the horizontal edge of the rectangle constituting the region (T).

(iii) $S_{EDX}$ and $T_{EDX}$, and Ratio Thereof ($S_{EDX}/T_{EDX}$)

For the region (S) and the region (T) determined above, $S_{EDX}$ and $T_{EDX}$ were obtained, which were values of the intensity ratios Si/C of the peak intensity (Si) derived from silicon atoms and the peak intensity (C) derived from carbon atoms measured by energy dispersive X-ray analysis. The absolute values of the ratios ($S_{EDX}/T_{EDX}$) of $S_{EDX}$ and $T_{EDX}$ were obtained therefrom.

The specific measurement conditions for the energy dispersive X-ray analysis are shown below.

The measurement was performed twice for each of the regions, and for each time of measurement, an average value of the two measurements of the intensity ratio (Si/C) calculated from the peak intensities of the atoms measured for each of the region (S) and the region (T) is shown in Table 4.

(Measurement Conditions)
 Magnification: 500
 Movable objective diaphragm: 2
 Condensing lens 1: used, 2
 Condensing lens 2: used
 Acceleration voltage: 10 kV
 Emission current: 10.5 μA
 Working distance: 12.5 mm (Energy Dispersive X-Ray Analysis Conditions)
 Process time: 5
 Line scan dwell time: 2,000 μs
 Preset: endless
 Measurement time: 180 s <Mass Retention Rate of Resin Layer of Pressure Sensitive Adhesive Sheet>

After a sole resin layer was obtained from the pressure sensitive adhesive sheet, the mass of the resin layer before heating was measured. The resin layer was then heated to 800° C. for 30 minutes in a muffle furnace (manufactured by Denken Co., Ltd., a product name: "KDF-P90"). The resin layer after heating was measured for the mass thereof, and the mass retention rate of the resin layer was calculated according to the following expression. The values are shown in Table 4.

Mass retention rate of resin layer(%)=(Mass of resin layer after heating)/(Mass of resin layer before heating)×100

<Air Escape Property>

The pressure sensitive adhesive sheet with a substrate in a size of 50 mm in length and 50 mm in width was attached to a melamine-coated plate as an adherend in a manner forming air accumulation, and two types of samples of the case of strongly press-attaching the surroundings of the air accumulation with a squeegee and the case of weakly press-attaching the surroundings of the air accumulation with a squeegee were produced. After attaching for removing the air accumulation with the squeegee, the presence or absence of the air accumulation was observed, and the air escape property of each of the pressure sensitive adhesive sheets was evaluated according to the following criteria. The evaluation results are shown in Table 4.

5: In all of the case of weakly attaching and the case of strongly attaching, the air accumulation disappears.

4: In the case of weakly attaching, the air accumulation disappears. In the case of strongly attaching, the majority of the air accumulation disappears, and when again attached, the air accumulation remained disappears.

3: In the case of weakly attaching, the air accumulation disappears. On the other hand, in the case of strongly attaching, a site where the air accumulation remained remains exists.

2: In the case of weakly attaching, the majority of the air accumulation disappears, and when again attached, the air accumulation remained disappears. On the other hand, in the case of strongly attaching, the air accumulation remains.

1: In all of the case of weakly attaching and the case of strongly attaching, the air accumulation remains.

<Pressure Sensitive Adhesive Strength>

The pressure sensitive adhesive sheet with a substrate produced in each of the Examples and Comparative Examples was cut into a size of 25 mm in length and 300 mm in width, and the surface (α) of the resin layer of the pressure sensitive adhesive sheet was attached to a stainless steel plate (SUS304, polished with #360 polishing paper) under an environment of 23° C. and 50% RH (relative humidity), followed by allowing to stand in the same environment for 24 hours. After standing, the pressure sensitive adhesive strength of each of the pressure sensitive adhesive sheets was measured according to JIS Z0237:2000 by the 180° peeling method at a peeling speed of 300 mm/min. The measurement results are shown in Table 4.

<Blister Resistance>

The pressure sensitive adhesive sheet with a substrate in a size of 50 mm in length and 50 mm in width was attached to a polymethyl methacrylate plate having a size of 70 mm in length, 150 mm in width, and 2 mm in thickness (manufactured by Mitsubishi Rayon Co., Ltd., a product name: "ACRYLITE L001"), followed by press-attaching with a squeegee, thereby producing a test sample.

The test sample was allowed to stand at 23° C. for 12 hours, then allowed to stand in a hot air dryer at 80° C. for 1.5 hours, further allowed to stand in a hot air dryer at 90° C. for 1.5 hours, and then confirmed for the occurrence state of blister after the heat acceleration through visual inspection, and the blister resistance of each of the pressure sensitive adhesive sheets was evaluated according to the following criteria. The evaluation results are shown in Table 4.

A: Completely no blister was observed.
B: Blister was partially observed.
C: Blister was observed over the surface.

TABLE 4

| Evaluation | | | Example 1 | Example 2 | Example 3 | Example 4 |
|---|---|---|---|---|---|---|
| Si/C of region S ($S_{EDX}$) | | | 0.001 | 0.004 | 0.002 | 0.005 |
| Si/C of region T ($T_{EDX}$) | | | 0.034 | 0.053 | 0.106 | 0.090 |
| Absolute value of ($S_{EDX}/T_{EDX}$) | | | 0.0374 | 0.0766 | 0.0162 | 0.0554 |
| Item (a): Visual confirmation of concave portion or flat face | | | A | A | A | A |
| Evaluation of shape, etc. of concave portion and flat face | Flat face | Item (b1) | A | A | A | A |
| | | Item (b2) | A+ | A+ | A+ | A+ |
| | | Item (b3) | A | A | A | A |
| | | Item (b4) | A | A | A | A |
| | Concave portion | Item (c1) | A | A | A | A |
| | | Item (c2) | A | A | A | A |
| | | Item (c3) | A | A | A | A |
| | | Item (c4) | A | A | A | A |
| Area ratio occupied by flat face (%) | | | 67.12 | 55.43 | 52.71 | 59.61 |
| Area ratio occupied by concave portion (%) | | | 32.78 | 44.57 | 47.29 | 40.39 |
| Evaluation of areas of flat face and concave portion existing in region (D) | Flat face | Item (d1) | A+ | A+ | A+ | A+ |
| | | Item (d2) | A+ | A+ | A+ | A+ |
| | Concave portion | Item (e1) (%) | 83.72 | 99.13 | 99.14 | 95.33 |
| | | Item (e2) | A+ | A+ | A+ | A+ |
| Evaluation of cross section of region (P) | Item (f): Presence of plural concave portions defined in requirement (I) and flat portion defined in requirement (II) | | A | A | A | A |
| | Concave portion | Item (g1) | 33.5 | 46.9 | 52.1 | 42.4 |
| | | Item (g2) | A | A | A | A |
| | Flat portion | Item (h1) | 66.5 | 53.1 | 47.9 | 57.6 |
| | | Item (h2) | A | A | A | A |
| | | Item (h3) | A | A | A | A |
| Mass retention rate of resin layer of pressure sensitive adhesive sheet (%) | | | 9.8 | 10.5 | 11.0 | 10.6 |
| Evaluation of characteristics of pressure sensitive adhesive sheet | Air escape property | | 4 | 5 | 5 | 5 |
| | Pressure sensitive adhesive strength (N/25 mm) | | 16.5 | 13.7 | 13.5 | 14.5 |
| | Blister resistance | | B | A | A | A |

| Evaluation | Comparative Example 1 | Comparative Example 2 | Comparative Example 3 | Comparative Example 4 |
|---|---|---|---|---|

TABLE 4-continued

| | | | | | | |
|---|---|---|---|---|---|---|
| Si/C of region S ($S_{EDX}$) | | | 0.001 | 0.002 | 0.001 | 0.001 |
| Si/C of region T ($T_{EDX}$) | | | 0.003 | 0.001 | 0.003 | 0.002 |
| Absolute value of ($S_{EDX}/T_{EDX}$) | | | 0.4113 | 2.0462 | 0.3840 | 0.5493 |
| Item (a): Visual confirmation of concave portion or flat face | | | A | A | A | A |
| Evaluation of shape, etc. of concave portion and flat face | Flat face | Item (b1) | C | C | C | C |
| | | Item (b2) | A+ | A+ | A+ | A+ |
| | | Item (b3) | F | F | A | F |
| | | Item (b4) | F | F | A | F |
| | Concave portion | Item (c1) | C | C | C | C |
| | | Item (c2) | F | F | A | F |
| | | Item (c3) | F | F | A | F |
| | | Item (c4) | C | C | C | C |
| Area ratio occupied by flat face (%) | | | 77.62 | 82.92 | 67.43 | 48.68 |
| Area ratio occupied by concave portion (%) | | | 22.38 | 17.08 | 32.57 | 51.32 |
| Evaluation of areas of flat face and concave portion existing in region (D) | Flat face | Item (d1) | A+ | A+ | A+ | A+ |
| | | Item (d2) | C | C | C | C |
| | Concave portion | Item (e1) (%) | 100.00 | 7.32 | 100.00 | 41.53 |
| | | Item (e2) | C | C | C | C |
| Evaluation of cross section of region (P) | Item (f): Presence of plural concave portions defined in requirement (I) and flat portion defined in requirement (II) | | C | C | C | C |
| | Concave portion | Item (g1) | 23.3 | 17.3 | 35.1 | 44.2 |
| | | Item (g2) | A | A | A | A |
| | Flat portion | Item (h1) | 76.7 | 82.7 | 64.9 | 55.8 |
| | | Item (h2) | B | B | A | B |
| | | Item (h3) | A | A | A | A |
| Mass retention rate of resin layer of pressure sensitive adhesive sheet (%) | | | 0.0 | 0.0 | 0.0 | 0.0 |
| Evaluation of characteristics of pressure sensitive adhesive sheet | Air escape property | | 2 | 1 | 2 | 2 |
| | Pressure sensitive adhesive strength (N/25 mm) | | 16.9 | 17.5 | 15.7 | 9.5 |
| | Blister resistance | | C | C | B | B |

Examples 1 to 4 had excellent air escape property and were good in blister resistance and pressure sensitive adhesion characteristics due to $S_{EDX}$ and ($S_{EDX}/T_{EDX}$) within the prescribed ranges.

In Comparative Examples 1 to 4, $S_{EDX}$ and $T_{EDX}$ were calculated although the resin layer did not contain silica, and this was causes by the measurement errors of the equipment.

FIGS. 8(a) and 9 to 15 are binarized images of images acquired by photographing the region (D) surrounded by a rectangle having a size of 8 mm in length×10 mm in width that is freely-selected on the exposed surface (α) of the resin layer of the pressure sensitive adhesive sheets produced in Examples 1 to 4 and Comparative Examples 1 to 4 respectively, from the side of the surface (α) with a digital microscope.

The vertical length of the rectangular image of FIGS. 8(a) and 9 to 15 corresponds to "8 mm", and the horizontal length thereof corresponds to "10 mm".

In the binarized images, the black portion corresponds to the flat face, and the white portion corresponds to the concave portion.

Figure 8:
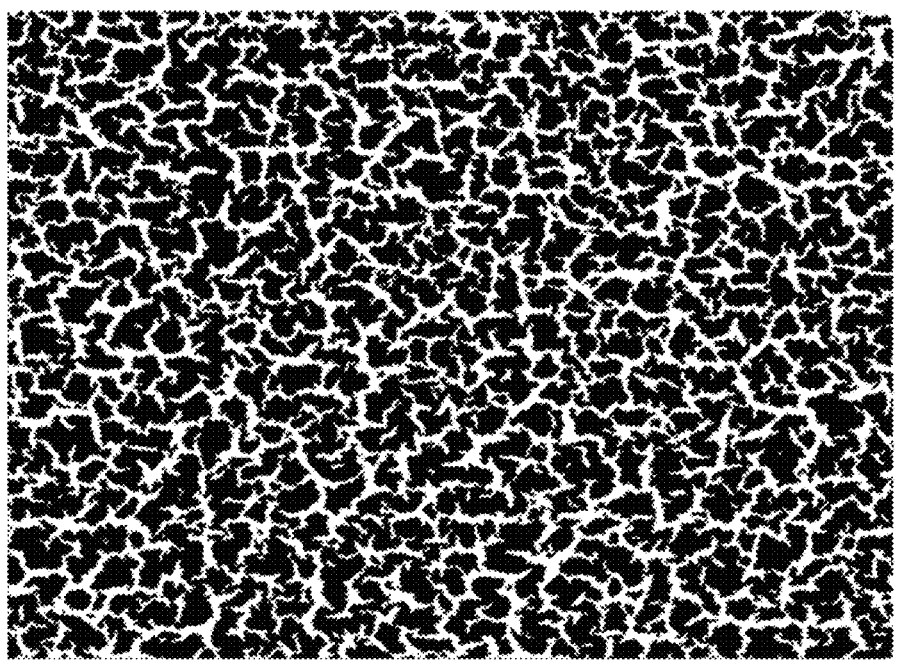
FIG. 8(a) is a binarized image of an image acquired by photographing the region (D) surrounded by a rectangle having a size of 8 mm in length×10 mm in width that is freely-selected on the exposed surface (α) of the resin layer of the pressure sensitive adhesive sheet produced in Example 1, from the side of the surface (α) with a digital microscope, in which in the binarized image, the black portion corresponds to the flat face, and the white portion corresponds to the concave portion.
FIG. 8(b) is a cross sectional image acquired by observing the cross section of the pressure sensitive adhesive sheet produced in Example 1 with a scanning microscope.
Figure 8:
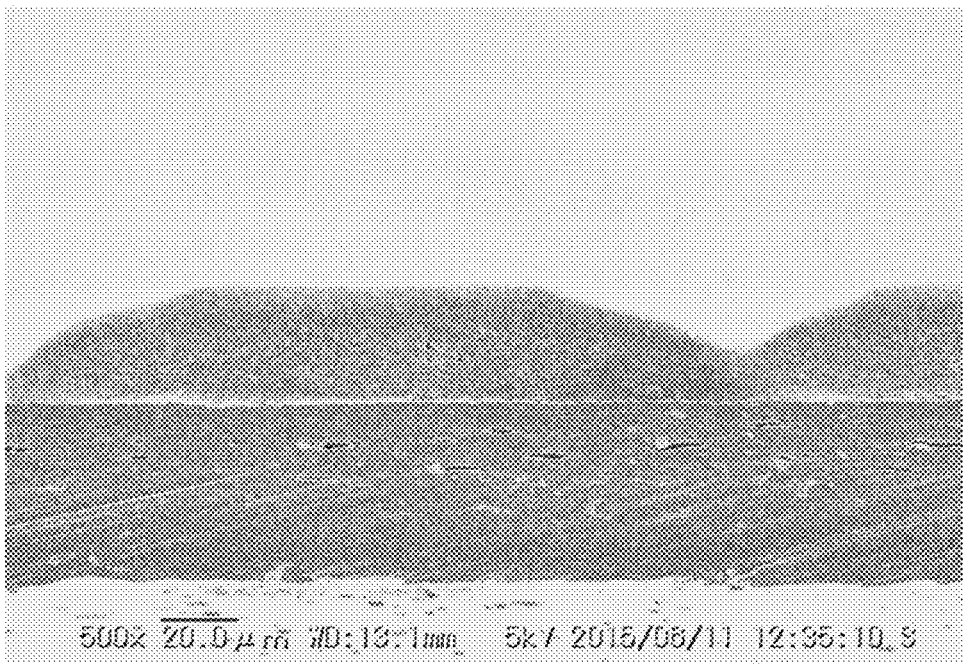
Figure 9:
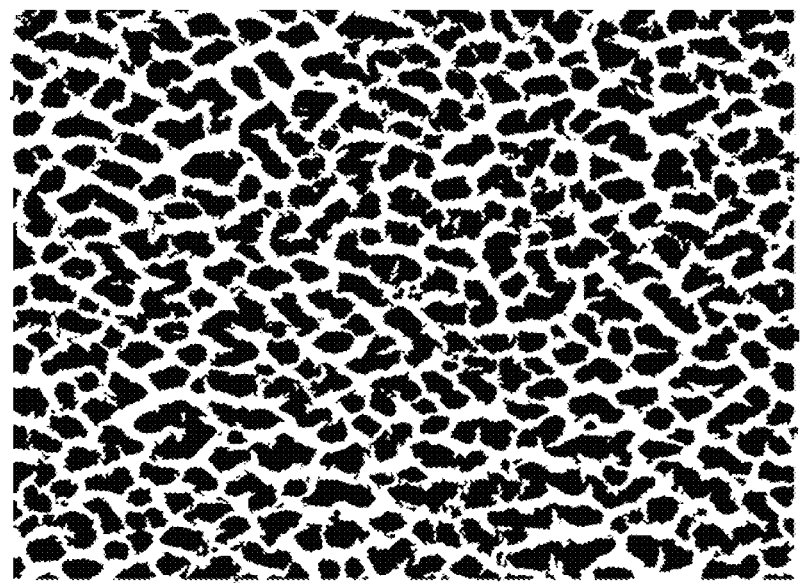
FIG. 9 is a binarized image of an image acquired by photographing the region (D) surrounded by a rectangle having a size of 8 mm in length×10 mm in width that is freely-selected on the exposed surface (α) of the resin layer of the pressure sensitive adhesive sheet produced in Example 2, from the side of the surface (α) with a digital microscope, in which in the binarized image, the black portion corresponds to the flat face, and the white portion corresponds to the concave portion.
Figure 10:
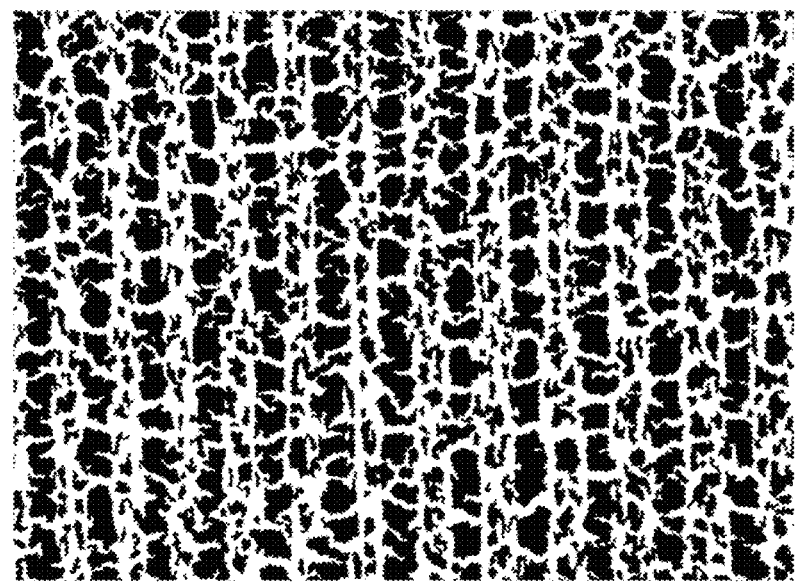
FIG. 10 is a binarized image of an image acquired by photographing the region (D) surrounded by a rectangle having a size of 8 mm in length×10 mm in width that is freely-selected on the exposed surface (α) of the resin layer of the pressure sensitive adhesive sheet produced in Example 3, from the side of the surface (α) with a digital microscope, in which in the binarized image, the black portion corresponds to the flat face, and the white portion corresponds to the concave portion.
Figure 11:
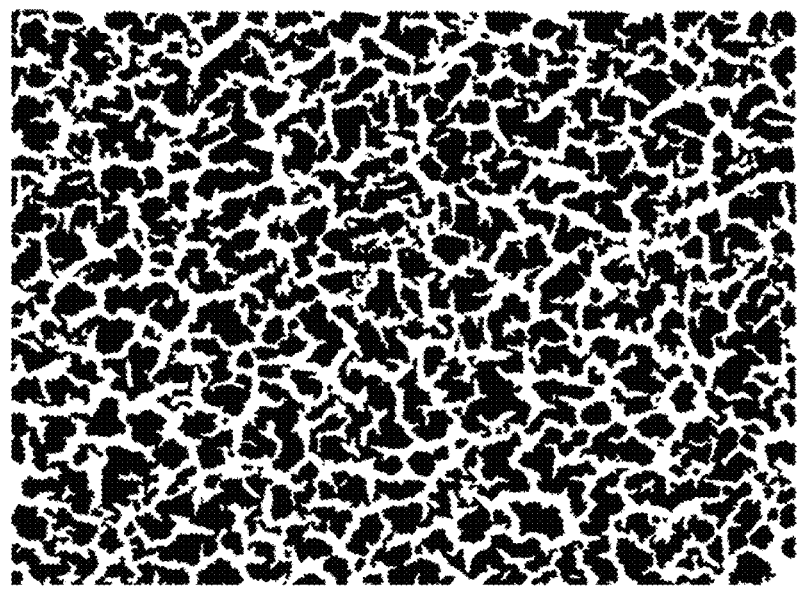
FIG. 11 is a binarized image of an image acquired by photographing the region (D) surrounded by a rectangle having a size of 8 mm in length×10 mm in width that is freely-selected on the exposed surface (α) of the resin layer of the pressure sensitive adhesive sheet produced in Example 4, from the side of the surface (α) with a digital microscope, in which in the binarized image, the black portion corresponds to the flat face, and the white portion corresponds to the concave portion.
Figure 12:
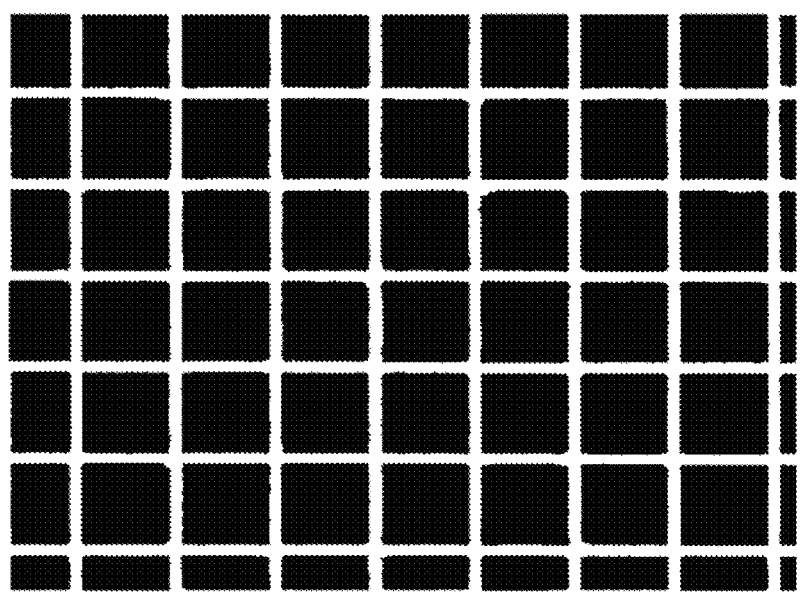
FIG. 12 is a binarized image of an image acquired by photographing the region (D) surrounded by a rectangle having a size of 8 mm in length×10 mm in width that is freely-selected on the exposed surface (α) of the resin layer of the pressure sensitive adhesive sheet produced in Comparative Example 1, from the side of the surface (α) with a digital microscope, in which in the binarized image, the black portion corresponds to the flat face, and the white portion corresponds to the concave portion.
Figure 13:
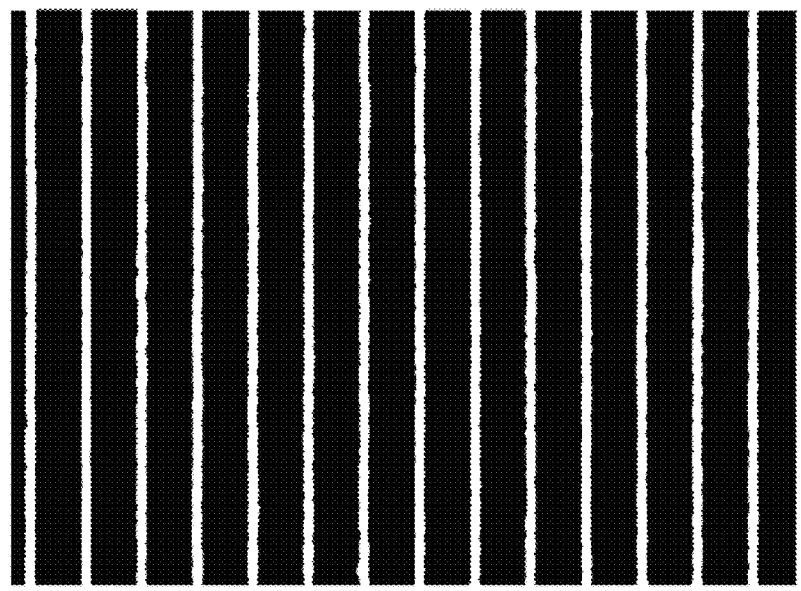
FIG. 13 is a binarized image of an image acquired by photographing the region (D) surrounded by a rectangle having a size of 8 mm in length×10 mm in width that is freely-selected on the exposed surface (α) of the resin layer of the pressure sensitive adhesive sheet produced in Comparative Example 2, from the side of the surface (α) with a digital microscope, in which in the binarized image, the black portion corresponds to the flat face, and the white portion corresponds to the concave portion.
Figure 14:
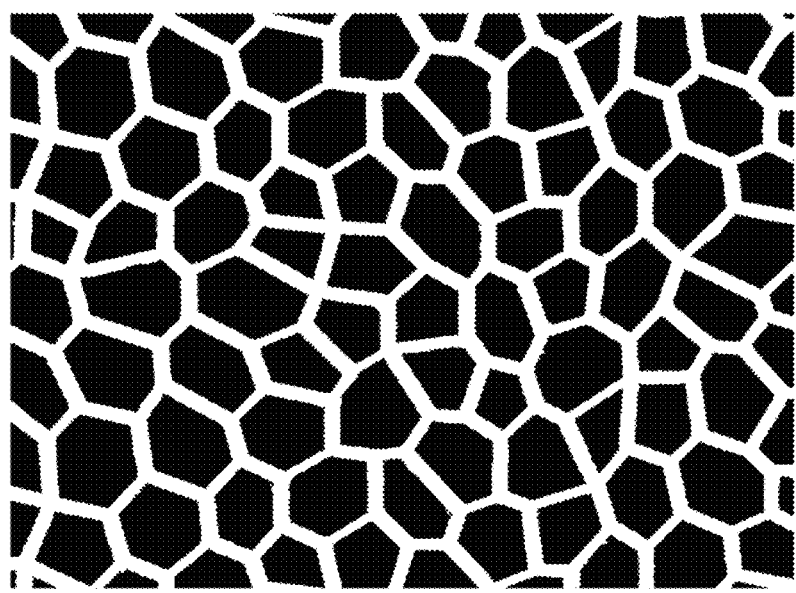
FIG. 14 is a binarized image of an image acquired by photographing the region (D) surrounded by a rectangle having a size of 8 mm in length×10 mm in width that is freely-selected on the exposed surface (α) of the resin layer of the pressure sensitive adhesive sheet produced in Comparative Example 3, from the side of the surface (α) with a digital microscope, in which in the binarized image, the black portion corresponds to the flat face, and the white portion corresponds to the concave portion.
Figure 15:
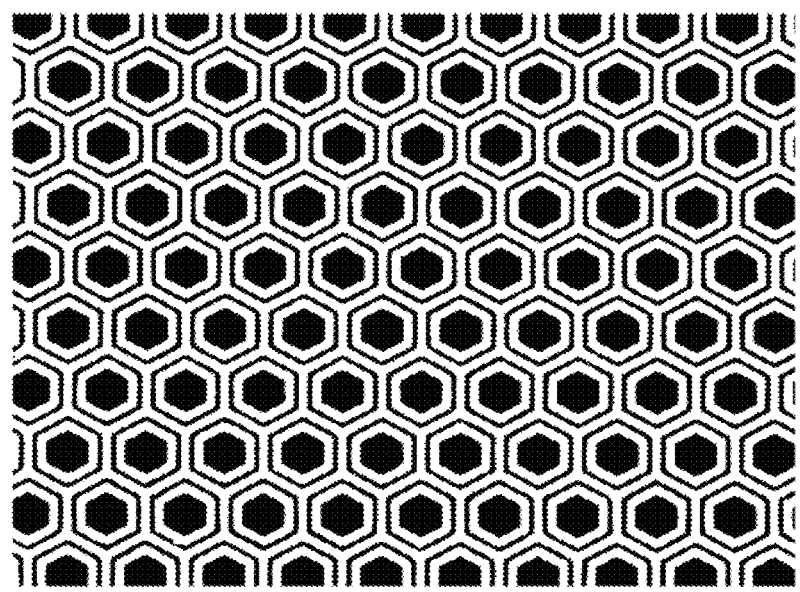
FIG. 15 is a binarized image of an image acquired by photographing the region (D) surrounded by a rectangle having a size of 8 mm in length×10 mm in width that is freely-selected on the exposed surface (α) of the resin layer of the pressure sensitive adhesive sheet produced in Comparative Example 4, from the side of the surface (α) with a digital microscope, in which in the binarized image, the black portion corresponds to the flat face, and the white portion corresponds to the concave portion.

FIG. 8(b) is a cross sectional image acquired by observing the cross section of the pressure sensitive adhesive sheet produced in Example 1 with a scanning microscope. The cross sections of the pressure sensitive adhesive sheets of Examples 2 to 4 are similar to the cross sectional image of FIG. 5.

INDUSTRIAL APPLICABILITY

One embodiment of the pressure sensitive adhesive sheet of the present invention is useful as a pressure sensitive adhesive sheet having a large adhesive area that is used for identification or decoration, for masking in coating, and for surface protection for metal plates, etc.

REFERENCE SIGNS LIST 1a, 1b, 2a, 2b: Pressure sensitive adhesive sheet
11: Substrate
12: Resin layer
12a: Surface (α)
12b: Surface (β)
(X): Resin part (X)
(Y): Particle part (Y)
(Xβ): Layer (Xβ) mainly containing resin part (X)
(Xα): Layer (Xα) mainly containing resin part (X)
(Y1): Layer (Y1) containing particle part (Y) in 15% by mass or more
13, 13a, 131, 132: concave portion
14: Flat face
14a: Flat portion
15: Convex portion
21, 22: Release material
50: Square
51, 52: diagonal line
60: Cross section (P1)
61, 62: Cross section
100: Translucent adherend
100a: Smooth surface
101: Adherend

The invention claimed is:
1. A pressure sensitive adhesive sheet, comprising:
a substrate or a release material; and
a resin layer on the substrate or the release material, the resin layer comprising a resin part (X) comprising a carbon atom-containing resin having a carbon atom in a main chain of a constitutional unit as a main component, and a particle part (Y) consisting of fine particles which contain silica particles and have an average particle diameter of 0.01 to 100 at least a surface (α) of the resin layer opposite to the side having the substrate or the release material provided having pressure sensitive adhesiveness, wherein:

a concave portion and a flat face exist on the surface (α);

in at least one cross section (P1) of two cross sections of the pressure sensitive adhesive sheet resulting from freely-selecting a region (P) surrounded by a square having an edge length of 5 mm on the surface (α) and cutting the region (P) in a thickness direction of the pressure sensitive adhesive sheet with a plane surface going through each of two diagonal lines of the square and being perpendicular to the region (P) on the surface (α), a concave portion having a maximum height difference of 40% or more of a total thickness of the resin layer, and a flat portion corresponding to a cut portion of the flat face existing in the region (P) and being substantially in parallel to a surface of the substrate or the release material in contact with the resin layer exist on the side of the surface (α) of the cross section (P1); and an absolute value of a ratio ($S_{EDX}/T_{EDX}$) of a value ($S_{EDX}$) of an intensity ratio Si/C of a peak intensity (Si) derived from silicon atoms and a peak intensity (C) derived from carbon atoms measured by energy dispersive X-ray analysis for a prescribed region (S) that is positioned under in the thickness direction with respect to one of the concave portion existing on the cross section (P1), and a value ($T_{EDX}$) of the intensity ratio Si/C measured by energy dispersive X-ray analysis for a prescribed region (T) that is positioned under in the thickness direction with respect to one of the flat portion existing on the cross section (PI) and has the same length in a horizontal direction as the region (S) is 0.2 or less.

2. The pressure sensitive adhesive sheet according to claim 1, wherein the value ($S_{EDX}$) of the intensity ratio Si/C in the prescribed region (S) is 0.01 or less.

3. A pressure sensitive adhesive sheet, comprising:

a substrate or a release material; and a resin layer on the substrate or the release material, the resin layer comprising a resin part (X) comprising a carbon atom-containing resin having a carbon atom in a main chain of a constitutional unit as a main component, and a particle part (Y) consisting of fine particles which contain silica particles and have an average particle diameter of 0.01 to 100 μm, at least a surface (α) of the resin layer opposite to the side having the substrate or the release material provided having pressure sensitive adhesiveness, wherein:

a concave portion and a flat face exist on the surface (α);

in at least one cross section (P1) of two cross sections of the pressure sensitive adhesive sheet resulting from freely-selecting a region (P) surrounded by a square having an edge length of 5 mm on the surface (α) and cutting the region (P) in a thickness direction of the pressure sensitive adhesive sheet with a plane surface going through each of two diagonal lines of the square and being perpendicular to the region (P) on the surface (α), a concave portion having a maximum height difference of 40% or more of a total thickness of the resin layer, and a flat portion corresponding to a cut portion of the flat face existing in the region (P) and being substantially in parallel to a surface of the substrate or the release material in contact with the resin layer exist on the side of the surface (α) of the cross section (P1); and a value ($S_{EDX}$) of an intensity ratio Si/C of a peak intensity (Si) derived from silicon atoms and a peak intensity (C) derived from carbon atoms measured by energy dispersive X-ray analysis for a prescribed region (S) that is positioned under in a thickness direction with respect to one of the concave portion existing on the cross section (P1) is 0.01 or less.

4. The pressure sensitive adhesive sheet according to claim 3, wherein an absolute value of a ratio ($S_{EDX}/T_{EDX}$) of the value ($S_{EDX}$) and a value ($T_{EDX}$) of the intensity ratio Si/C measured by energy dispersive X-ray analysis for a prescribed region (T) that is positioned under in a thickness direction with respect to one of the flat portion existing on the cross section (P1) and has the same length in a horizontal direction as the region (S) is 0.150 or less.

5. The pressure sensitive adhesive sheet according to claim 1, wherein the value ($T_{EDX}$) of the intensity ratio Si/C of the prescribed region (T) is more than 0.01.

6. The pressure sensitive adhesive sheet according to claim 1, wherein plural concave portions each having a maximum height difference of 40% or more of a total thickness of the resin layer and being different in shape from each other exist on the side of the surface (α) of the cross section (P1).

7. The pressure sensitive adhesive sheet according to claim 1, wherein the flat face has an irregular shape on observation from the side of the surface (α).

8. The pressure sensitive adhesive sheet according to claim 1, wherein plural flat portions exist on the side of the surface (α) of the cross section (P1).

9. The pressure sensitive adhesive sheet according to claim 8, wherein positions of the plural flat portions existing on the side of the surface (α) on the cross section (P1) have no periodicity.

10. The pressure sensitive adhesive sheet according to claim 8, wherein differences between distances of each of the plural flat portions existing on the side of the surface (α) on the cross section (P1) to the substrate or the release material are less than 5% with respect to an average value of the distances.

11. The pressure sensitive adhesive sheet according to claim 1, wherein the concave portion has a maximum height difference of 0.5 μm or more.

12. The pressure sensitive adhesive sheet according to claim 1, wherein one or more flat faces (f1) having such an area that a region surrounded by a circle having a diameter of at least 100 μm is selectable exist on the surface (α) of the resin layer.

13. The pressure sensitive adhesive sheet according to claim 1, wherein one or more flat faces (f2) having an area of 0.2 mm² or more exist on the surface (α) of the resin layer.

14. The pressure sensitive adhesive sheet according to claim 1, wherein the concave portion is not formed using a release material having an emboss pattern.

15. The pressure sensitive adhesive sheet according to claim 13, wherein a mass retention rate after heating the resin layer to 800° C. for 30 minutes is 3 to 90% by mass.

16. The pressure sensitive adhesive sheet according to claim 13, wherein the carbon atom-containing resin in the resin part (X) comprises a pressure sensitive adhesive resin.

17. The pressure sensitive adhesive sheet according to claim 1, wherein the resin part (X) further comprises at least one selected from the group consisting of a metal chelate crosslinking agent and an epoxy crosslinking agent.

18. The pressure sensitive adhesive sheet according to claim 1, wherein a surface (β) of the resin layer on the side on which the substrate or the release material is provided has pressure sensitive adhesiveness.

19. The pressure sensitive adhesive sheet according to claim 18, wherein the resin layer is provided on the release material.

20. The pressure sensitive adhesive sheet according to claim 1, wherein the resin layer is a multilayer structure comprising at least a layer (Xβ) mainly comprising the resin part (X), a layer (Y1) comprising 15% by mass or more of the particle part (Y), and a layer (Xα) mainly comprising the resin part (X), laminated in this order from the side having the substrate or the release material provided.

21. The pressure sensitive adhesive sheet according to claim 20, wherein:
the layer (Xβ) is a layer formed by a composition (xβ) comprising a carbon atom-containing resin having a carbon atom in a main chain of a constitutional unit and having a content of silica particles of less than 15% by mass,
the layer (Y1) is a layer formed by a composition (y) comprising silica particles in an amount of 15% by mass or more, and
the layer (Xα) is a layer formed by a composition (xα) comprising a carbon atom-containing resin having a carbon atom in a main chain of a constitutional unit and having a content of silica particles of less than 15% by mass.

22. A method for producing the pressure sensitive adhesive sheet according to claim 1, the method comprising
(1) forming a coating film (x') formed by a composition (x) comprising a carbon atom-containing resin having a carbon atom in a main chain of a constitutional unit and having a content of silica particles of less than 15% by mass, and a coating film (y') formed by a composition (y) comprising silica particles in an amount of 15% by mass or more, and
(2) simultaneously drying the coating film (x') and the coating film (y') formed in the step (1).

23. A method for producing the pressure sensitive adhesive sheet according to claim 21, the method comprising:
(1A) forming, on a substrate or a release material, a coating film (xβ') formed by a composition (xβ) comprising a carbon atom-containing resin having a carbon atom in a main chain of a constitutional unit and having a content of silica particles of less than 15% by mass, a coating film (y') formed by a composition (y) comprising the silica particles in an amount of 15% by mass or more, and a coating film (xα') formed by a composition (xα) comprising a carbon atom-containing resin having a carbon atom in a main chain of a constitutional unit and having a content of silica particles of less than 15% by mass, by laminating in this order, and
(2A) simultaneously drying the coating film (xβ'), the coating film (y'), and the coating film (xα') formed in the step (1A).

24. A method for producing the pressure sensitive adhesive sheet according to claim 21, the method comprising:
(1B) forming, on a layer (Xβ) mainly comprising a resin part (X) provided on a substrate or a release material, a coating film (y') formed by a composition (y) comprising the silica particles in an amount of 15% by mass or more, and a coating film (xα') formed by a composition (xα) comprising a carbon atom-containing resin having a carbon atom in a main chain of a constitutional unit and having a content of silica particles of less than 15% by mass by laminating in this order, and
(2B) simultaneously drying the coating film (y') and the coating film (xα') formed in the step (1B).

* * * * *